(12) United States Patent
Gravelle et al.

(10) Patent No.: US 11,455,595 B2
(45) Date of Patent: Sep. 27, 2022

(54) MULTI-ENTITY INVENTORY MANAGEMENT USING STORAGE BIN AND INVENTORY REASSIGNMENT

(71) Applicant: ATTABOTICS INC, Calgary (CA)

(72) Inventors: Scott Gravelle, Calgary (CA); Douglas Langen, Calgary (CA); Bradley Dean Simpson, Calgary (CA)

(73) Assignee: ATTABOTICS INC, Calgary (CA)

( * ) Notice: Subject to any disclaimer, the term of this patent is extended or adjusted under 35 U.S.C. 154(b) by 0 days.

(21) Appl. No.: 16/954,199

(22) PCT Filed: Mar. 13, 2020

(86) PCT No.: PCT/IB2020/052287
§ 371 (c)(1),
(2) Date: Jun. 15, 2020

(87) PCT Pub. No.: WO2020/183427
PCT Pub. Date: Sep. 17, 2020

(65) Prior Publication Data
US 2021/0398059 A1    Dec. 23, 2021

Related U.S. Application Data

(60) Provisional application No. 62/818,506, filed on Mar. 14, 2019, provisional application No. 62/836,863, filed on Apr. 22, 2019.

(51) Int. Cl.
*G06Q 10/08* (2012.01)
*G06F 16/23* (2019.01)
(Continued)

(52) U.S. Cl.
CPC ....... *G06Q 10/087* (2013.01); *G05B 19/4155* (2013.01); *G06F 16/23* (2019.01);
(Continued)

(58) Field of Classification Search
CPC ...... G06Q 10/087; G06Q 30/04; G06F 16/23; G06F 16/2455; G05B 19/4155; G05B 2219/50391
(Continued)

(56) References Cited

U.S. PATENT DOCUMENTS 7,209,887 B2    4/2007  Yen et al.
7,289,969 B1   10/2007  Ballenger et al.
(Continued)

*Primary Examiner* — Ariel J Yu
*Assistant Examiner* — Denisse Y Ortiz Roman
(74) *Attorney, Agent, or Firm* — Barry Choobin; Patent 360LLC

(57) ABSTRACT

A multi-entity inventory management system including reassignable storage bins and a method for managing product inventory of different entities, for example, vendors, at one or more facilities including one or more storage structures served by robotic handlers, are provided. Each storage bin stores one or more caches of the products. A computerized inventory management system (CIMS) stores digital records including entity identifiers, product catalogues containing product identifiers of the products offered by each entity to customers, and unique bin identifiers assigned to the storage bins. The CIMS executes a digital transfer of ownership of inventory from a stocked entity to a needful entity, for example, based on an inventory shortfall, a complete absence of inventory of the needful entity, orders for the product inventory being received, etc. Along with an inventory swap through the storage bins, the CIMS executes commerce between the entities and implements inventory reservation.

37 Claims, 27 Drawing Sheets

---

101 — Communicatively connect multiple inventory handlers in a multi-entity inventory management system

102 — Store digital records in one or more databases of the computerized inventory management system

103 — Execute a transfer of ownership of one or more of the products of one of the product types from a first entity to a second entity based on predetermined criteria

(51) Int. Cl.
*G05B 19/4155* (2006.01)
*G06F 16/2455* (2019.01)
*G06Q 30/04* (2012.01)

(52) U.S. Cl.
CPC ......... *G06F 16/2455* (2019.01); *G06Q 30/04* (2013.01); *G05B 2219/50391* (2013.01)

(58) Field of Classification Search
USPC .......................................................... 705/28
See application file for complete search history.

(56) References Cited

U.S. PATENT DOCUMENTS

| | | |
|---|---|---|
| 7,308,330 B2 | 12/2007 | Jones |
| 7,596,508 B1 * | 9/2009 | McGuffie ........... G06Q 10/0833 |
| | | 705/26.35 |
| 7,711,657 B1 | 5/2010 | Huberman et al. |
| 8,104,681 B2 | 1/2012 | Eisenson |
| 8,533,053 B2 | 9/2013 | Brown et al. |
| 10,430,756 B2 | 10/2019 | Greenberg |
| 2005/0055260 A1 | 3/2005 | Yamamoto |
| 2005/0209731 A1 * | 9/2005 | Penkar ................. G06Q 10/087 |
| | | 700/215 |
| 2006/0085235 A1 | 4/2006 | Nguyen et al. |
| 2006/0085296 A1 | 4/2006 | Strickland |
| 2006/0111989 A1 | 5/2006 | Church et al. |
| 2008/0301068 A1 | 12/2008 | Fager et al. |
| 2015/0088302 A1 * | 3/2015 | Mountz ................ G06Q 10/087 |
| | | 700/216 |

* cited by examiner

MULTI-ENTITY INVENTORY MANAGEMENT USING STORAGE BIN AND INVENTORY REASSIGNMENT

CROSS-REFERENCE TO RELATED APPLICATIONS

This application is a national stage application of the Patent Cooperation Treaty (PCT) international application titled "Multi-entity Inventory Management Using Storage Bin and Inventory Reassignment", international application number PCT/IB2020/052287, filed in the Receiving Office of the International Bureau of the World Intellectual Property Organization (WIPO) on Mar. 13, 2020, which claims priority to and the benefit of the provisional patent application titled "Multi-vendor Inventory Management Using Storage Bin Assignment & Reassignment in a Supply Chain, Distribution or Order Fulfillment Ecosystem", application No. 62/818,506, filed in the United States Patent and Trademark Office (USPTO) on Mar. 14, 2019, and the provisional patent application titled "Multi-vendor Inventory Management Using Storage Bin & Product Reassignment in a Supply Chain, Distribution or Order Fulfillment Ecosystem", application No. 62/836,863, filed in the USPTO on Apr. 22, 2019. The specifications of the above referenced patent applications are incorporated herein by reference in their entirety.

BACKGROUND

Technical Field

The embodiments herein, in general, relate to supply chains, distribution channels, order fulfillment, and inventory management. More particularly, the embodiments herein relate to a multi-entity inventory management system and a method for managing product inventory of multiple different entities at one or more of multiple facilities comprising one or more storage structures served by robotic handlers.

Description of the Related Art

A conventional supply chain comprises a series of discrete transactional entities, for example, manufacturers, producers, suppliers, vendors, warehouses, transportation companies, distribution centers, order fulfillment centers, retailers, etc. Supply chain management allows sourcing and delivery of inventory from manufacturers and producers to customers and end consumers. Supply chain management typically involves the management of flow of inventory from the origin of the inventory to fulfillment of customer orders and last mile delivery to and consumption by the end customers and the end consumers. Logistics constitutes a part of the supply chain and involves control of the movement and storage of inventory from a point of origin of the inventory to a final destination. Several technologies have emerged that are altering conventional methods of managing inventory in a supply chain ecosystem. Customer demand for individualized products and stronger granularization of orders are growing. Digitization of the supply chain allows businesses to address the growing expectations of customers.

Electronic commerce (e-commerce) has changed the way customers purchase items. As e-commerce continues to grow at a significant rate and overtake conventional brick and mortar retail practices, many businesses are facing notable challenges of maintaining or gaining relevance in an online marketplace and being able to compete with prominent players in the space. Accordingly, there is a need for solutions by which vendors can shift away from, or supplement, conventional supply chain, distribution and inventory management practices in order to re-focus on direct-to-customer order fulfillment. Business entities that produce products typically employ an inventory management system for distributing products to sales outlets or customers, tracking the products, and correlating the inventory with customer orders. Inventory management typically indicates an overall state of the inventory and the sales, that is, the supply and demand situation. However, inventory control presents a significant challenge to large and small businesses. Insufficient inventory of products, that is, an inventory shortfall results in a loss of sales and opportunities. On the other hand, inventory in excess of demand leads to a significant increase in storage costs, overhead costs, financial liabilities, etc. The patterns of inventory shortfalls and excess typically cost businesses and the economy millions or even billions of dollars.

Inventory shortfalls present a significant problem in fulfilling customer orders. Unless the vendor knows of an excess supply of products elsewhere and is also aware of the right contact and procedures to obtain the needed product inventory, inventory would have to be separately ordered and purchased, driving up costs and time for fulfilling customer orders. Moreover, to lower last mile delivery costs, inventory must be located as close to the end customer as possible in micro-fulfillment facilities. Real estate costs of space in the back of retail stores or in dark warehouses near end customers are much higher than rural settings of most distribution centres. To make micro-fulfillment feasible, a large variety of goods must be available at each facility, but not at excessive levels that would drastically increase storage requirements. As a result, there is a need to handle all products sold within the supply chain at an "each" level and replenished with "just enough" inventory, rather than replenishing at the "case" level in a conventional supply chain approach. Within any major business enterprise, excess inventory at one local could often be transferred to meet shortage at another location within the same enterprise if locatable and if procedures are in place for the inventory balancing.

Conventional supply chain systems typically fulfill customer orders from multiple endpoints, which increases costs and involves chaotic inventory management. There is a need for fulfilling customer orders from the closest endpoint to a destination address. Moreover, these supply chain systems perform shipping and receiving among facilities in a chaotic manner with limited predictability. There is a need for an autonomous, orderly approach where storage units are exchanged in a one-to-one correspondence at each facility, including an endpoint, to increase predictability and optimize inventory management.

For overall improvements in inventory management, there is a need for better collaboration with multiple vendors in the supply chain. Most conventional supply chain systems do not account for multi-tenancy with respect to orders from multiple vendors. There is a need for combining multi-vendor inventory within a single storage unit while still tracking physical location and ownership of product inventory. Moreover, there is a need for moving multi-vendor inventory between network nodes and tracking multi-vendor inventory through the supply chain. Furthermore, there is a need for determining and overcoming inventory shortfalls on a near-instantaneous, substantially expedited basis compared to physically transporting inventory to distant locations for order fulfillment. Furthermore there is a need for a comprehensive, electronic inventory management system coupled with autonomous fulfillment technologies for managing inventory shortfalls and excess in real time through digital inter-vendor inventory reassignment based on multiple parameters, inventory transfers, inventory swaps, inventory sales, and inventory reservation, in addition to executing inter-vendor commerce where digital reassignment associated with an inventory swap or an inventory sale is triggered by customer orders being received, inventory shortfalls being detected, inventory adjustment being resolved by digital transaction, and robots being dispatched to fulfill customer orders.

Some conventional solutions typically require each vendor to have inventory of a particular stock keeping unit (SKU) for transfer of the inventory between vendors. There is a need for digitally transferring ownership of product inventory to a needful vendor, even if the needful vendor does not have inventory within the supply chain ecosystem. Moreover, there is a need for a reservation method for ensuring the availability of inventory before the inventory reassignment takes place.

Hence, there is a long-felt need for a multi-entity inventory management system and method for managing product inventory of multiple different entities at one or more of multiple facilities comprising one or more storage structures served by robotic handlers, that address the above-recited problems associated with the related art.

SUMMARY

This summary is provided to introduce a selection of concepts in a simplified form that are further disclosed in the detailed description. This summary is not intended to determine the scope of the claimed subject matter.

The system and the method disclosed herein address the above-recited needs for managing product inventory of multiple different entities at one or more of multiple facilities comprising one or more storage structures served by robotic handlers. The system and the method disclosed herein manage the reassignment and exchange of product inventory between multiple different entities using inventory handlers such as smart storage bins and robotic handlers.

A computerized system and a method for managing product inventory of a plurality of different entities at one or more of a plurality of facilities comprising one or more storage structures served by robotic handlers are provided. The computerized system comprises a network interface coupled to a communication network, one or more storage devices, and one or more processors coupled to the network interface and the storage device(s). The storage device(s) stores a database containing product ownership information. The product ownership information comprises, for example, identification of the plurality of different entities. The processor(s) is configured to execute a plurality of computer program instructions loaded from the storage device(s) for performing the method for managing product inventory of different entities at one or more of the facilities comprising one or more storage structures served by robotic handlers.

In an embodiment, the computerized system is a computerized inventory management system (CIMS) comprising one or more management subsystems distributed across the facilities and a fleet of transport vehicles travelling between the facilities, and operably coupled to a central computing system via the communication network. In an embodiment, the CIMS activates a first subset of the robotic handlers at one of the facilities, herein referred to as a "first facility", to physically store a first product of a particular product type into a storage location in a first storage structure. Before or after activating the first subset of the robotic handlers, the CIMS updates the database to record that the first product is owned by a first entity included among the plurality of different entities identified in the database. The CIMS receives, via the communication network, an order of the particular product type from a second entity included among the plurality of different entities identified in the database, the second entity being different than the first entity. In an embodiment, the second entity is a needful entity who needs product inventory and the first entity is a stocked entity having additional product inventory to transfer to the needful entity. The CIMS updates the database to record a transfer of ownership of the first product stored at the storage location in the first storage structure from the first entity to the second entity. The CIMS activates a second subset of the robotic handlers to retrieve the first product from the storage location in the first storage structure for use in fulfilling the order of the particular product type for the second entity. The CIMS executes the transfer of the ownership of the first product from the first entity to the second entity at any time corresponding to the retrieval of the first product from the storage location in the first storage structure and/or the fulfillment of the order of the particular product type for the second entity. For example, in an embodiment, the CIMS executes the transfer of the ownership of the first product stored at the storage location in the first storage structure from the first entity to the second entity prior to activating the second subset of the robotic handlers to retrieve the first product from the storage location in the first storage structure. In another embodiment, the CIMS executes the transfer of the ownership of the first product stored at the storage location in the first storage structure from the first entity to the second entity after activating the second subset of the robotic handlers to retrieve the first product from the storage location in the first storage structure. In another embodiment, the CIMS executes the transfer of the ownership of the first product from the first entity to the second entity after fulfillment of the order.

In an embodiment, the CIMS updates the database to record the transfer of the ownership of the first product at the storage location in the first storage structure from the first entity to the second entity in response to determining that the second entity has an inventory shortfall of the particular product type and is unable to fulfill the order of the particular product type. In another embodiment, the CIMS updates the database to record the transfer of the ownership of the first product at the storage location in the first storage structure from the first entity to the second entity by verifying that the second entity is purchasing the first product from the first entity and updating the database to record the second entity purchasing the first product from the first entity.

In an embodiment, the CIMS activates a third subset of the robotic handlers that is different from the first subset of the robotic handlers and the second subset of the robotic handlers to physically store a second product of the particular product type into a storage location in a second storage structure. The second storage structure is located at a different facility, herein referred to as a "second facility", than the first storage structure. In an embodiment, the first storage structure and the second storage structure are located in different cities. Before or after activating the third subset of the robotic handlers, the CIMS updates the database in the storage device(s) to record that the second product stored at the storage location in the second storage structure is owned by the second entity. After receiving the order, the CIMS updates the database to record a transfer of ownership of the second product at the storage location in the second storage structure from the second entity to the first entity, whereby the ownership of the first product and the second product is swapped between the first entity and the second entity.

In an embodiment, when activating the first subset of the robotic handlers to store the first product in the storage location in the first storage structure, the CIMS activates the first subset of the robotic handlers to physically store the first product in the first storage structure within a first storage bin. When activating the third subset of the robotic handlers to store the second product in the storage location in the second storage structure, the CIMS activates the third subset of the robotic handlers to physically store the second product in the second storage structure within a second storage bin. After receiving the order, the CIMS updates the database to record a transfer of ownership of content of the first storage bin from the first entity to the second entity and ownership of content of the second storage bin from the second entity to the first entity, whereby the ownership of the content of the first storage bin and the ownership of the content of the second storage bin are swapped between the first entity and the second entity. The CIMS executes the transfer of the ownership of the content of the first storage bin from the first entity to the second entity and the transfer of the ownership of the content of the second storage bin from the second entity to the first entity at any time corresponding to the activation of the robotic handlers and/or the fulfillment of the order of the particular product type for the second entity, for example, before or after the robotic handlers are dispatched and the product picked or even after the order is fulfilled. The CIMS activates a fourth subset of the robotic handlers to retrieve the first storage bin from the first storage structure and thereby fulfills the order of the particular product type for the second entity.

In an embodiment, before receiving the order and before or after activating the first subset of the robotic handlers, the CIMS updates the database in the storage device(s) to record that the content of the first storage bin is owned by the first entity. Before receiving the order and before or after activating the third subset of the robotic handlers, the CIMS updates the database in the storage device(s) to record that the content of the second storage bin is owned by the second entity. In an embodiment, the CIMS queries the database to determine whether the content of the first storage bin is equal to the content of the second storage bin. After receiving the order, the CIMS updates the database to record the ownership of the content of the first storage bin and the second storage bin being swapped at least partly in response to determining that the content of the first storage bin is equal to the content of the second storage bin. In response to a determination that the content of the first storage bin and the content of the second storage bin are not equal, the CIMS performs at least one of the following: (a) activates a robotic worker at the first facility to equalize the content of the first storage bin relative to the content of the second storage bin; (b) activates, at the first facility, (i) a fifth subset of the robotic handlers to deliver the first storage bin to a human-attended workstation, and (ii) a human-machine interface (HMI) to instruct a human worker of the human-attended workstation to equalize the content of the first storage bin relative to the content of the second storage bin; (c) activates a robotic worker at the second facility to equalize the content of the second storage bin relative to the content of the first storage bin; and (d) activates, at the second facility, (i) a sixth subset of the robotic handlers to deliver the second storage bin to a human-attended workstation, and (ii) an HMI of the human-attended workstation to instruct a human worker of the human-attended workstation to equalize the content of the first storage bin relative to the content of the second storage bin. In an embodiment, the CIMS activates another subset of the robotic handlers to retrieve the second product from the second storage structure for relocation of the second product to the first facility after updating the database to record the transfer of the ownership of the second product at the storage location in the second storage structure from the second entity to the first entity.

In an embodiment, the CIMS receives a reservation message from the second entity requesting that the particular product type be reserved prior to receiving the order for the particular product type from the second entity. The CIMS queries the database to confirm that the first product is available for reservation. The CIMS reserves the first product for the second entity by recording in the database an indication that the first product is reserved for the second entity after confirming that the first product is available. The CIMS starts a reservation period during which the first product is exclusively held for the second entity, such that the first product is unavailable for reservations by other of the different entities. In an embodiment, the CIMS charges a reservation fee to the second entity for reserving the first product. In an embodiment, the CIMS updates the database by reversing the indication that the first product is reserved and making the first product available for reservation by the other of the different entities, when no order corresponding to the first product is received from the second entity within the reservation period.

In an embodiment, the CIMS receives a product availability request for the particular product type from the second entity. The CIMS parses the product availability request for one or more requirements associated with the product availability request. The CIMS searches the database for one or more products that match the requirement(s) associated with the product availability request. A result from the search at least shows an availability of the first product owned by the first entity. The CIMS sends information about the first product to a requestor from which the product availability request was received. In an embodiment, the CIMS restricts the search for the product(s) to only include available products owned by one or more entities identified in a whitelist associated with the second entity. In another embodiment, the CIMS restricts the search for the product(s) to not include in-stock products owned by one or more entities identified in a blacklist associated with the second entity. In another embodiment, the CIMS restricts the search for the product(s) to only include available products with a selling price that is less than or equal to a preferred maximum purchase price defined by the second entity in the product availability request. In another embodiment, the CIMS restricts the search for the product(s) to only include available products that are within a predetermined radius of a preferred destination defined in the product availability request. In another embodiment, the CIMS restricts the search for the product(s) to only include available products that are deliverable within a preferred delivery timeline specified in the product availability request.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific structures, components, and methods disclosed herein. The description of a structure, or a component, or a method step referenced by a numeral in a drawing is applicable to the description of that structure, component, or method step shown by that same numeral in any subsequent drawing herein.

DETAILED DESCRIPTION

Various aspects of the present disclosure may be embodied as a system of components and/or structures, a method, and/or non-transitory, computer-readable storage media having one or more computer-readable program codes stored thereon. Accordingly, various embodiments of the present disclosure may take the form of a combination of hardware and software embodiments comprising, for example, mechanical structures along with electronic components, computing components, circuits, microcode, firmware, software, etc.

Figure 1:
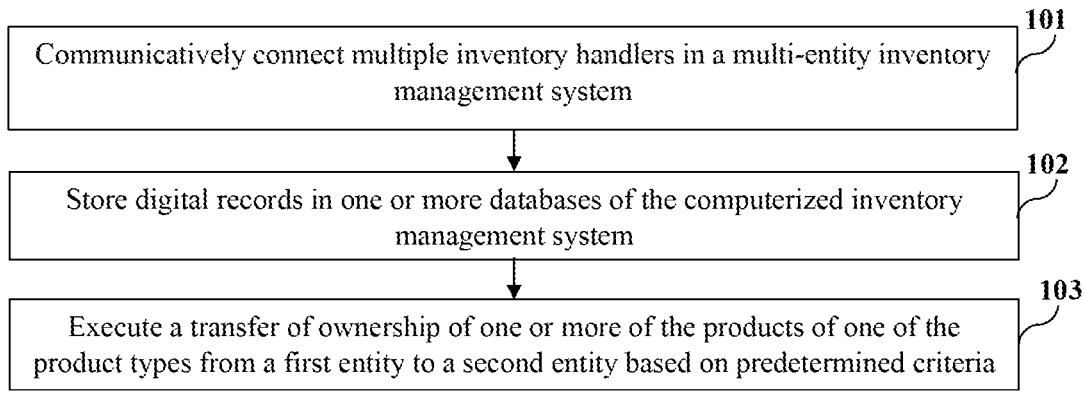
FIG. 1 illustrates a computer-implemented method for managing product inventory of multiple different entities, according to an embodiment herein.

FIG. 1 illustrates a computer-implemented method for managing product inventory of multiple different entities, according to an embodiment herein. As used herein, the term "entities" refer to inventory carriers, for example, vendors, manufacturers, suppliers, etc., who offer and manage multiple inventory items or products of different product types in a supply chain, distribution, and/or order fulfillment ecosystem. The entities have customers to whom product is to be sold. Unless otherwise disclosed, the terms "inventory items" and "products" are used interchangeably herein. In the computer-implemented method disclosed herein, multiple inventory handlers are communicatively connected 101 in a multi-entity inventory management system. As used herein, "inventory handlers" refer to different components and structures of the multi-entity inventory management system, for example, a network of facilities, gridded storage structures, storage bins, a fleet of robotic storage and retrieval vehicles, herein referred to as "robotic handlers", a fleet of inter-nodal transport vehicles, etc., that handle the product inventory offered by multiple different entities, for example, vendors, in a supply chain, distribution, and/or order fulfillment ecosystem. Also, as used herein, "storage bins" refer to smart, standardized storage units configured to contain, store, and transport products of different product types offered by different entities and customer orders through the supply chain, distribution, and/or order fulfillment ecosystem. In an embodiment, the storage bins comprising, for example, downstream-headed and upstream-headed single-compartment storage (SCS) bins, multi-compartment storage (MCS) bins, order bins such as picked-order (PO) bins, finished-order (FO) bins, etc., are all smart storage bins as disclosed below.

Figure 6A:
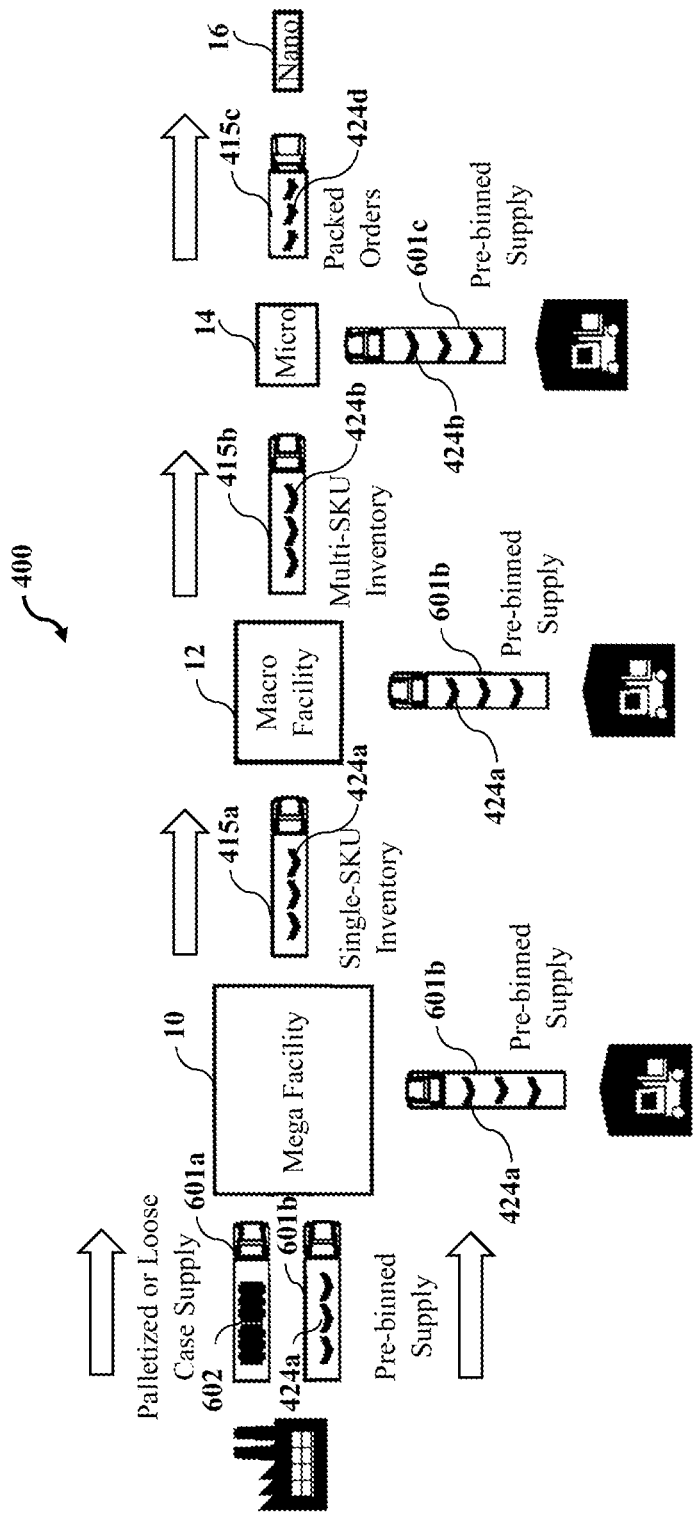
FIG. 6A illustrates a workflow of supply, inventory and order-filled storage bins in a forward or downstream direction through the multi-entity inventory management system, according to an embodiment herein.
Figure 6B:
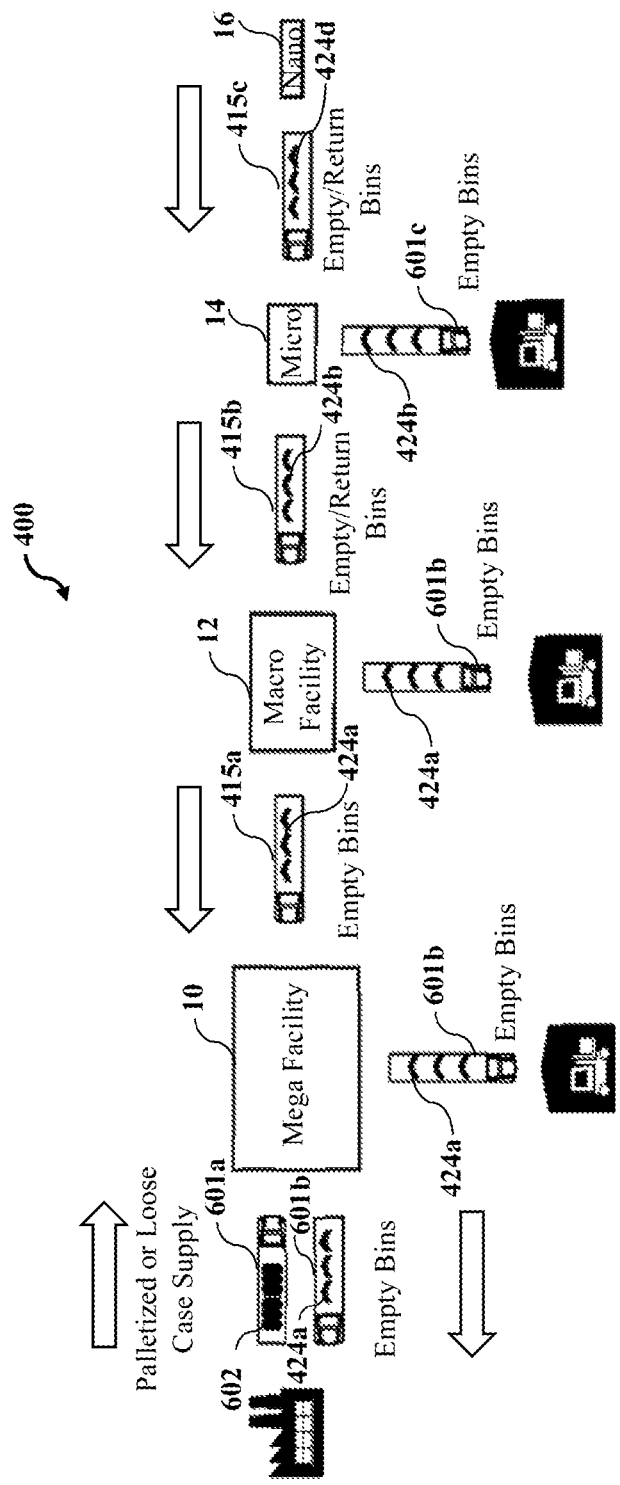
FIG. 6B illustrates a workflow of empty and customer-return storage bins in a reverse or upstream direction through the multi-entity inventory management system, according to an embodiment herein.
Figure 7:
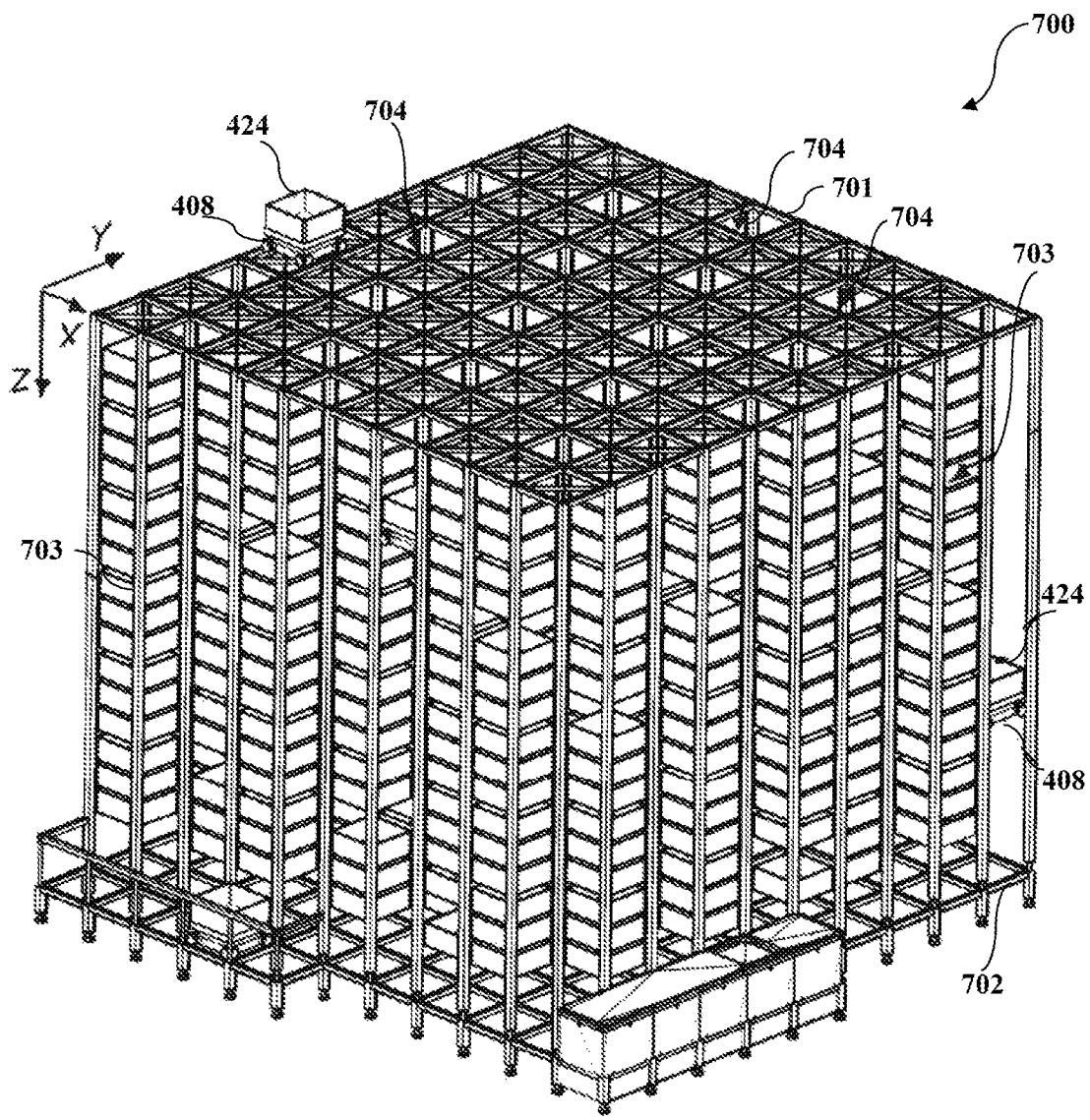
FIG. 7 illustrates a three-dimensional gridded, storage structure configured to fully or partly define a three-dimensional array of indexed storage locations within each of the mega, macro and micro facilities of the multi-entity inventory management system, according to an embodiment herein.

In the multi-entity inventory management system, the network of facilities is distributed throughout a geographical region as illustrated in FIGS. 3A-3D. In an embodiment, the network of facilities is a hierarchical network comprising at least one mega facility, at least one macro facility, and at least one micro facility as illustrated in FIGS. 6A-6B. The orders are fulfilled at the macro facility and/or the micro facility. Each of the facilities comprises a facility-based array of indexed storage locations as illustrated in FIG. 7. The robotic handlers are operable at each of the facilities. Each of the robotic handlers is configured to navigate any one of the storage bins through the facility-based array of indexed storage locations provided at each of the facilities and selectively deposit the storage bin(s) thereto and retrieve the storage bin(s) therefrom. The fleet of inter-nodal transport vehicles transport multiple products contained in storage bins between the facilities. Each of the inter-nodal transport vehicles comprises a vehicle-based array of indexed storage locations. In an embodiment, the fleet of inter-nodal transport vehicles comprises dedicated-service transport vehicles, each respectively assigned to service a specific pair of the facilities, and/or service a limited subset of the facilities, and/or service a limited service area containing two or more of the facilities. The fleet of inter-nodal transport vehicles loads and unloads the storage bins autonomously. In an example, at least one product in at least one of the storage bins is transferred from a first facility to a third facility through an intermediary second facility by transporting at least one of the storage bins from the first facility to the intermediary second facility in a first dedicated-service transport vehicle assigned to service at least the first and second facilities, and by transporting at least one of the storage bins from the intermediary second facility to the third facility in a second dedicated-service transport vehicle assigned to service at least the second and third facilities. In an embodiment, the first dedicated-service transport vehicle is not assigned to service the third facility, while the second dedicated-service transport vehicle is not assigned to service the first facility.

The storage bins are storable within the network of facilities, reassignable between the different entities, and transportable between the facilities by the inter-nodal transport vehicles. In an embodiment, the storage bins are categorized into first category storage bins containing unmixed products of a matching product type, second category storage bins containing mixed products of a non-matching product type, and third category storage bins configured as order bins for fulfilling the orders. Each of the storage bins is of a standardized size and is configured to receive one or more of a plurality of eaches of the products. After initial induction at a facility, in an embodiment, all transactions in the inventory management workflow execution are performed with respect to eaches. The ability of the storage bins to receive and handle eaches allows handling of inventory sold within the supply chain ecosystem at an "each" level and replenished with "just enough" inventory, rather than replenishing at a "case" level. For example, if a micro facility requires only seven units of a particular product, the method disclosed herein allows transfer of only seven units of that product to the micro facility using the transportable storage bins instead of transferring a whole case, thereby substantially reducing storage requirements at the micro facility. Moreover, each of the storage bins is of a configuration compatible with the facility-based array of indexed storage locations and the vehicle-based array of indexed storage locations for selective storage and continuous tracking of any one of the storage bins at any one of the facilities, in any one of the inter-nodal transport vehicles, and between any one of the facilities and any one of the inter-nodal transport vehicles.

The storage bins communicate their status and location in the multi-entity inventory management system to a computerized inventory management system (CIMS) while they traverse the network of facilities and the fleet of inter-nodal transport vehicles of the multi-entity inventory management system in a forward direction and a reverse direction. In an embodiment, the CIMS comprises one or more management subsystems distributed across the network of facilities and the fleet of inter-nodal transport vehicles travelling between the facilities, and operably coupled to a central computing system via the communication network. In an embodiment, each of the storage bins is continuously trackable at any one of the facilities, in any one of the inter-nodal transport vehicles, and between any one of the facilities and any one of the inter-nodal transport vehicles in real time or near real time. In an embodiment, the storage bins are configured to contain one or more of a plurality of products owned by one or more of a plurality of vendors. In an embodiment, the CIMS is configured to activate the robotic handlers to fill one or more of the products of one or more of the product types offered by one or more of the different entities into at least one of the storage bins.

In the computer-implemented method disclosed herein, the CIMS stores 102 digital records in one or more databases of the CIMS. In an embodiment, the digital records comprise entity identifiers of the different entities, one or more product catalogues containing product identifiers of the products of a plurality of product types offered by each of the different entities to customers, and unique bin identifiers assigned to the storage bins. For any one of the storage bins containing one or more of the products from the product catalogue(s), the digital records comprise an association of a unique bin identifier of any one of the storage bins with an entity identifier of at least one of the different entities, a product identifier of each of one or more of the products, and a product quantity of each of the products.

Furthermore, in the computer-implemented method disclosed herein, the CIMS executes 103 a transfer of ownership of one or more of the products of a particular product type from a first entity to a second entity based on predetermined criteria. In an embodiment, the first entity is a stocked entity and the second entity is a needful entity. The predetermined criteria comprise, for example, at least one of an inventory shortfall of the second entity for the product(s) of the particular product type, a complete absence of the product(s) of the particular product type in an inventory of the second entity, and orders for the products being received. In an embodiment, the inventory shortfall is a local shortfall at one of the facilities, where the second entity holds additional products of the particular product type in another one of the storage bins residing at another one of the facilities. In an embodiment, for executing the transfer of ownership, the CIMS identifies at least one of the storage bins containing one or more of the products of the particular product type; and updates the digital records to change the entity identifier associated with the identified storage bin(s) from the entity identifier of the first entity to the entity identifier of the second entity, thereby reassigning the product(s) of the particular product type from the first entity to the second entity. In an embodiment, the CIMS stores the entity identifier of the first entity or the second entity, the product identifier of the product(s), and the product quantity of the product(s) in a mobile data storage device operably coupled to the identified storage bin(s). In another embodiment, the CIMS updates the digital records with an association of the unique bin identifier of the identified storage bin(s) with a unique facility identifier of one of the facilities at which the identified storage bin(s) resides. In an embodiment, when the CIMS triggers a transfer of the identified storage bin(s) from one of the facilities to another one of the facilities, the CIMS updates the digital records with an association of the unique bin identifier of the identified storage bin(s) with a unique facility identifier of the other facility to which the identified storage bin(s) is transferred.

In an embodiment, any one or more of the storage bins comprise a plurality of compartments configured to accommodate the products of the different entities. Each of the compartments is identified by a compartment identifier and is configured to accommodate one or more of the products offered by a corresponding one of the different entities. The CIMS updates the digital records with an association of the compartment identifier of a respective one of the compartments to the product identifiers of the products accommodated in the respective compartment of the storage bin(s) and to the entity identifier of the corresponding one of the different entities whose products are accommodated in the storage bin(s).

In an embodiment, the CIMS digitally transfers one or more of the products of the particular product type from the first entity to the second entity, while the product(s) resides in any one of the facilities or an inter-nodal transport vehicle traveling between two of the facilities. Other embodiments of the execution of a transfer of ownership of one or more of the products of a particular product type from a first entity to a second entity are disclosed in the detailed descriptions of FIG. 2, FIGS. 8A-8B, FIGS. 9A-9B, FIGS. 10-12, and FIG. 16. In another embodiment, the CIMS executes inter-vendor commerce as disclosed in the detailed descriptions of FIGS. 9A-9B, FIGS. 10-12, and FIG. 16.

Figure 2:
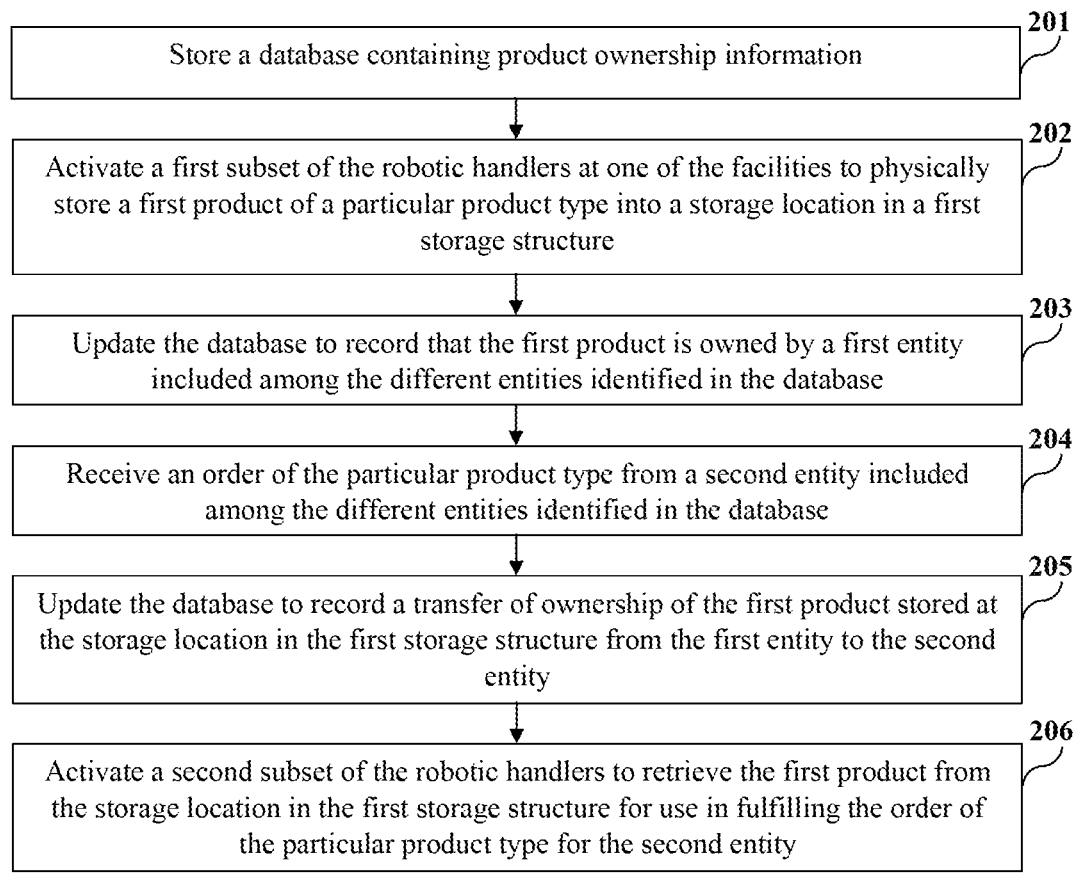
FIG. 2 illustrates a computer-implemented method for managing product inventory of multiple different entities at one or more of multiple facilities comprising one or more storage structures served by robotic handlers, according to an embodiment herein.

FIG. 2 illustrates a computer-implemented method for managing product inventory of multiple different entities at one or more of multiple facilities comprising one or more storage structures served by robotic handlers, according to an embodiment herein. The computerized inventory management system (CIMS) comprises a network interface coupled to a communication network, for example, the internet, one or more storage devices, and one or more processors coupled to the network interface and the storage device(s). The storage device(s) stores 201 a database containing product ownership information. The product ownership information comprises, for example, identification of the plurality of different entities, for example, vendors. The processor(s) is configured to execute a plurality of computer program instructions loaded from the storage device(s) for performing the method for managing product inventory of different entities at one or more of the facilities comprising one or more storage structures served by robotic handlers.

In this embodiment, the CIMS activates 202 a first subset of the robotic handlers at one of the facilities, herein referred to as a "first facility", to physically store a first product of a particular product type into a storage location in a first storage structure. Before or after activating the first subset of the robotic handlers, the CIMS updates 203 the database to record that the first product is owned by a first entity included among the plurality of different entities identified in the database. The CIMS receives 204, via the communication network, an order of the particular product type from a second entity included among the plurality of different entities identified in the database, the second entity being different than the first entity. In an embodiment, the second entity is a needful entity who needs product inventory and the first entity is a stocked entity having additional product inventory to transfer to the needful entity. The CIMS updates 205 the database to record a transfer of ownership of the first product stored at the storage location in the first storage structure from the first entity to the second entity. The CIMS activates 206 a second subset of the robotic handlers to retrieve the first product from the storage location in the first storage structure for use in fulfilling the order of the particular product type for the second entity. The CIMS executes the transfer of the ownership of the first product from the first entity to the second entity at any time corresponding to the retrieval of the first product from the storage location in the first storage structure and/or the fulfillment of the order of the particular product type for the second entity. For example, in an embodiment, the CIMS executes the transfer of the ownership of the first product stored at the storage location in the first storage structure from the first entity to the second entity prior to activating the second subset of the robotic handlers to retrieve the first product from the storage location in the first storage structure. In another embodiment, the CIMS executes the transfer of the ownership of the first product stored at the storage location in the first storage structure from the first entity to the second entity after activating the second subset of the robotic handlers to retrieve the first product from the storage location in the first storage structure. The transfer of the ownership can, therefore, occur before or after the second subset of the robotic handlers are dispatched and the product is picked. In another embodiment, the CIMS executes the transfer of ownership of the first product from the first entity to the second entity after fulfillment of the order.

In an embodiment, the CIMS updates the database to record the transfer of the ownership of the first product at the storage location in the first storage structure from the first entity to the second entity in response to determining that the second entity has an inventory shortfall of the particular product type and is unable to fulfill the order of the particular product type. In another embodiment, the CIMS updates the database to record the transfer of the ownership of the first product at the storage location in the first storage structure from the first entity to the second entity by verifying that the second entity is purchasing the first product from the first entity and updating the database to record the second entity purchasing the first product from the first entity.

In an embodiment, the CIMS activates a third subset of the robotic handlers that is different from the first subset of the robotic handlers and the second subset of the robotic handlers to physically store a second product of the particular product type into a storage location in a second storage structure. The second storage structure is located at a different facility, herein referred to as a "second facility", than the first storage structure. In an embodiment, the first storage structure and the second storage structure are located in different cities. Before or after activating the third subset of the robotic handlers, the CIMS updates the database in the storage device(s) to record that the second product stored at the storage location in the second storage structure is owned by the second entity. After receiving the order, the CIMS updates the database to record a transfer of ownership of the second product at the storage location in the second storage structure from the second entity to the first entity, whereby the ownership of the first product and the second product is swapped between the first entity and the second entity.

In an embodiment, when activating the first subset of the robotic handlers to store the first product in the storage location in the first storage structure, the CIMS activates the first subset of the robotic handlers to physically store the first product in the first storage structure within a first storage bin. When activating the third subset of the robotic handlers to store the second product in the storage location in the second storage structure, the CIMS activates the third subset of the robotic handlers to physically store the second product in the second storage structure within a second storage bin. After receiving the order, the CIMS updates the database to record a transfer of ownership of content of the first storage bin from the first entity to the second entity and ownership of content of the second storage bin from the second entity to the first entity, whereby the ownership of the content of the first storage bin and the ownership of the content of the second storage bin are swapped between the first entity and the second entity. The CIMS activates a fourth subset of the robotic handlers to retrieve the first storage bin from the first storage structure and thereby fulfills the order of the particular product type for the second entity. The CIMS executes the transfer of the ownership of the content of the first storage bin from the first entity to the second entity and the transfer of the ownership of the content of the second storage bin from the second entity to the first entity at any time corresponding to the activation of the robotic handlers and/or the fulfillment of the order of the particular product type for the second entity, for example, before or after the robotic handlers are dispatched and the product picked or even after the order is fulfilled.

In an embodiment, before receiving the order and before or after activating the first subset of the robotic handlers, the CIMS updates the database in the storage device(s) to record that the content of the first storage bin is owned by the first entity. Before receiving the order and before or after activating the third subset of the robotic handlers, the CIMS updates the database in the storage device(s) to record that the content of the second storage bin is owned by the second entity. In an embodiment, the CIMS queries the database to determine whether the content of the first storage bin is equal to the content of the second storage bin. After receiving the order, the CIMS updates the database to record the ownership of the content of the first storage bin and the second storage bin being swapped at least partly in response to determining that the content of the first storage bin is equal to the content of the second storage bin. In response to a determination that the content of the first storage bin and the content of the second storage bin are not equal, the CIMS performs at least one of the following: (a) activates a robotic worker at the first facility to equalize the content of the first storage bin relative to the content of the second storage bin; (b) activates, at the first facility, (i) a fifth subset of the robotic handlers to deliver the first storage bin to a human-attended workstation, and (ii) a human-machine interface (HMI) to instruct a human worker of the human-attended workstation to equalize the content of the first storage bin relative to the content of the second storage bin; (c) activates a robotic worker at the second facility to equalize the content of the second storage bin relative to the content of the first storage bin; and (d) activates, at the second facility, (i) a sixth subset of the robotic handlers to deliver the second storage bin to a human-attended workstation, and (ii) an HMI of the human-attended workstation to instruct a human worker of the human-attended workstation to equalize the content of the first storage bin relative to the content of the second storage bin. In an embodiment, the CIMS activates another subset of the robotic handlers to retrieve the second product from the second storage structure for relocation of the second product to the first facility after updating the database to record the transfer of the ownership of the second product at the storage location in the second storage structure from the second entity to the first entity.

In an embodiment, the CIMS executes an inventory reservation method for ensuring the availability of inventory before the inventory reassignment takes place as disclosed in the detailed descriptions of FIGS. 13-16. In this embodiment, the CIMS receives a reservation message from the second entity requesting that the particular product type be reserved prior to receiving the order for the particular product type from the second entity. The CIMS queries the database to confirm that the first product is available for reservation. The CIMS reserves the first product for the second entity by recording in the database an indication that the first product is reserved for the second entity after confirming that the first product is available. The CIMS starts a reservation period during which the first product is exclusively held for the second entity, such that the first product is unavailable for reservations by other of the different entities. In an embodiment, the CIMS charges a reservation fee to the second entity for reserving the first product. In an embodiment, the CIMS updates the database by reversing the indication that the first product is reserved and making the first product available for reservation by the other of the different entities, when no order corresponding to the first product is received from the second entity within the reservation period.

In an embodiment, the CIMS receives a product availability request for the particular product type from the second entity. The CIMS parses the product availability request for one or more requirements associated with the product availability request. The CIMS searches the database for one or more products that match the requirement(s) associated with the product availability request. A result from the search at least shows an availability of the first product owned by the first entity. The CIMS sends information about the first product to a requestor from which the product availability request was received. In an embodiment, the CIMS restricts the search for the product(s) to only include available products owned by one or more entities identified in a whitelist associated with the second entity. In another embodiment, the CIMS restricts the search for the product(s) to not include in-stock products owned by one or more entities identified in a blacklist associated with the second entity. In another embodiment, the CIMS restricts the search for the product(s) to only include available products with a selling price that is less than or equal to a preferred maximum purchase price defined by the second entity in the product availability request. In another embodiment, the CIMS restricts the search for the product(s) to only include available products that are within a predetermined radius of a preferred destination defined in the product availability request. In another embodiment, the CIMS restricts the search for the product(s) to only include available products that are deliverable within a preferred delivery timeline specified in the product availability request.

FIGS. 3A-3D illustrate a national supply chain ecosystem comprising a four-tiered hierarchical network of facilities of different types or categories, according to an embodiment herein. The national supply chain ecosystem implements a multi-entity inventory management system comprising multiple interconnected inventory handlers configured to execute supply chain and inventory management workflows. In an embodiment, the multi-entity inventory management system is implemented as a continuous and contiguous fulfillment as a service (FaaS) network. The multi-entity inventory management system disclosed herein is a predictive and prescriptive, collaborative network that implements class-based, proximity-based fulfillment where products are fulfilled from the closest endpoint to a destination address. The interconnected inventory handlers comprise the network of facilities, gridded storage structures, the robotic handlers, the inter-nodal transport vehicles, and multiple storage bins storable within the network of facilities, reassignable between the different entities, transportable between the facilities, and continuously trackable in real time throughout the supply chain ecosystem as disclosed in the detailed descriptions of FIGS. 4A-4C. The multi-entity inventory management system disclosed herein is implemented as a single continuous organism with a variety of differing, connected, purpose-built organs or components, rather than discrete transactional components.

The multi-entity inventory management system is configured for compatibility, storage, reassignment, exchange, transport, and movement of the storage bins. The storage bins disclosed herein act as a master to the other interconnected inventory handlers, for example, the facilities, the fleet of inter-nodal transport vehicles, the robotic handlers, etc., of the multi-entity inventory management system. The storage bins associate their respective bin identifiers to logistics instructions, for example, destination locations and process level instructions such as environmental requirements, packing instructions, etc. In an embodiment, the storage bins disclosed herein have a single form factor and structure for interfacing with standard, compliant robotics and the inter-nodal transport vehicles throughout the supply chain ecosystem. The storage bins dictate and control their own actions, course, and journey through the supply chain ecosystem with the facilities, the robotic handlers, and the inter-nodal transport vehicles acting as enablers to the commands of the storage bins. That is, all the interconnected inventory handlers within the multi-entity inventory management system incorporate material handling equipment specifically configured to manage the storage bins.

Figure 3A:
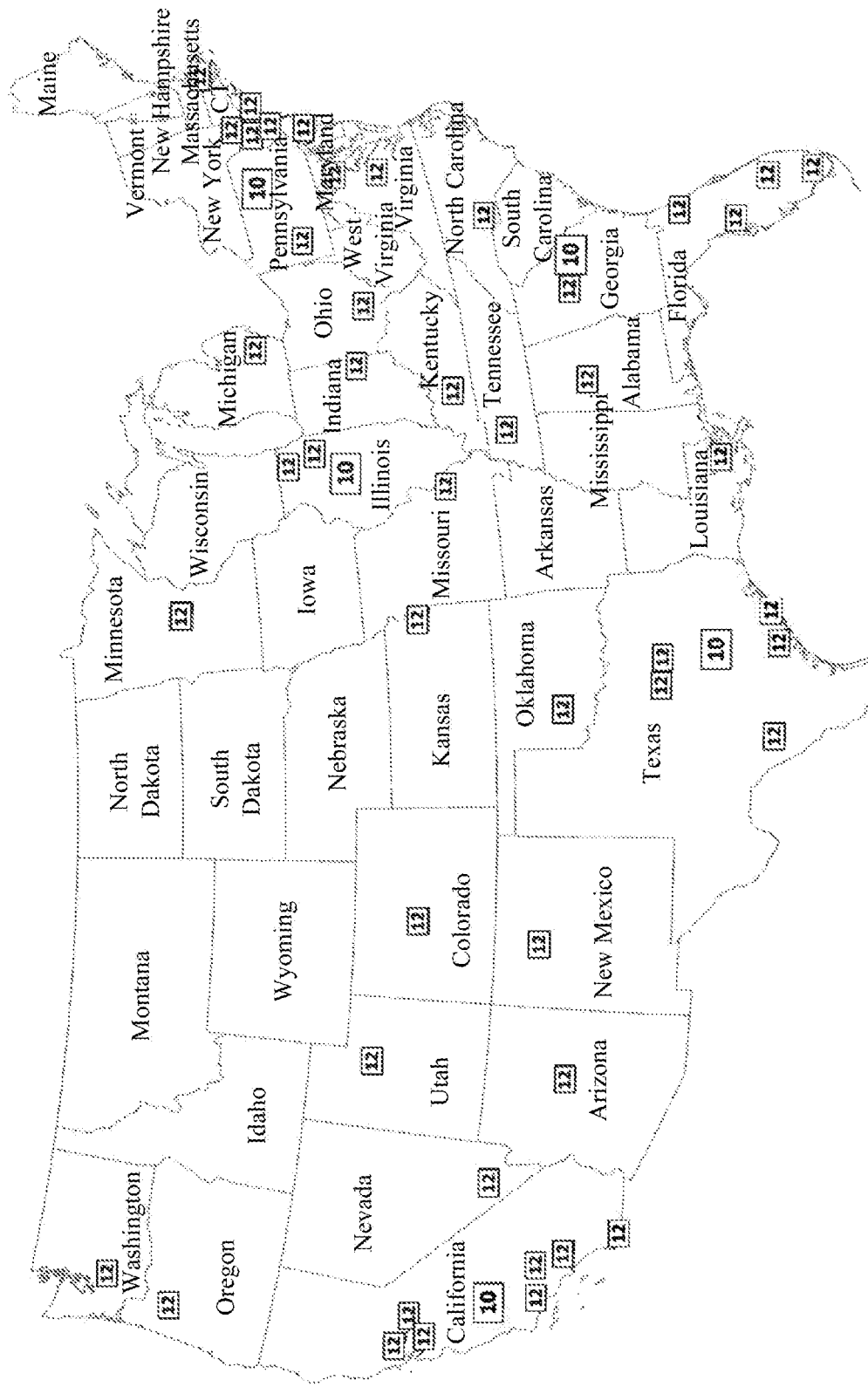
FIG. 3A illustrates distribution, on a national scale, of mega and macro facilities of a multi-entity inventory management system, according to an embodiment herein.
Figure 3B:
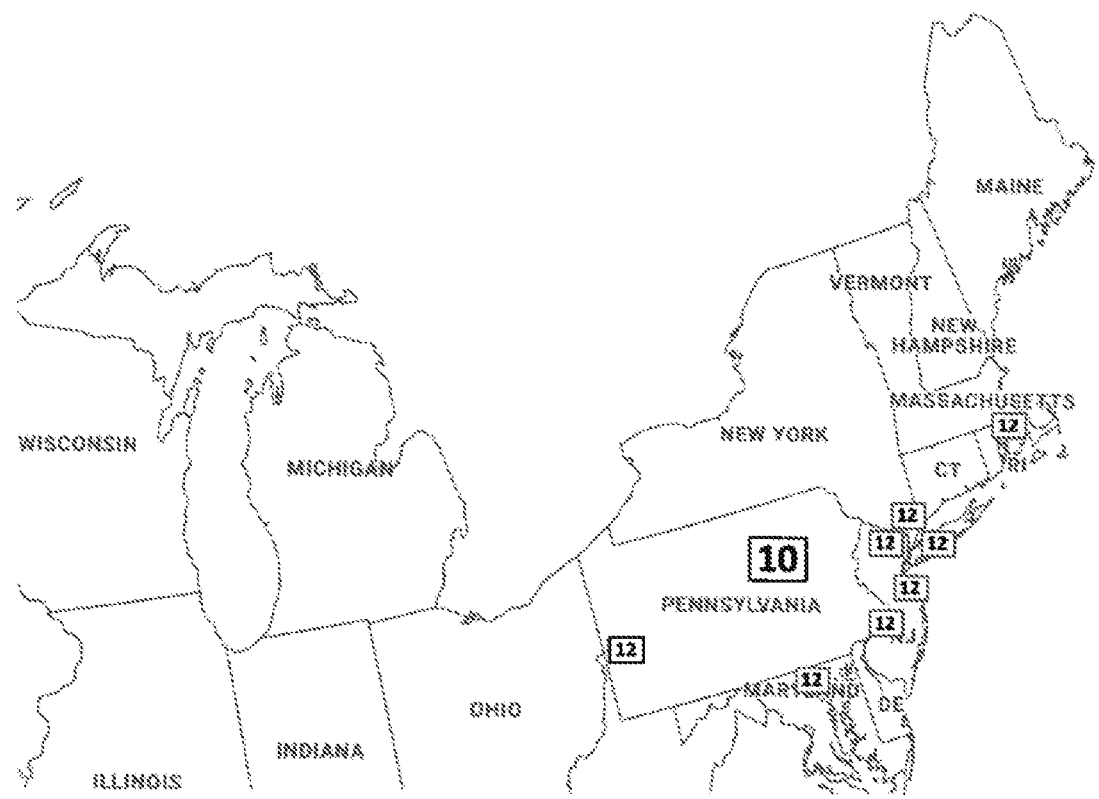
FIG. 3B illustrates distribution, on a regional level, of the mega and macro facilities of the multi-entity inventory management system, according to an embodiment herein.
Figure 3C:
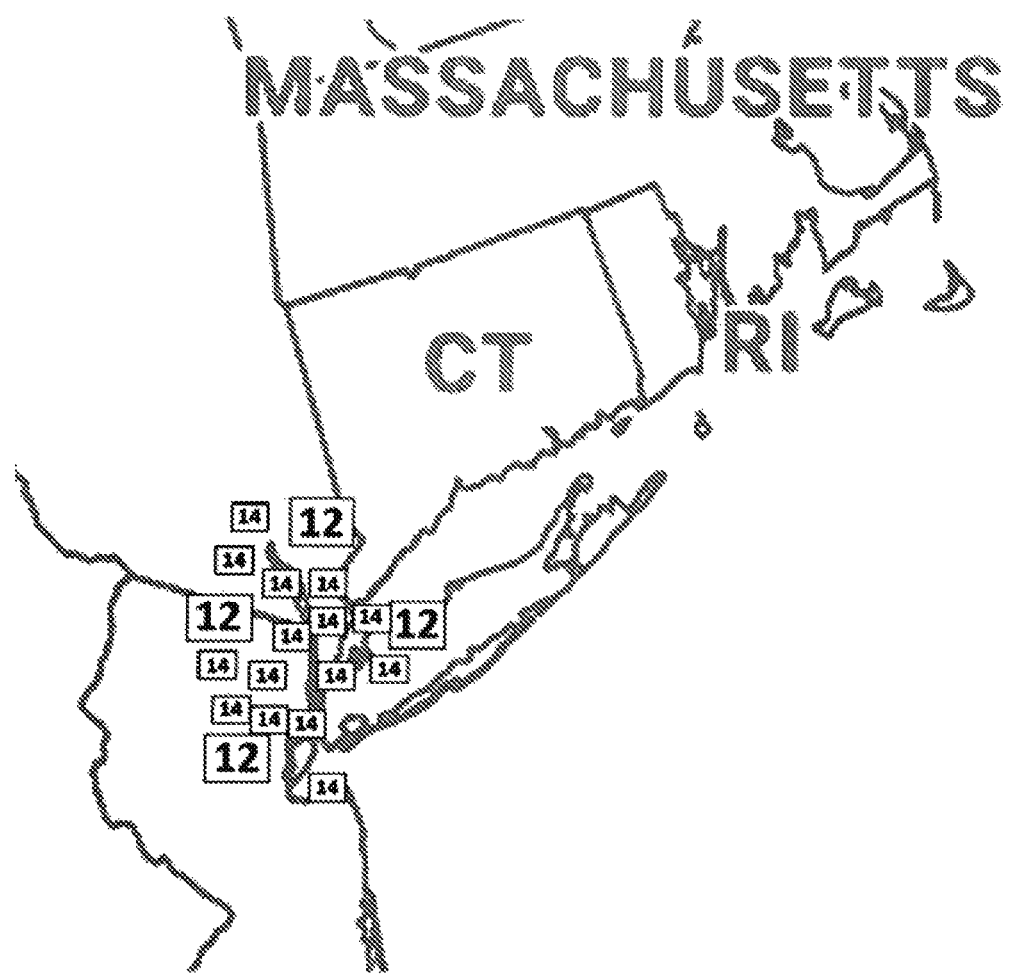
FIG. 3C illustrates distribution, on a civic level, of macro and micro facilities of the multi-entity inventory management system, according to an embodiment herein.
Figure 3D:
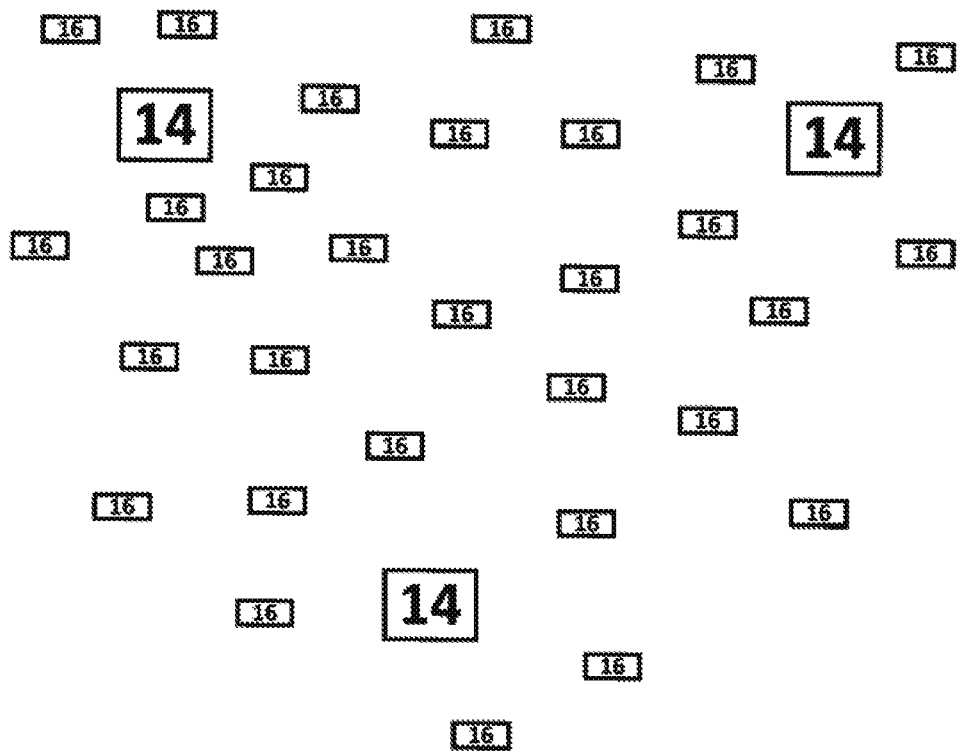
FIG. 3D illustrates distribution, on a divisional level, of micro and nano facilities of the multi-entity inventory management system, according to an embodiment herein.

As illustrated in FIGS. 3A-3D, the network of facilities comprises mega facilities 10, macro facilities 12, micro facilities 14, and nano facilities 16. FIG. 3A illustrates distribution, on a national scale, of the mega facilities 10 and the macro facilities 12 of the multi-entity inventory management system, according to an embodiment herein. In an embodiment, the multi-entity inventory management system is configured as a national supply chain network. FIG. 3B illustrates distribution, on a regional level, of the mega facilities 10 and the macro facilities 12 of the multi-entity inventory management system, according to an embodiment herein. FIG. 3C illustrates distribution, on a civic level, of the macro facilities 12 and the micro facilities 14 of the multi-entity inventory management system, according to an embodiment herein. FIG. 3D illustrates distribution, on a divisional level, of the micro facilities 14 and the nano facilities 16 of the multi-entity inventory management system, according to an embodiment herein. In this ordered, multi-entity inventory management system, the quantity of facilities in each category increases from one category to the next, while the individual size of each facility reduces from one category to the next. That is, there are fewer mega facilities 10 than macro facilities 12, fewer macro facilities 12 than micro facilities 14, and fewer micro facilities 14 than nano facilities 16. The macro facilities 12 are smaller than the mega facilities 10, the micro facilities 14 are smaller than the macro facilities 12, and the nano facilities 16 are smaller than the micro facilities 14. In an embodiment, the mega facilities 10 form entry points at which products from manufacturers or suppliers first enter the network of facilities, while the nano facilities 16 form exit points from which products depart the network of facilities. In other embodiments, the products may enter and depart the network of facilities at various points.

The network of facilities, along with the inter-nodal transport vehicles used for transporting products between the facilities, collectively form a supply chain ecosystem that may be owned and operated by a singular operating entity, under whose control and responsibility the products remain from their initial receipt from external suppliers to their final release to customers or an outside last mile or last leg delivery service. In an embodiment, the operating entity is contracted to manage inventory and order fulfillment on behalf of other external entities, for example, vendors, that sell to consumers or other businesses. In an embodiment, the operating entity's supply chain ecosystem is supplemented by like-equipped supply chain or distribution channel facilities and/or transport vehicles of one or more larger vendors that partner with or contract the operating entity to exploit the large collective supply chain ecosystem cooperatively formed therebetween.

For purposes of illustration, the multi-entity inventory management system disclosed herein is implemented in a national supply chain ecosystem as illustrated in FIGS. 3A-3D; however, the particular geographic area over which the network of facilities of the multi-entity inventory management system is distributed is not limited to one of national scope and may expand beyond national boundaries, or may be limited to a sub-region of lesser expanse, regardless of whether the sub-region spans across one or more international borders. In an embodiment, at least some of the mega facilities 10 are located in coastal regions near major shipping ports, thereby accommodating arrival of incoming manufacturer or supply shipments via ocean freight. In an embodiment, the macro facilities 12 are located in or proximate to large population centers, for example, metropolitan areas and/or major shipping hubs, in a quantity of one macro facility 12 per such population center or shipping hub. In an embodiment, at least one micro facility 14, and in another embodiment, a plurality of micro facilities 14 are also included at these large population centers. Smaller cities have macro facilities 12, though typically at a ratio of one macro facility 12 per such city, or one macro facility 12 shared between cities of notable proximity. Each city has a plurality of micro facilities 14 exceeding the quantity macro facilities 12 found in or near such city, and a plurality of nano facilities 16 of even greater quantity than the micro facilities 14.

The mega facilities 10, the macro facilities 12, and the micro facilities 14, each comprises at least one loading dock, and in an embodiment, multiple loading docks, particularly at the mega facilities 10 and the macro facilities 12, for allowing simultaneous loading and unloading of multiple transport vehicles, and/or cross-docking operations between transport vehicles at inbound and outbound loading docks. In the multi-entity inventory management system disclosed herein, each facility in the network of facilities from the mega facilities 10 to the nano facilities 16 comprises a respective array of indexed storage locations, herein referred to as an "indexed storage array". In an embodiment, at each of the mega facilities 10, the macro facilities 12, and the micro facilities 14, the indexed storage array is defined at least partially by one or more three-dimensional gridded storage structures of the type illustrated in FIG. 7, which is served by a fleet of robotic handlers operable to traverse the gridded storage structure in three dimensions to deposit and extract storage bins to and from the three-dimensional gridded storage structure. Such three-dimensional gridded storage structures, robotic handlers, that is, the robotic storage and retrieval vehicles, and compatible storage bins are disclosed in Applicant's U.S. patent application Ser. Nos. 15/568,646; 16/374,123, 16/374,143; and 16/354,539; each of which is incorporated herein by reference in its entirety. Furthermore, exemplarily layouts of the mega facilities 10, the macro facilities 12, and the micro facilities 14 are disclosed in Applicant's U.S. Non-provisional patent application Ser. No. 16/805,810, which is incorporated herein by reference in its entirety.

Figure 4A:
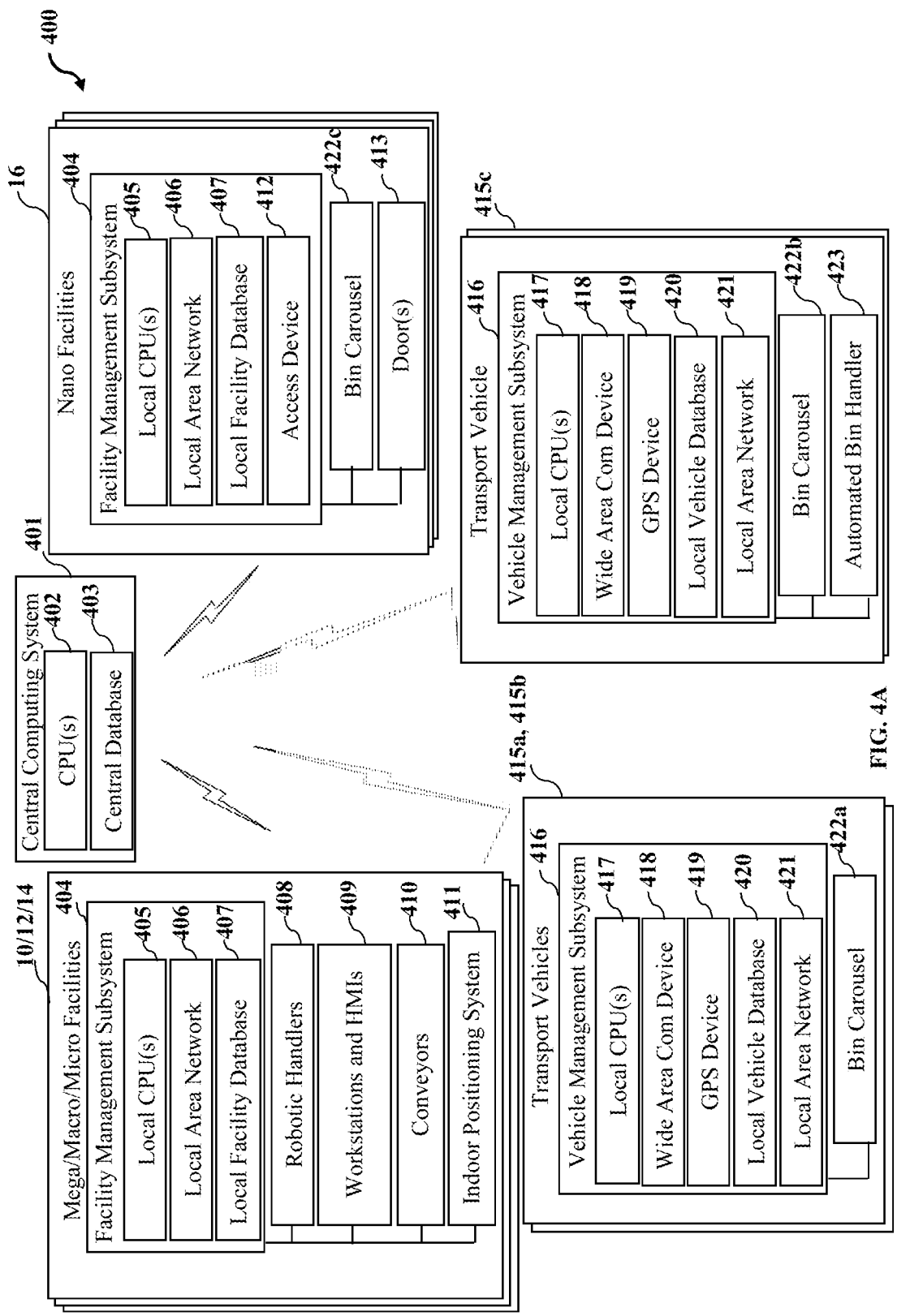
FIG. 4A illustrates a functional block diagram of the multi-entity inventory management system for executing an inventory management workflow using inventory handlers, according to an embodiment herein.

FIG. 4A illustrates a functional block diagram of the multi-entity inventory management system 400 for executing an inventory management workflow using inventory handlers, according to an embodiment herein. The multi-entity inventory management system 400 comprises a computerized inventory management system (CIMS) 401, 404, and 416 for monitoring and controlling movement of storage bins and order bins throughout the multi-entity inventory management system 400. The CIMS controls and monitors induction, storage, transport, and tracking of inventory contained in the storage bins and fulfillment of customer orders therefrom, within the multi-entity inventory management system 400. The CIMS comprises multiple computer systems and subsystems that are programmable using high-level computer programming languages. In an embodiment as illustrated in FIG. 4A, the CIMS is a combination of a central computing system 401, a computerized facility management subsystem 404 configured at each of the mega facilities 10, the macro facilities 12, the micro facilities 14, and the nano facilities 16, and a computerized vehicle management subsystem 416 configured in each of the inter-nodal transport vehicles 415a, 415b, and 415c. The CIMS is implemented using programmed and purposeful hardware.

The central computing system 401 comprises one or more computers comprising one or more processors, for example, central processing units (CPUs) 402 connected to a network interface coupled to a communication network, for example, the internet or other wide area network, and one or more data storage devices comprising non-transitory, computer-readable storage media or memory among which there is stored executable software for execution by the processors to execute multiple processes disclosed herein. The communication network allows the facility management subsystems 404 to communicate with each other and with the central computing system 401. As used herein, "non-transitory, computer-readable storage media" refers to all computer-readable media, for example, non-volatile media, volatile media, and transmission media, except for a transitory, propagating signal. Non-volatile media comprise, for example, solid state drives, optical discs or magnetic disks, flash memory cards, a read-only memory (ROM), etc. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor. The data storage devices comprise one or more databases, for example, a central database 403 in which, among other data disclosed below, stores unique bin identifiers (Bin_IDs) of all the storage bins and order bins 424a-424d in the multi-entity inventory management system 400 illustrated in FIGS. 5E-5F and FIGS. 6A-6B, unique identifiers (Vendor_IDs) of multiple vendors who have contracted or subscribed to the services of the operating entity for the purpose of inventory storage and order fulfillment within the multi-entity inventory management system 400; and respective product catalogues of products that are offered by the vendors to their customers, and are stored or storable within the multi-entity inventory management system 400. As used herein, the term "central" in relation to the central computing system 401 and the central database 403 hosted thereby merely denotes its status as a shared resource operably connected to each of the facilities 10, 12, 14 and 16 and each of the inter-nodal transport vehicles 415a, 415b, and 415c of the multi-entity inventory management system 400, and does not denote that its components must all reside at a common location.

In an embodiment, the CIMS 401, 404, and 416 is implemented in a cloud computing environment. As used herein, "cloud computing environment" refers to a processing environment comprising configurable computing physical and logical resources, for example, networks, servers, storage media, virtual machines, applications, services, etc., and data distributed over a communication network. The cloud computing environment provides an on-demand network access to a shared pool of the configurable computing physical and logical resources. The CIMS 401, 404, and 416 is a cloud computing-based platform implemented as a service for executing an inventory management workflow with two-way logistics using transportable storage bins. In this embodiment, the central computing system 401 and the central database 403 are herein referred to as a cloud-based computer platform and a cloud database respectively. In an embodiment, the facility management subsystem 404 is implemented as an on-premise software installed and run on computers on the premises of each of the facilities 10, 12, 14, and 16. In an embodiment, the vehicle management subsystem 416 is implemented as an on-premise software installed and run on computers on the premises of each of the inter-nodal transport vehicles 415a, 415b, and 415c.

The computerized facility management subsystem 404 is respectively installed at each of the facilities 10, 12, 14, and 16 in the multi-entity inventory management system 400. Each facility management subsystem 404 comprises one or more local computers comprising one or more processors, for example, central processing units (CPUs) 405 connected to a network interface coupled to the communication network, for example, the internet or other wide area network, and one or more data storage devices comprising non-transitory, computer-readable storage media in which there is stored executable software for execution by one more processors to execute multiple processes disclosed herein. The data storage devices comprise one or more databases, for example, a respective local facility database 407 for storing data pertinent to the respective facility. In addition to their connection to the wide area network, the local computers of the facility management subsystem 404 are installed in one or more local area networks 406, for example, local wireless networks, of the facility, by which at least one of the local computers are communicable with automated bin handling equipment of the facility. The automated bin handling equipment comprises, for example, the robotic handlers 408 at the mega facilities 10, the macro facilities 12, and the micro facilities 14, and various conveyors 410 and other handling equipment disclosed below in select embodiments. Over the local area networks 406, at least one of the local computers of the facility management subsystem 404 also communicates with workstations and other equipment and devices comprising, for example, stationary and/or mobile human-machine interfaces (HMIs) 409 for guiding performance of various tasks by human workers, conveyors 410, and the storage bins of the multi-entity inventory management system 400. In an embodiment, the multi-entity inventory management system 400 further comprises an indoor positioning system 411 in operable communication with the facility management subsystem 404 of each of the facilities 10, 12, 14, and 16 for real-time tracking of each of the storage bins as disclosed in the detailed description of FIG. 4B. In an embodiment, the facility management subsystem 404 is operably and communicatively coupled to bin handling equipment, for example, bin carousels 422c and doors 413, for example, openable delivery doors and openable pickup doors at each of the nano facilities 16 as disclosed in Applicant's U.S. Non-provisional patent application Ser. No. 16/805,810, which is incorporated herein by reference in its entirety. Furthermore, the facility management subsystem 204 of a nano facility 16 grants access of an order stored in the nano facility 16 to a user only if the user enters the correct order-pickup access code in an electronic access device 412, for example, a numeric or alphanumeric keypad, a scanner, etc., mounted on or near the exterior of the nano facility 16 for the order.

The computerized vehicle management subsystem 416 is respectively installed in each of the inter-nodal transport vehicles 415a, 415b, and 415c of the multi-entity inventory management system 400. Each vehicle management subsystem 416 comprises one or more local computers comprising one or more processors, for example, central processing units (CPUs) 417 connected to one or more data storage devices comprising non-transitory, computer-readable storage media in which there is stored executable software for execution by the processors to execute multiple processes disclosed herein. The data storage devices comprise a respective local vehicle database 420 that stores data pertinent to that particular transport vehicle and the transported contents thereof. In an embodiment, a wireless communications unit is operably coupled to each of the inter-nodal transport vehicles 415a, 415b, and 415c. The wireless communications unit, for example, a wide area communication device 418, is configured to communicate the location of each of the inter-nodal transport vehicles 415a, 415b, and 415c and the location of any one of the storage bins to the CIMS during transport of the storage bins between the facilities 10, 12, 14, 16. For example, the processors of the vehicle management subsystem 416 are connected to a wireless wide area communications device 418, for example, a cellular communications device, for mobile communication with the central computing system 401 over a wireless wide area network, for example, a cellular network. In an embodiment, a positioning unit, for example, a global positioning system (GPS) device 419 is operably coupled to each of the inter-nodal transport vehicles 415a, 415b, and 415c. The positioning unit is configured to determine a location of each of the inter-nodal transport vehicles 415a, 415b, and 415c and in turn determine a location of any one of the storage bins being transported in each of the inter-nodal transport vehicles 415a, 415b, and 415c. The GPS device 419 is also connected to at least one processor of at least one of the local computers of each transport vehicle 415a, 415b, and 415c for tracking the movement of the respective transport vehicles 415a, 415b, and 415c via the GPS and sharing the calculated GPS coordinates of the respective transport vehicles 415a, 415b, and 415c to the respective local computers for communication onward to the central computing system 401. In an embodiment, the GPS device 419 of each of the transport vehicles 415a, 415b, and 415c communicates directly with the central computing system 401 to report the GPS coordinates thereto, independent of the local computers of the vehicle management subsystem 416.

Figure 4B:
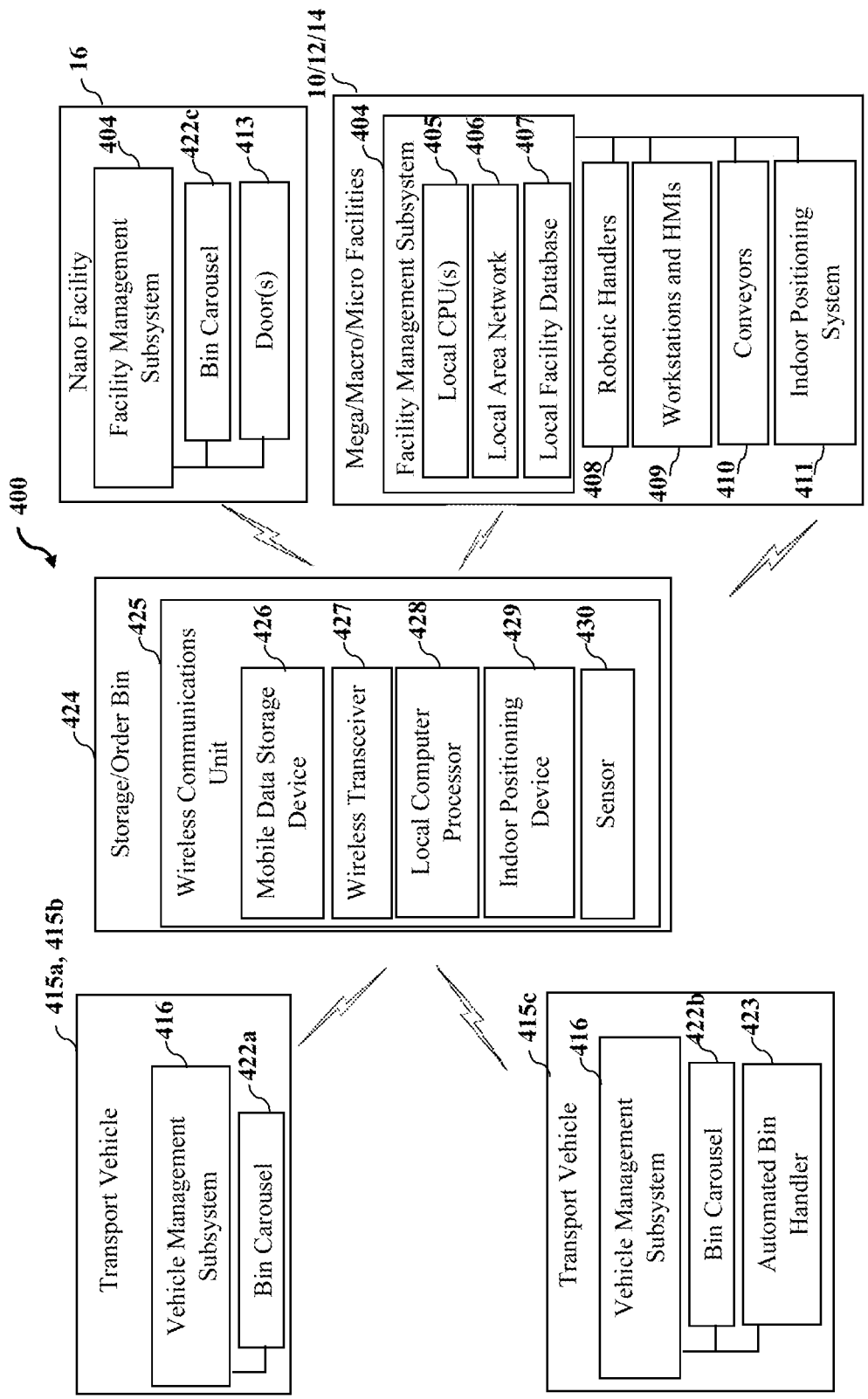
FIG. 4B illustrates a functional block diagram showing configuration and use of storage bins for containing, storing, exchanging, and transporting inventory and customer orders within the multi-entity inventory management system, according to an embodiment herein.

In an embodiment, the local computers of the vehicle management subsystem 416 are installed in a local area network 421, for example, a local wireless network, by which at least one of the local computers is communicable with the storage bins 424 of the multi-entity inventory management system 400 illustrated in FIG. 4B. The wireless communications units 425 of the storage bins 424 connect to the local area network 421 of each vehicle management subsystem 416. The vehicle management subsystem 416 of the transport vehicle 415a, 415b is, therefore, communicable with the wireless communications units 425 of the storage bins 424 being loaded onto the transport vehicle 415a, 415b for receiving the unique bin identifiers of these storage bins 424 from the mobile data storage devices 426 thereof, and for initiating recordal of the transfer of the storage bins 424 from the facilities 10, 12, 14 to the transport vehicles 415a, 415b in the central database 403, for example, by transmitting the vehicle identifier of the transport vehicle 415a, 415b and the unique bin identifier received from the loaded storage bin 424 to the central computing system 401. In an embodiment, the vehicle management subsystem 416 is operably and communicatively coupled to bin handling equipment, for example, bin carousels 422a and 422b installed in the transport vehicles 415a, 415b, and 415c. In an embodiment, the vehicle management subsystem 416 is operably and communicatively coupled to one or more automated bin handlers 423 installed in a small-scale transport vehicle 415c that transports order bins 424c and 424d to the nano facilities 16.

The processors disclosed above refer to any one or more microprocessors, CPU devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, each of the processors is implemented as a processor set comprising, for example, a programmed microprocessor and a math or graphics co-processor. The CIMS is not limited to employing processors. In an embodiment, the CIMS employs controllers or microcontrollers. The network interfaces disclosed above are, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc.

The databases of the multi-entity inventory management system 400, for example, the central database 403, the local facility databases 407, and the local vehicle databases 420 refer to any storage area or media that can be used for storing data and files. The databases 403, 407, and 420 can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the databases 403, 407, and 420 can also be locations on file system. In another embodiment, the databases 403, 407, and 420 can be remotely accessed by the CIMS 401, 404, and 416 via the communication network. In another embodiment, the databases 403, 407, and 420 are configured as cloud-based databases implemented in a cloud computing environment, where computing resources are delivered as a service over the communication network.

FIG. 4B illustrates a functional block diagram showing configuration and use of storage bins 424 for containing, storing, exchanging, and transporting inventory and customer orders within the multi-entity inventory management system 400, according to an embodiment herein. The storage bins 424 are in operable communication with the facilities 10, 12, 14, and 16 and the transport vehicles 415a, 415b, and 415c for executing an inventory management workflow. In an embodiment, the storage bins 424 are of a predetermined size and configuration compatible with the arrays of indexed storage locations at the mega facilities 10, the macro facilities 12, and the micro facilities 14. Some of the storage bins 424 are configured as order bins for compatibility with bin handling equipment, for example, bin carousels 422a and 422b of the transport vehicles 415a, 415b, and 415c travelling between the facilities 10, 12, 14, and 16. In an embodiment, the storage bins 424 are divided into the following categories: storage bins 424a, 424b for holding products of multiple vendors therein, picked-order bins (PO bins) 424c for holding of picked-order products therein, and finished-order bins (FO bins) 424d for holding finished orders as illustrated in FIGS. 5E-5F.

In an embodiment, the storage bins 424 are further categorized into the following storage bin subcategories: single-compartment storage bins (SCS bins) and multi-compartment storage bins (MCS bins). Each SCS bin comprises a single undivided internal storage space and thus configured to hold either a singular item or an "each" of product inventory therein, or multiple items or "eaches" of product inventory that are of a matching product type to one another. The internal storage space of each MCS bin is subdivided into multiple compartments and thus configured to hold mixed products of different product types, optionally organized on a compartmental basis. The MCS bin is used for separately storing products of different product types in different respective compartments, or separately storing products owned by different entities, for example, different vendors, in different respective compartments. In an embodiment, the PO bins are multi-compartment bins with subdivided interior spaces, similar to the MCS bins, whereby each PO bin is configured to receive the contents of multiple customer orders therein, with the respective content of each customer order being placed in a different subset of the PO bin's compartments to maintain physical isolation of the customer orders from one another. For example, for small customer orders, each individual customer order occupies one respective compartment of the PO bin, while in the case of large customer orders, an individual customer order occupies multiple, or even all, compartments of the PO bin. In an embodiment, each compartment of the PO bin is typically dedicated to receiving the necessary product(s) to fulfill a respective customer order rather than receiving multiple caches of a singular product type owned by a singular vendor.

In the second category of order bins, the FO bins are differently sized and optionally differently configured, from the other types of storage bins. The FO bins are of a different smaller standardized size and footprint than the other storage bins. For example, these FO bins are about half the size and footprint of the other storage bins. This second category of order bins is particularly sized and configured for compatibility with the indexed storage array of each nano facility 16, and with the indexed storage array of the transport vehicles 415c that specifically travels between the micro facilities 14 and the nano facilities 16. In an embodiment, the FO bin is a single compartment bin configured to receive only the contents of a single individual finished order therein, that has been appropriately packaged and packed into a finished state for pickup by a customer or by delivery personnel, or for a last mile delivery to the end customer.

The storage bins 424 of different categories disclosed above are electronic, smart bins capable of exchanging data with the facility management subsystems 404 and the vehicle management subsystems 416 to execute intelligent, bin-driven navigation of the storage bins 424 throughout the multi-entity inventory management system 400. In an embodiment as illustrated in FIG. 4B, each of the storage bins 424 in the multi-entity inventory management system 400 comprises a mobile data storage device 426 operably coupled to each of the storage bins 424. The mobile data storage device 426 comprises a non-transitory, computer-readable storage medium configured to store a unique bin identifier of a respective storage bin 424 and bin data associated with the products contained in respective storage bins 424. For example, the mobile data storage device 426 comprises a computer-readable memory configured to store a static Bin_ID of the storage bin 424 along with other variable data concerning the contents carried in the storage bin 424 at any given time. The bin data comprises, for example, at least one of a product catalogue; product data comprising a product identifier, a quantity, and attributes of each of the products contained in each of the storage bins 424; destination data associated with a destination of the contained products; timing data associated with a timeline within which and/or an urgency with which the products contained in each of the storage bins 424 are to be conveyed through the multi-entity inventory management system 400 toward the destination; inventory customization data associated with value-added service actions to be performed on the products contained in each of the storage bins 424; inventory handling data associated with routing, handling, and/or packing requirements for the products contained in each of the storage bins 424; and environmental data associated with environmental requirements for the products contained in each of the storage bins 424. In an embodiment, the mobile data storage device 426 on each storage bin 424 is part of a wireless communications unit 425. In an embodiment, the wireless communications unit 425 further comprises a wireless transceiver 427 and a local computer processor 428 that is connected to the mobile data storage device 426 and to the wireless transceiver 427, whereby reading and writing of data to and from the mobile data storage unit 426 of the storage bin 424 by the facility management subsystem 404 or the vehicle management subsystem 416 at any of the facilities 10, 12, 14, and 16 or any of the transport vehicles 415*a*, 415*b*, and 415*c* is performed wirelessly, for example, using the local area network 406 of the facility management subsystem 404 or the local area network 421 of the vehicle management subsystem 416.

In an embodiment where the facilities 10, 12, and 14 employ robotic handlers 408 to serve their respective arrays of indexed storage locations, the same wireless network, for example, the local area network 406, is used by one or more computers of the facility management subsystem 404 to wirelessly control the robotic handlers 408. In an embodiment, each storage bin 424 further comprises an indoor positioning device 429 for co-operable wireless communication with the indoor positioning system 411 of each of the facilities 10, 12, 14 illustrated in FIG. 4A, to track movement and location of the storage bins 424 within the facilities 10, 12, 14, even when the storage bins 424 are positioned or moving outside the arrays of the indexed storage locations therewithin. The indoor positioning device 429 is operably coupled to each of the storage bins 424 and to the indoor positioning system 411 installed at each of the facilities 10, 12, 14. The indoor positioning device 429 in each of the storage bins 424 is configured to operably communicate with the indoor positioning system 411 to determine and report a position of each of the storage bins 424 within each of the facilities 10, 12, 14 for real-time tracking of each of the storage bins 424. In an embodiment, the indoor positioning device 429 of each storage bin 424 is integrated into or connected to the wireless communications unit 425, for example, sharing the computer-readable memory, the wireless transceiver 427, and the local computer processor 428 used for wireless communication and data exchange. The indoor positioning system 411 at each of the mega, macro and micro facilities 10, 12 and 14 respectively, comprises components for wirelessly cooperating with the indoor positioning devices 429 on the storage bins 424 to determine the current co-ordinate position of any storage bin 424 currently located within that facility 10, 12, or 14. In an embodiment, acoustic beacons are used for indoor navigation of the storage bins 424 within each of the facilities 10, 12, 14. In an embodiment, these facility-based positioning components are reference devices or initiator devices and reference devices. While these devices use a combination of high-speed radio frequency (RF) signals and lower speed acoustic signals for optimal positioning accuracy, in an embodiment, other indoor positioning technology is employed to enable determination of storage bin locations within the facilities 10, 12, 14, and 16 of the multi-entity inventory management system 400.

Through the combination of the wireless communications unit 425 and the indoor positioning device 429, each storage bin 424 not only identifies itself to the facility management subsystem 404 of a facility at which the storage bin 424 arrives, but also identifies its current location within that facility, thereby providing optimal, high resolution tracking of inventory contained in the storage bins 424. In an embodiment, the indoor positioning devices 429 and the wireless communications units 425 on the storage bins 424 are programmed to continually or periodically determine the positions of the storage bins 424, and communicate the calculated positions to the facility management subsystem 404, which in turn updates the stored positions in the central database 403 of the central computing system 401 configured, for example, as a cloud-based computing platform, or in an embodiment, stores the updated information only locally at the facility, until the unique bin identifier is queried from the central computing system 401.

In an embodiment, the indoor positioning device 429 and the wireless communications unit 425 are configured to default to a reduced-functionality sleep mode, only periodically awaking to re-determine the position of the storage bin 424 and report the position to the facility management subsystem 404 or the central computing system 401, for example, at timed intervals or in response to a status query signal emitted by the facility's local area network 406. In an embodiment, the indoor positioning device 429 further comprises one or more motion sensors, for example, accelerometer(s) and/or gyroscope(s)) operable to detect movement of the storage bin 424 in a three-dimensional space, and to trigger awakening of the storage bin's 424 electronics from the aforementioned sleep mode. This reduces energy consumption by the storage bin's 424 electronics when sitting in a static position, for example, at a storage location in the indexed storage array of a facility, to maximize the lifespan of an onboard battery-based power supply of the storage bin's 424 data storage, communication and indoor positioning components, and to ensure continuous or periodic reporting of the storage bin's 424 position when the storage bin 424 is known to be moving through the facility, whether by a human worker, a robotic handler 408, or a conveyor.

In an embodiment, at least one sensor 430 is operably coupled to each storage bin 424 for detecting movement of the storage bin 424, and in response to the detected movement, initiating positional tracking of the storage bin 424 through the multi-entity inventory management system 400. The sensor 430 operably coupled to the storage bin 424 tracks the contents of the storage bin 424, inter-facility transfers of the storage bin 424, and allows determination of processing required for the storage bin 424 and its contents. In an embodiment, the sensor 430 is an active internet-ofthings (IoT) sensor that dictates its own actions, course, and journey through the multi-entity inventory management system 400 with the facilities 10, 12, 14, and 16, the robotic handlers 408, and the inter-nodal transport vehicles 415a, 415b, and 415c acting as enablers to the commands of the storage bin 424.

Figure 4C:
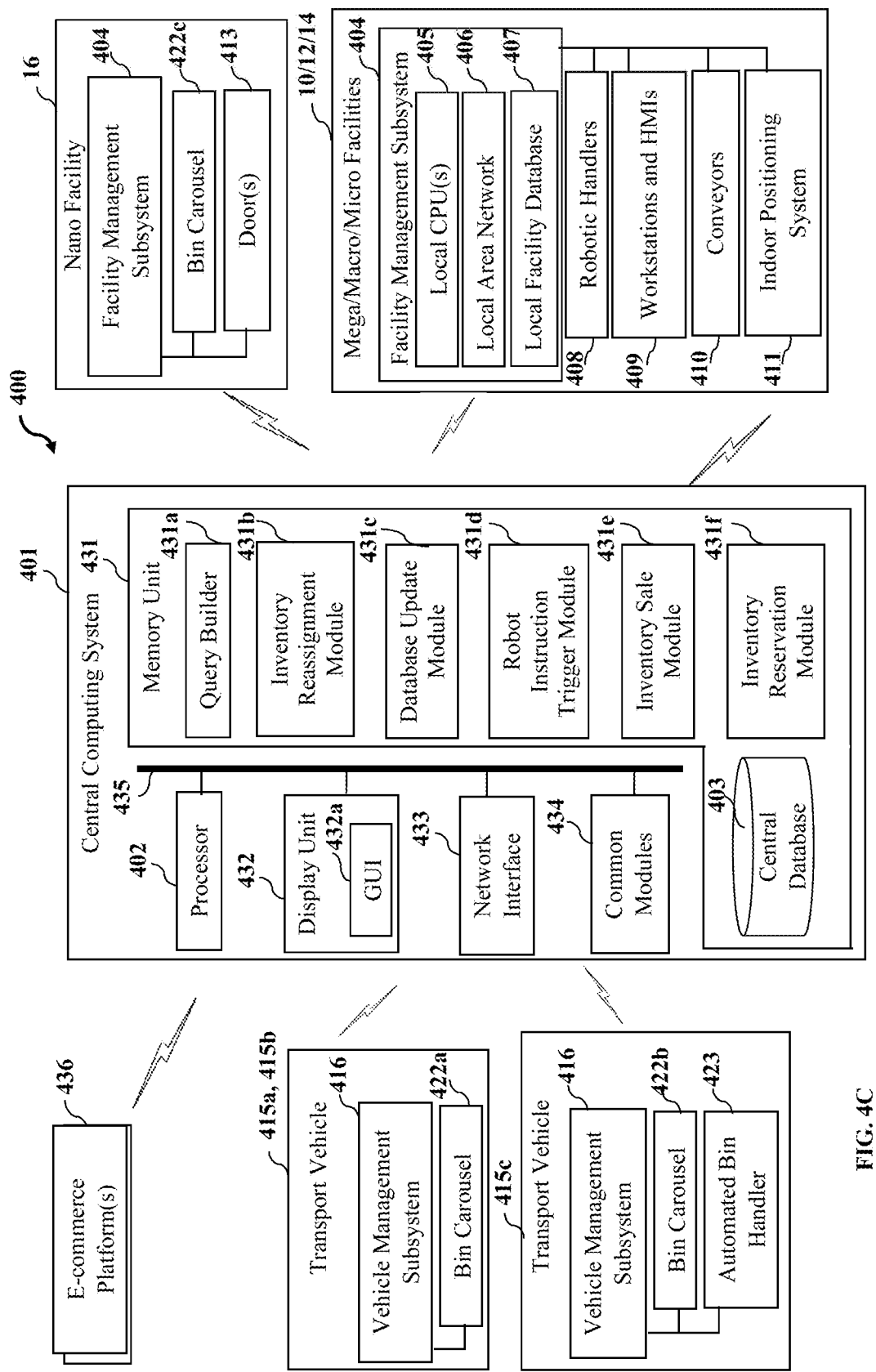
FIG. 4C illustrates a functional block diagram of the multi-entity inventory management system for managing product inventory of multiple different entities at one or more of multiple facilities comprising one or more storage structures served by robotic handlers, according to an embodiment herein.

FIG. 4C illustrates a functional block diagram of the multi-entity inventory management system 400 for managing product inventory of multiple different entities at one or more of multiple facilities 10, 12, 14, and 16 comprising one or more storage structures served by robotic handlers 408, according to an embodiment herein. The multi-entity inventory management system 400 comprises the network of facilities 10, 12, 14, and 16 distributed throughout a geographical region as illustrated in FIGS. 3A-3D, multiple storage bins 424 storable within the network of facilities 10, 12, 14, and 16, reassignable between the different entities, and transportable between the facilities 10, 12, 14, and 16, and the computerized inventory management system (CIMS). The CIMS comprises the central computing system 401, the facility management subsystems 404 at the respective facilities 10, 12, 14, and 16, and the vehicle management subsystems 416 of the respective transport vehicles 415a, 415b, and 415c, all operably coupled to a communication network. As used herein, "communication network" refers, for example, to one of the internet, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. The central computing system 401 communicates with the facility management subsystems 404 and the vehicle management subsystems 416 of the CIMS via the communication network. In an embodiment, the central computing system 401 is also operably coupled to electronic commerce (e-commerce) platforms 436 of the different entities, for example, the different vendors via the communication network. The e-commerce platforms 436 are accessible to users, for example, through a broad spectrum of technologies and devices such as personal computers with access to the internet, internet enabled cellular phones, tablet computing devices, etc. The e-commerce platforms 436 allow users, for example, customers to place orders for one or more products of one or more product types via the communication network. In an embodiment, the e-commerce platforms 436 also allow users, for example, other vendors to purchase inventory and/or reserve inventory as disclosed in the detailed descriptions of FIGS. 9A-16.

In an embodiment, the central computing system 401 is a computer system that is programmable using high-level computer programming languages. The central computing system 401 is implemented using programmed and purposeful hardware. In the multi-entity inventory management system 400 disclosed herein, the central computing system 401 interfaces with the facility management subsystem 404, the vehicle management subsystem 416, and the local computer processor 428 of each of the storage bins 424 illustrated in FIG. 4B, and therefore more than one specifically programmed computing system is used for managing product inventory of multiple different entities at one or more of the facilities 10, 12, 14, and 16 and their reassignment and exchange between different entities.

As illustrated in FIG. 4C, the central computing system 401 comprises a non-transitory, computer-readable storage medium, for example, a memory unit 431 for storing computer program instructions defined by the modules, for example, 431a-431f of the central computing system 401. The central computing system 401 further comprises at least one processor 402 operably and communicatively coupled to the memory unit 431 for executing the computer program instructions defined by the modules, for example, 431a-431f of the central computing system 401 for managing product inventory of multiple different entities at one or more of the facilities 10, 12, 14, and 16 and their reassignment and exchange between different entities. The memory unit 431 is used for storing program instructions, applications, and data. The memory unit 431 is, for example, a random-access memory (RAM) or another type of dynamic storage device that stores information and instructions for execution by the processor 402. The memory unit 431 also stores temporary variables and other intermediate information used during execution of the instructions by the processor 402. In an embodiment, the central computing system 401 further comprises read only memories (ROMs) or other types of static storage devices that store static information and instructions for execution by the processor 402. In an embodiment, the modules, for example, 431a-431f and 403 of the central computing system 401 are stored in the memory unit 431.

As illustrated in FIG. 4C, the central computing system 401 further comprises a data bus 435, a display unit 432, a network interface 433, and common modules 434. The data bus 435 permits communications between the modules, for example, 402, 431, 432, 433, and 434 of the central computing system 401. The display unit 432, via a graphical user interface (GUI) 432a, displays information, display interfaces, user interface elements such as checkboxes, input text fields, etc., for example, for allowing a user such as a system administrator to trigger an update to digital records, enter inventory information, update database tables, etc., for facilitating the management of product inventory of multiple different entities at one or more of the facilities 10, 12, 14, and 16 and their reassignment and exchange between different entities. The central computing system 401 renders the GUI 432a on the display unit 432 for receiving inputs from the system administrator. The GUI 432a comprises, for example, an online web interface, a web-based downloadable application interface, a mobile-based downloadable application interface, etc. The display unit 432 displays the GUI 432a. The network interface 433 enables connection of the central computing system 401 to the communication network. In an embodiment, the network interface 433 is provided as an interface card also referred to as a line card. The common modules 434 of the central computing system 401 comprise, for example, input/output (I/O) controllers, input devices, output devices, fixed media drives such as hard drives, removable media drives for receiving removable media, etc. Computer applications and programs are used for operating the central computing system 401. The programs are loaded onto fixed media drives and into the memory unit 431 via the removable media drives. In an embodiment, the computer applications and programs are loaded into the memory unit 431 directly via the communication network.

In an exemplary implementation illustrated in FIG. 4C, the central computing system 401 comprises a query builder 431*a*, an inventory reassignment module 431*b*, a database update module 431*c*, a robot instruction trigger module 431*d*, an inventory sale module 431*e*, an inventory reservation module 431*f*, and the central database 403. The query builder 431*a* defines computer program instructions for building database queries and facilitating execution of the inventory search query process as disclosed in the detailed description of FIG. 10. The inventory reassignment module 431*b* defines computer program instructions for performing digital reassignment and executing the transfer of ownership of one or more of the products of a particular product type from a first entity to a second entity as disclosed in the detailed descriptions of FIG. 2, FIGS. 8A-8B, FIGS. 9A-9B, FIGS. 10-12, and FIG. 16. The database update module 431*c* updates digital records and product ownership information in the central database 403 during movement of inventory between the facilities 10, 12, 14, and 16 and between the facilities 10, 12, 14, and 16 and the transport vehicles 415*a*, 415*b*, and 415*c*, and during digital reassignments, inventory swaps, inventory sales, and inventory reservations that occur in the multi-entity inventory management system 400.

The robot instruction trigger module 431*d* communicates instructions to the facility management subsystems 404 of the facilities 10, 12, 14 to command the robotic handlers 408 at the respective facilities 10, 12, 14 to perform storage, retrieval, filling, navigation, and other operations associated with the storage bins 424 at the respective facilities 10, 12, 14. In an embodiment, the robot instruction trigger module 431*d* communicates instructions to the facility management subsystem 404 of a first facility to activate a first subset of the robotic handlers 408 at the first facility to physically store a first product of a particular product type into a storage location in a first storage structure. Before or after activating the first subset of the robotic handlers 408, the database update module 431*c* updates the central database 403 to record that the first product is owned by a first entity included among the plurality of different entities identified in the central database 403. The inventory sale module 431*e* receives, via the communication network, an order of the particular product type from a second entity included among the plurality of different entities identified in the central database 403, the second entity being different than the first entity. In an embodiment, the second entity is a needful entity who needs product inventory and the first entity is a stocked entity having additional product inventory to transfer to the needful entity. The database update module 431*c* updates the central database 403 to record a transfer of ownership of the first product stored at the storage location in the first storage structure from the first entity to the second entity. The robot instruction trigger module 431*d* communicates instructions to the facility management subsystem 404 of the first facility to activate a second subset of the robotic handlers 408 to retrieve the first product from the storage location in the first storage structure for use in fulfilling the order of the particular product type for the second entity. The inventory reassignment module 431*b* defines computer program instructions for executing the transfer of the ownership of the first product from the first entity to the second entity at any time corresponding to the retrieval of the first product from the storage location in the first storage structure and/or the fulfillment of the order of the particular product type for the second entity, for example, before or after activating the second subset of the robotic handlers 408 to retrieve the first product from the storage location in the first storage structure or even after fulfillment of the order.

In an embodiment, the database update module 431*c* updates the central database 403 to record the transfer of the ownership of the first product at the storage location in the first storage structure from the first entity to the second entity in response to determining that the second entity has an inventory shortfall of the particular product type and is unable to fulfill the order of the particular product type. In another embodiment, the database update module 431*c* updates the central database 403 to record the transfer of the ownership of the first product at the storage location in the first storage structure from the first entity to the second entity by verifying that the second entity is purchasing the first product from the first entity and updating the central database 403 to record the second entity purchasing the first product from the first entity.

In an embodiment, the robot instruction trigger module 431*d* communicates instructions to the facility management subsystem 404 of a different facility, herein referred to as a "second facility", to activate a third subset of the robotic handlers 408 that is different from the first subset of the robotic handlers 408 and the second subset of the robotic handlers 408 to physically store a second product of the particular product type into a storage location in a second storage structure. The second storage structure is located at the second facility. Before or after activating the third subset of the robotic handlers 408, the database update module 431*c* updates the central database 403 to record that the second product stored at the storage location in the second storage structure is owned by the second entity. After receiving the order, the database update module 431*c* updates the central database 403 to record a transfer of ownership of the second product at the storage location in the second storage structure from the second entity to the first entity, whereby the ownership of the first product and the second product is swapped between the first entity and the second entity.

In an embodiment, when activating the first subset of the robotic handlers 408 to store the first product in the storage location in the first storage structure, the robot instruction trigger module 431*d* communicates instructions to the facility management subsystem 404 of the first facility to activate the first subset of the robotic handlers 408 to physically store the first product in the first storage structure within a first storage bin. When activating the third subset of the robotic handlers 408 to store the second product in the storage location in the second storage structure, the robot instruction trigger module 431*d* communicates instructions to the facility management subsystem 404 of the second facility to activate the third subset of the robotic handlers 408 to physically store the second product in the second storage structure within a second storage bin. After receiving the order, the database update module 431*c* updates the central database 403 to record a transfer of ownership of content of the first storage bin from the first entity to the second entity and ownership of content of the second storage bin from the second entity to the first entity, whereby the ownership of the content of the first storage bin and the ownership of the content of the second storage bin are swapped between the first entity and the second entity. The robot instruction trigger module 431*d* communicates instructions to the facility management subsystem 404 of the first facility to activate a fourth subset of the robotic handlers 408 to retrieve the first storage bin from the first storage structure and thereby fulfills the order of the particular product type for the second entity. The inventory reassignment module 431*b* defines computer program instructions for executing the transfer of the ownership of the content of the first storage bin from the first entity to the second entity and the transfer of the ownership of the content of the second storage bin from the second entity to the first entity at any time corresponding to the activation of the robotic handlers 408 and/or the fulfillment of the order of the particular product type fore the second entity, for example, before or after the robotic handlers 408 are dispatched and the product picked or even after the order is fulfilled.

In an embodiment, before receiving, the order and before or after activating the first subset of the robotic handlers 408, the database update module 431*c* updates the central database 403 to record that the content of the first storage bin is owned by the first entity. Before receiving the order and before or after activating the third subset of the robotic handlers 408, the database update module 431*c* updates the central database 403 to record that the content of the second storage bin is owned by the second entity.

In an embodiment, the query builder 431*a* queries the central database 403 to determine whether the content of the first storage bin is equal to the content of the second storage bin. After receiving the order, the database update module 431*c* updates the central database 403 to record the ownership of the content of the first storage bin and the second storage bin being swapped at least partly in response to determining that the content of the first storage bin is equal to the content of the second storage bin. In response to a determination that the content of the first storage bin and the content of the second storage bin are not equal, the robot instruction trigger module 431*d* communicates instructions to the facility management subsystem 404 of the first facility to perform at least one of the following: (a) activate a robotic worker at the first facility to equalize the content of the first storage bin relative to the content of the second storage bin; (b) activate, at the first facility, (i) a fifth subset of the robotic handlers 408 to deliver the first storage bin to a human-attended workstation, and (ii) a human-machine interface (HMI) to instruct a human worker of the human-attended workstation to equalize the content of the first storage bin relative to the content of the second storage bin. Furthermore, the robot instruction trigger module 431*d* communicates instructions to the facility management subsystem 404 of the second facility to perform at least one of the following: (a) activate a robotic worker at the second facility to equalize the content of the second storage bin relative to the content of the first storage bin; and (b) activate, at the second facility, (i) a sixth subset of the robotic handlers 408 to deliver the second storage bin to a human-attended workstation, and (ii) an HMI of the human-attended workstation to instruct a human worker of the human-attended workstation to equalize the content of the first storage bin relative to the content of the second storage bin. In an embodiment, the robot instruction trigger module 431*d* communicates instructions to the facility management subsystem 404 of the second facility to activate another subset of the robotic handlers 408 to retrieve the second product from the second storage structure for relocation of the second product to the first facility after updating the central database 403 to record the transfer of the ownership of the second product at the storage location in the second storage structure from the second entity to the first entity.

In an embodiment, the inventory sale module 431*e* executes inter-vendor commerce as disclosed in the detailed descriptions of FIGS. 9A-9B, FIGS. 10-12, and FIG. 16. In an embodiment, the inventory reservation module 431*f* executes an inventory reservation method for ensuring the availability of inventory before the inventory reassignment takes place as disclosed in the detailed descriptions of FIGS. 13-16. In this embodiment, the inventory reservation module 431*f* receives a reservation message from the second entity requesting that the particular product type be reserved prior to receiving the order for the particular product type from the second entity. The query builder 431*a* queries the central database 403 to confirm that the first product is available for reservation. The inventory reservation module 431*f* reserves the first product for the second entity by recording in the central database 403 an indication that the first product is reserved for the second entity after confirming that the first product is available. The inventory reservation module 431*f* starts a reservation period during which the first product is exclusively held for the second entity, such that the first product is unavailable for reservations by other of the different entities. In an embodiment, the inventory reservation module 431*f* charges a reservation fee to the second entity for reserving the first product. In an embodiment, the database update module 431*c* updates the central database 403 by reversing the indication that the first product is reserved and making the first product available for reservation by the other of the different entities, when no order corresponding to the first product is received from the second entity within the reservation period.

The processor 402 of the central computing system 401 retrieves instructions defined by the query builder 431*a*, the inventory reassignment module 431*b*, the database update module 431*c*, the robot instruction trigger module 431*d*, the inventory sale module 431*e*, and the inventory reservation module 431*f* for performing respective functions disclosed above. The processor 402 retrieves instructions for executing the modules, for example, 431*a*-431*f* from the memory unit 431. A program counter determines the location of the instructions in the memory unit 431. The program counter stores a number that identifies the current position in the program of each of the modules, for example, 431*a*-431*f*. The instructions fetched by the processor 402 from the memory unit 431 after being processed are decoded. The instructions are stored in an instruction register in the processor 402. After processing and decoding, the processor 402 executes their respective instructions, thereby performing one or more processes defined by those instructions.

At the time of execution, the instructions stored in the instruction register are examined to determine the operations to be performed. The processor 402 then performs the specified operations. The operations comprise arithmetic operations and logic operations. An operating system of the central computing system 401 performs multiple routines for performing a number of tasks required to assign the input devices, the output devices, and the memory unit 431 for execution of the modules, for example, 431*a*-431*f*. The tasks performed by the operating system comprise, for example, assigning memory to the modules, for example, 431*a*-431*f*, etc., and to data used by the central computing system 401, moving data between the memory unit 431 and disk units, and handling input/output operations. The operating system performs the tasks on request by the operations and after performing the tasks, the operating system transfers the execution control back to the processor 402. The processor 402 continues the execution to obtain one or more outputs.

For purposes of illustration, the detailed description refers to the modules, for example, 431*a*-431*f*, being run locally on a single computer system; however the scope of the multi-entity inventory management system 400 and the method disclosed herein is not limited to the modules, for example, 431a-431f, being run locally on a single computer system via the operating system and the processor 402, but may be extended to run remotely over the communication network by employing a web browser and a remote server, a mobile phone, or other electronic devices. In an embodiment, one or more portions of the multi-entity inventory management system 400 disclosed herein are distributed across one or more computer systems (not shown) coupled to the communication network.

The non-transitory, computer-readable storage medium disclosed herein stores computer program instructions executable by the processor 402 for managing product inventory of different entities at one or more facilities and their reassignment and exchange between different entities. The computer program instructions implement the processes of various embodiments disclosed above and perform additional steps that may be required and contemplated for managing product inventory of different entities at one or more facilities and their reassignment and exchange between different entities. When the computer program instructions are executed by the processor 402, the computer program instructions cause the processor 402 to perform the steps of the method for managing product inventory of different entities at one or more facilities and their reassignment and exchange between different entities as disclosed above. In an embodiment, a single piece of computer program code comprising computer program instructions performs one or more steps of the method disclosed above. The processor 402 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language, for example, C, C++, C #, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 5A:
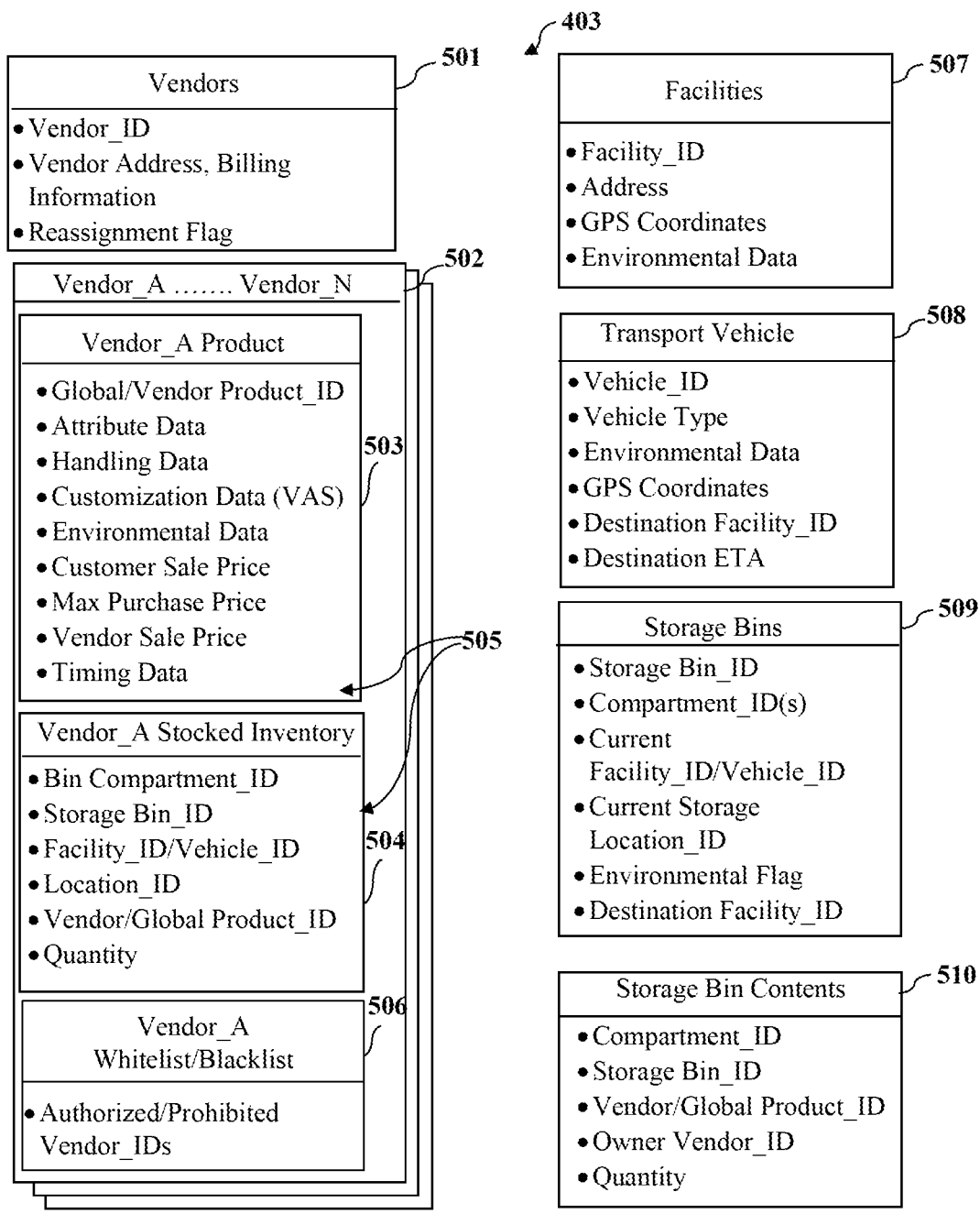
FIGS. 5A-5B illustrate a central database of the multi-entity inventory management system, according to an embodiment herein.
Figure 5B:
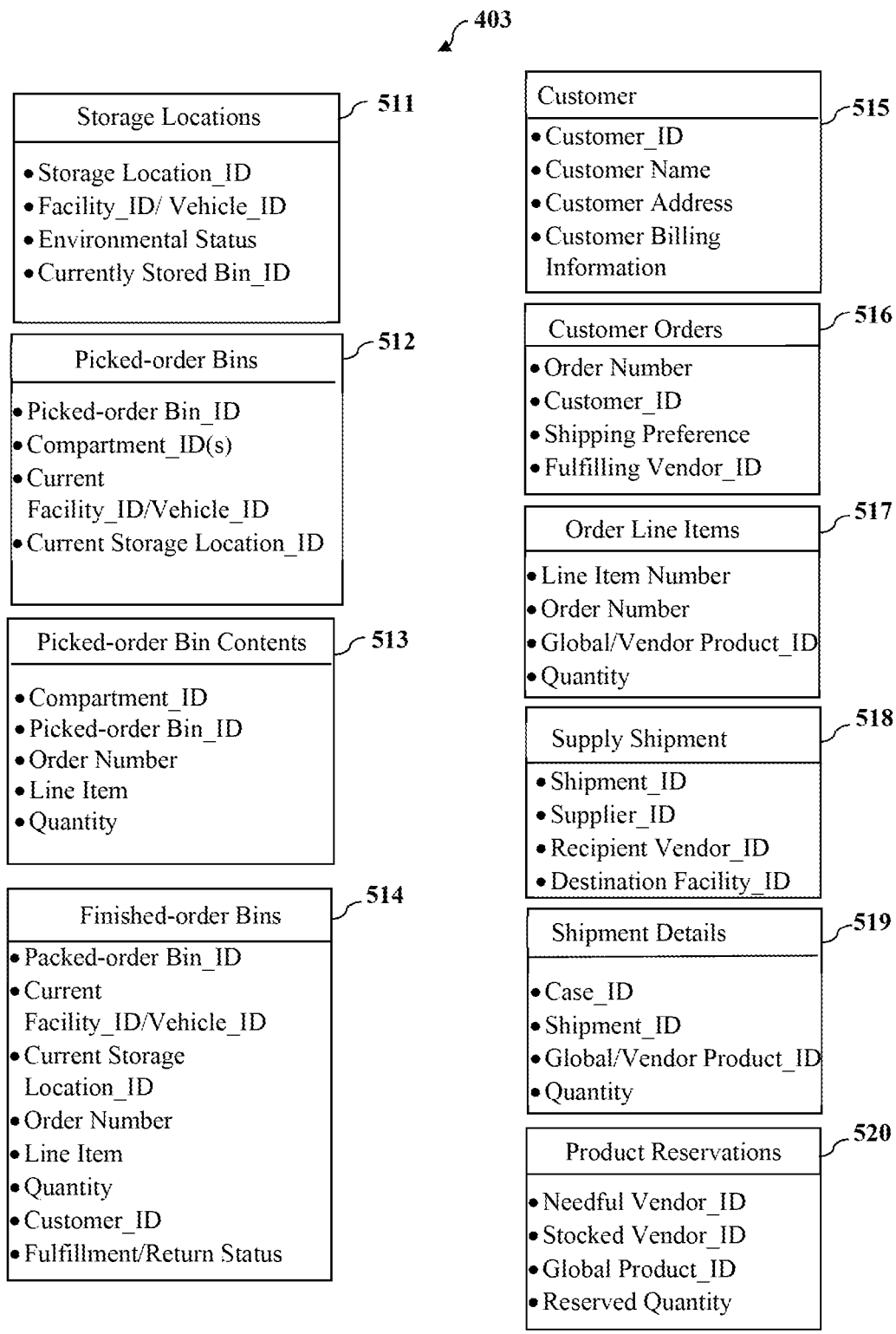

FIGS. 5A-5B illustrate the central database 403 of the multi-entity inventory management system 400 shown in FIG. 4A and FIG. 4C, according to an embodiment herein. In an embodiment of an organizational scheme of the central database 403, the central database 403 comprises a vendors table 501, a vendor's product table 503, a vendor's stocked inventory table 504, a vendor whitelist/blacklist table 506, a facilities table 507, a transport vehicle table 508, a storage bins table 509, a storage bin contents table 510, a storage locations table 511, a picked-order (PO) bins table 512, a PO bin contents table 513, a finished-order (FO) bins table 514, a customer table 515, a customer order table 516, an order line items table 517, a supply shipment table 518, a shipment details table 519, and product reservations table 520. The vendors table 501 contains vendor identifiers (Vendor_IDs) and other details of subscribing vendors 502, for example, their official corporate names, addresses, and billing information. For each vendor identified in the vendors table 501, a respective vendor's product table 503 and vendor's stocked inventory table 504 co-operably define a vendor's product catalogue 505 for that particular vendor in the central database 403. For each product type carried by that vendor, a respective record in the vendor's product table 503 contains at least one unique product identifier (Product_ID) of that particular product type. The unique product identifier comprises at least one global product identifier (Global Product_ID), for example, a universal product code (UPC), by which the product type is recognizable to all subscribing vendors 502 for purposes that will become apparent further below with respect to particular embodiments. In an embodiment, a vendor-specific product identifier (Vendor Product_ID), for example, a stock keeping unit (SKU) code, is stored in each record of the vendor's product table 503. In embodiments not requiring shared identifiability of products among the different subscribing vendors 502, an SKU code or another Vendor Product_ID is used alone, without an accompanying Global Product_ID of a standardized format readable by the other subscribing vendors 502.

In an embodiment, each product record in the vendor's product table 503 comprises one or more product attributes of the product concerned, for example, size, color, etc.; vendor-specific product handling data that defines particular actions or conditions that must be fulfilled for that product type while the product moves within the multi-entity inventory management system 400; vendor-specific customization data that defines performance of one or more modifications to the product by the operating entity based on value-added services (VAS), for example, re-packaging, labeling, price tagging, security tagging, etc., offered thereby; environmental data concerning controlled-environment requirements, or a lack thereof, for the particular product, for example, as may be necessitated by the nature of the product itself to prevent damage, leakage, or spoilage thereof or avoid, prevent, and/or minimize hazards presented thereby, etc.

Examples of the product handling data comprise flags, codes, or instructions relating to: product packing requirements such as placement of heavy or leak-prone items at the bottom of a multi-item order, placement of light or fragile items at the top of a multi-order item, grouping or separation of items by product category, etc.; and packaging requirements concerning selection and application of particular packaging types for a particular product, such as wrapping of products in tissue, bubble wrap, gift wrap, or other wrapping material, placement of products in bags, boxes or other containers, and selection from among differently branded, stylized, sized, or gauged wrapping materials, bags, boxes or containers, etc. Other examples of product handling data comprise flags, codes, or instructions relating to storage and/or handing of volatile, flammable or otherwise hazardous items requiring particular routing to, or processing or handling in, specially equipped facilities, facility zones, facility workstations, or transport vehicles;

and flags, codes or instructions for allergenically-safe handling of food items to avoid cross-contamination. Examples of the environmental data comprise an indication of a freezer-storage requirement for frozen food items, an indication of a refrigeration-storage requirement for chilled but non-frozen food items, an indication of ambient-storage acceptability for general items requiring no particular controlled-environment conditions, etc. In an embodiment, the CIMS uses the environmental data to determine and control placement of a product in various environmentally distinct or environmentally-controlled storage zones or areas in the facilities and the transport vehicles of the multi-entity inventory management system 400.

Any one or more of the product handling data, customization data, and environmental data are categorized according to different stages in the multi-entity inventory management system 400 at which the flagged precautions and prescribed instructions are to be noted or followed, for example, for differentiating between actions to be taken while the product is grouped with matching products and conveyed in a single-compartment storage (SCS) bin such that the same customization tasks or VAS actions are carried out on the matching products of a vendor's inventory prior to picking thereof for order fulfillment, versus other actions to be taken further downstream, such as packaging and packing flags, codes or instructions applicable to final packaging and packing of a completed customer order. Examples of VAS actions/instructions comprise: removal of the product from original packaging such as a plastic bag; addition of a security tag, a price tag, an expiration label, a warning label, for example, in cases where refrigeration is required, and/or a branding label such as the name and/or logo of an owner vendor; and/or repackaging of the product in non-original packaging such as the owner vendor's branded packaging.

In an embodiment, each product record in the vendor's product table 503 further comprises a customer sale price at which the product is intended to be sold to customers of the vendor, a maximum purchase price, and a vendor sale price at which the product may be offered for sale to other vendors, for example, to fulfill inventory shortfalls thereof. In an embodiment, each product record in the vendor's product table 503 comprises timing data concerning any timing restraints on the inventory. The vendor's stocked inventory table 504 of each vendor's respective product catalogue 505 is populated with sufficient data for identifying, whether directly or through relation to the other tables of the central database 403, the particular product quantities and whereabouts of in-stock products currently inventoried in the supply chain ecosystem on behalf of the vendor. Each stock record in the vendor's stocked inventory table 504 contains some or all of the following: a compartment identifier (Compartment_ID) of a particular compartment of a storage bin in which one or more in-stock products of the vendor are currently stored; the respective Bin_ID of that storage bin to which the compartment belongs; a unique facility identifier (Facility_ID) of a particular facility at which the storage bin currently resides or a unique vehicle identifier (Vehicle_ID) of a particular transport vehicle on which the storage bin currently resides; the vendor and/or global Product_ID of one or more in-stock products in the compartment of the storage bin; the quantity of one or more in-stock products in the compartment of the storage bin; and a unique location identifier (Location_ID) of a particular storage location at which the storage bin resides in the array of indexed storage locations of the facility or the transport vehicle, if currently stowed in an array of indexed storage locations. In embodiments employing subdivided multi-compartment storage (MCS) bins, each stock record in the vendor's stocked inventory table 504 contains, at minimum, the Product_ID(s) and the Compartment_ID, from which the other optional record contents disclosed above can be derived through relation with the other tables illustrated in FIGS. 5A-5B. In embodiments where no subdivided MCS bins are used, then the Compartment_ID field can be omitted and substituted by inclusion of the Bin_ID with the Product_ID(s) to fulfill the equivalent functional purpose.

As illustrated by inclusion of the customer orders table 516 in FIG. 5B, each vendor's customer orders are received in the central computing system 401, whether directly from the customer when the vendor's electronic commerce (e-commerce) sales platform is integrated into the central computing system 401, or from the vendor when the vendor's sales platform is not integrated into the central computing system 401. For facilitating environmentally appropriate storage and transport of environmentally sensitive products within the multi-entity inventory management system 400, the original population of the customer orders table 516 and the order line items table 517 in the central database 403 involves an automatic division of a customer's ordered line items into a plurality of separate customer orders, each assigned its own order number, specifically in instances where different ordered line items specify product types of non-matching environmental data in the vendor's product table 503. In response to creation of each customer order, the central computing system 401 queries the stocked inventory table 504 of the respective vendor in the central database 403 for the Product_ID(s) specified in the line items of the customer order and identifies an appropriate micro facility from which to fulfill the customer order, for example, based on proximity of the micro facility to the customer's address or another delivery destination or pickup point specified in the customer order, or based on an identification of a nano facility closest thereto, from which a particular micro facility is responsible for supplying that nano facility with fulfilled customer orders. The customer order details from the order line items table 517 are then forwarded to the facility management subsystem 404 of the identified micro facility.

If the stocked inventory query reveals that the vendor already has sufficient on-hand inventory to fulfill the customer order at the identified micro facility, then forwarding the order details to the facility management subsystem 404 of that micro facility is sufficient to enable fulfillment of the customer order via the process disclosed further below. If any of the ordered products are not on-hand at the singular micro facility, but are on-hand in one or more SCS bins at a nearby macro facility, in an embodiment, the order details are still forwarded to the facility management subsystem 404 of the micro facility, stored in the local facility database 407, and flagged as an "open order" still awaiting arrival of one or more products at the macro facility before the customer order becomes a "fillable order" ready for fulfillment. Meanwhile, the central computing system 401 sends a product-request message to the facility management subsystem 404 of that macro facility to trigger filling of one or more MCS bins at that macro facility with the required products in the required quantities for the customer order. In that product-request message, the needful vendor Facility_ID specified for the MCS bin(s) is the Facility_ID of the identified micro facility, whereby the required products from that macro facility will be transported to the micro facility in the required quantities within the MCS bin(s).

In FIG. 5A, the Facility_ID/Vehicle_ID, Location_ID, and Bin_ID are included in the vendor's stocked inventory table 504 to illustrate the various data than can be pulled from the central database 403 in response to a query for a particular Product_ID. In an embodiment, the data is pulled through a relation to the other tables without having to redundantly include such data in the vendor's stocked inventory table 504. Likewise, it will be appreciated that the illustration of redundant data among the other tables disclosed herein is for a similar explanatory purpose, and that a more normalized database structure may be implemented in practice to reduce such data redundancies. In addition to the inclusion of a vendor sale price for each product type in the vendor's product catalogue 505, additional data for each vendor in particular relation to inventory reassignment transactions, for example, an inventory swap transaction or an inventory sale transaction, with other vendors is stored in the vendor whitelist/blacklist table 506. The vendor whitelist/blacklist table 506 stores either a whitelist of Vendor_IDs of specifically authorized vendors whom the subject vendor has elected to allow for such inventory reassignment transactions, or a blacklist of Vendor_IDs of specifically prohibited vendors whom the subject vendor has elected to forbid or prohibit such inventory reassignment transactions. All vendors other than the prohibited vendors are considered inherently authorized vendors. In an embodiment, for each vendor, a reassignment participation flag denoting whether or not the subject vendor has opted to allow or prohibit their participation in such inventory reassignment transactions between vendors is stored in the vendors table 501.

As illustrated in FIG. 5A, the facilities table 507 of the central database 403 comprises records, each containing a static field with the Facility_ID of a respective facility, and additional relevant information concerning that facility, such as a street address and/or global positioning system (GPS) coordinates thereof, and in an embodiment, environmental data for identifying whether the facility has environmentally controlled storage capabilities, for example, refrigeration storage zones and/or freezer storage zones, or only ambient storage zones. In an embodiment, if all facilities throughout the multi-entity inventory management system 400 are equipped with an equal variety of environmentally distinct storage zones, then this environmental data is omitted from the facilities table 507. The transport vehicle table 508 of the central database 403 comprises records, each containing at least a static field with the Vehicle_ID of a respective transport vehicle of the multi-entity inventory management system 400 and a variable destination field for the Facility_ID of a facility to which the transport vehicle is subsequently destined to travel. In an embodiment, a field for environmental data related to the environmentally controlled storage capabilities of the transport vehicle. In an embodiment, if all the transport vehicles throughout the multi-entity inventory management system 400 are equipped with an equal variety of environmentally distinct storage zones, then this environmental data is omitted from the transport vehicle table 508. In an embodiment, the transport vehicle table 508 comprises the type of the transport vehicle, the current or last recorded GPS coordinates of the transport vehicle, and/or an estimated time of arrival (ETA) at the destination facility.

The storage bins table 509 of the central database 403 stores the Bin_IDs of all the storage bins of the multi-entity inventory management system 400, each in a respective record that also contains the Facility_ID of the facility at which the respective storage bin currently resides or the Vehicle_ID of the transport vehicle on which the respective storage bin currently resides; and the Location_ID of a particular storage location at which the storage bin resides in the indexed storage array of the facility or the transport vehicle, if the storage bin is currently stowed in one of the indexed storage arrays, or of a dynamic storage location on a robotic handler or a conveyor on which the storage bin is placed and is being moved within or out of the facility. In an embodiment where the storage bins are configured as multi-compartment storage (MCS) bins, each storage bin record also comprises compartment fields for storing a respective compartment identifier (Compartment_ID) of each of the MCS bin's compartments. In embodiments where only SCS bins are used, the storage bin record does not contain compartment fields. In an embodiment, the storage bins table 509 stores an environmental flag indicating the environmental condition or requirements of the contents of the storage bin.

In an embodiment, the storage bin contents table 510 of the central database 403 contains and allows tracking of the contents of each compartment of each storage bin. Each record in the storage bin contents table 510 comprises the Compartment_ID of a particular storage bin compartment; the Bin_ID of the storage bin to which that particular compartment belongs: the Product_ID(s) of one or more products found in the compartment of the storage bin; the quantity of the products in the compartment of the storage bin; and the Vendor_ID of the vendor who owns the products. The use of a Compartment_ID field is omitted in embodiments where the MCS bins are not employed and only SCS bins are used. In these embodiments, the other data fields of the storage bin contents table 510 illustrated in FIG. 5A, are stored directly in the storage bins table 509, since the Bin_ID of each bin can be used for tracking the location of the vendor's in-stock inventory.

As illustrated in FIG. 5B, the global storage locations table 511 of the central database 403 lists all the indexed storage locations of the indexed storage arrays of all the facilities and the transport vehicles. Each record in this global storage locations table 511, therefore, comprises the Location_ID of a respective storage location in the multi-entity inventory management system 400, the Facility_ID of the facility at which the storage location resides, or the Vehicle_ID of the transport vehicle on which the storage location resides, an environmental status indicator reflecting the environmental control category to which that storage location belongs, and the Bin_ID of a storage or order bin currently stored at that storage location, if any. The environmental status indicator denotes residence of the storage location in an ambient storage zone, a refrigeration storage zone, or a freezer storage zone of a given facility or transport vehicle.

The indexed storage arrays of all facilities and all transport vehicles are, therefore, fully indexed for global mapping of stored bin locations throughout the multi-entity inventory management system 400, as each individual indexed storage location throughout the multi-entity inventory management system 400 has a footprint specifically sized and shaped to accommodate placement and storage of a respective singular storage bin therein, and has a respective location identifier or address (Location_ID) in the records of the central database 403 by which the exact whereabouts of any storage bin stowed in any indexed storage array is identifiable at any time, even during transit between the facilities due to the inclusion of such indexed storage arrays in the transport vehicles. Through the combination of the vendor's stocked inventory table 504, the facilities table 507, the transport vehicle table 508, the storage bins table 509, the storage bin contents table 510, and the global storage locations table 511, the locations of all inventory placed into the storage bins and inducted into any of the indexed storage arrays compatible with the storage bins are thus recorded and tracked. In an embodiment where the multi-entity inventory management system 400 employs only ambient storage with no environmentally controlled storage environments comprising, for example, refrigeration storage zones and/or freezer storage zones, then the environmental data is omitted from the vendor's product table 503 and the facilities table 507, along with the environmental status being omitted from the global storage locations table 511.

In addition to the storage bins for holding vendor inventory, the multi-entity inventory management system 400 also employs PO bins of the same standardized size and configuration as the storage bins such that picked orders placed in these PO bins are storable in the indexed storage locations found in the mega facilities, the macro facilities, and the micro facilities, and on the transport vehicles travelling therebetween, on a 1:1 bin-to-location basis. Accordingly, the PO bins table 512 of the central database 403 is of a structure similar to the storage bins table 509. Each record of the PO bins table 512 thus contains a static field, that is, the Bin_ID of a respective PO bin; the variable Facility_ID of the facility at which the respective PO bin currently resides or the Vehicle_ID of the transport vehicle on which the respective PO bin currently resides; and the Location_ID of a particular storage location at which the PO bin resides in the indexed storage array of the facility or the transport vehicle, if the PO bin is currently stowed in one of the indexed storage arrays, or of a dynamic storage location on a robotic handler or a conveyor on which the PO bin is placed and is being moved within or out of the facility.

In an embodiment, the PO bins are MCS bins capable of holding multiple customer orders therein. Accordingly, each PO bin record of the PO bins table 512 comprises static fields containing the Compartment_IDs of the respective PO bin. In this embodiment, the separate PO bin contents table 513 of the central database 403 tracks the contents of each compartment of each PO bin. Each record in the PO bin contents table 513 thus comprises the Compartment_ID of a respective PO bin compartment; the Bin_ID of the PO bin to which that compartment belongs; the order number of a particular customer order of which one or more ordered products reside in that compartment; a line item number of the particular customer order that is fully or partially fulfilled by one or more ordered products in that compartment; and the quantity of the ordered products in that compartment. Inclusion of the line item and quantity in the PO bin contents table 513 accounts for distribution of the contents of larger orders among multiple compartments, and even among multiple PO bins. In embodiments where the PO bins are not subdivided into multiple compartments, the use of Compartment_IDs for the PO bins is omitted, as each order bin will have only a singular compartment, in which case the Bin_ID is used to identify the whereabouts of a picked order. In these embodiments, the PO bin contents table 513 is omitted entirely, with the order numbers, line item numbers, and quantities instead being recorded directly in the PO bins table 512.

The order numbers recorded in the PO bin contents table 513 are retrieved and assigned from a separate customer orders table 516, each record of which contains the order number of a respective customer order, a unique identifier (Customer_ID) of a customer for whom that customer order is to be fulfilled, a unique identifier (Vendor_ID) of the vendor who fulfills the customer order, and any shipping preferences applied to that customer order during creation thereof. In a related order line items table 517, each record contains a line item number, the order number of the customer order to which that line item belongs, the Product_ID(s) of a product type required to fulfill that line item of the customer order, and a quantity of that product type to be fulfilled for that line item. The Customer_ID of each customer is also stored in a separate customer table 515 along with all other customer account information, including the name, address, and billing information of each customer.

In addition to the multi-compartment PO bins in which picked orders are placed, in an embodiment, the multi-entity inventory management system 400 also employs single-compartment FO bins in which individual customer orders are packed once packaged into a finished state ready for pickup by, or delivery to, the customer. In an embodiment, the FO bins are of a different smaller standardized size than the storage and PO bins, and are, for example, about half the size of those other bins. The smaller FO bins are not compatible with the indexed storage arrays of the mega facilities, the macro facilities, and the micro facilities or the transport vehicles travelling therebetween and are instead sized and configured for a different type of indexed storage array used at the nano facilities.

Each record of the FO bins table 514 of the central database 403 comprises a static field containing the Bin_ID of a respective one of the FO bins, the order number of a particular customer order of which one or more ordered products reside in the FO bin; the Facility_ID of the facility at which the respective FO bin currently resides or the Vehicle_ID of the transport vehicle on which the respective FO bin currently resides; and the Location_ID of a particular storage location at which the FO bin resides in the indexed storage array of the facility or the transport vehicle, if the FO bin is currently stowed in one of the indexed storage arrays, or of a dynamic storage location on a robotic handler or a conveyor on which the storage bin is placed and is being moved within or out of the facility. To accommodate distribution of the large orders among the multiple FO bins, in an embodiment, each record in the FO bins table 514 further comprises a line item number of the particular customer order that is fully or partially fulfilled by one or more ordered products in that FO bin, and the quantity of the ordered products in that FO bin. In an embodiment, the FO bins table 514 further stores the unique identifier of the customer (Customer_ID) and a status of fulfillment and/or returns of the customer orders.

The supply shipment table 518 of the central database 403 is populated with expected inventory supply shipments scheduled to deliver new inventory to the multi-entity inventory management system 400, typically at the mega facilities thereof. Each record of the supply shipment table 518 contains a unique identifier of the expected supply shipment (Shipment_ID), a unique identifier of a supplier from which the supply shipment originates (Supplier_ID); the Vendor_ID of a recipient vendor on behalf of whom the shipment is being received by the operating entity, that is, the vendor that owns the newly arriving inventory; and the Facility_ID of the facility to which the supply shipment is scheduled for delivery. The contents of the supply shipments are itemized in a separate shipment details table 519, each record of which comprises a unique identifier (Case_ID) for each case of product in the expected supply shipment, the Shipment_ID of the shipment to which the case belongs, the Product_ID(s) of a product type contained in the case, and a quantity of the product type found in the case. The product reservations table 520 in the central database 403 stores a needful vendor's Vendor_ID, a stocked vendor's Vendor_ID, the global Product_ID of a subject product, and a reservation quantity.

Figure 5C:
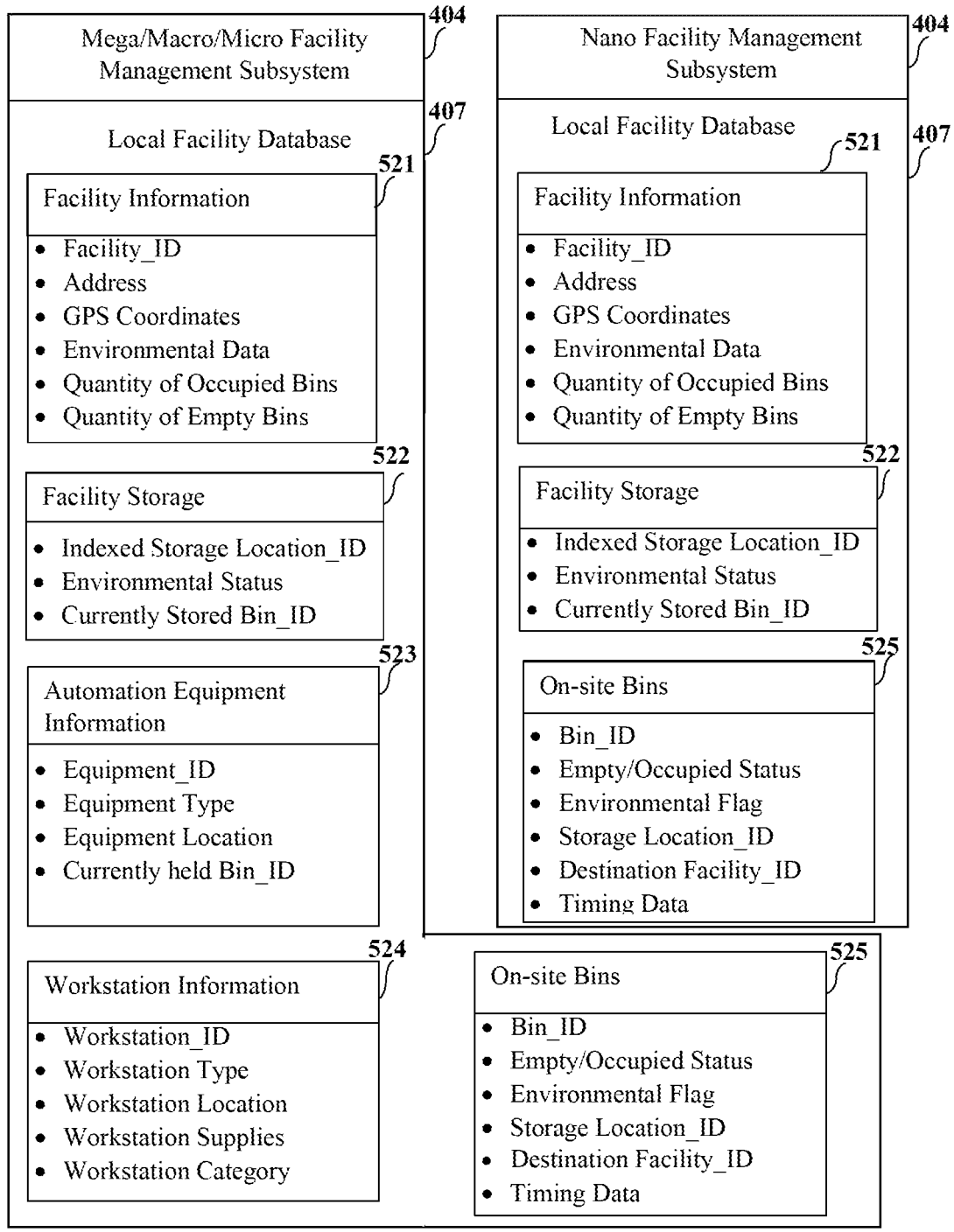
FIGS. 5C-5D illustrate local facility databases and local vehicle databases of the multi-entity inventory management system, according to an embodiment herein.
Figure 5D:
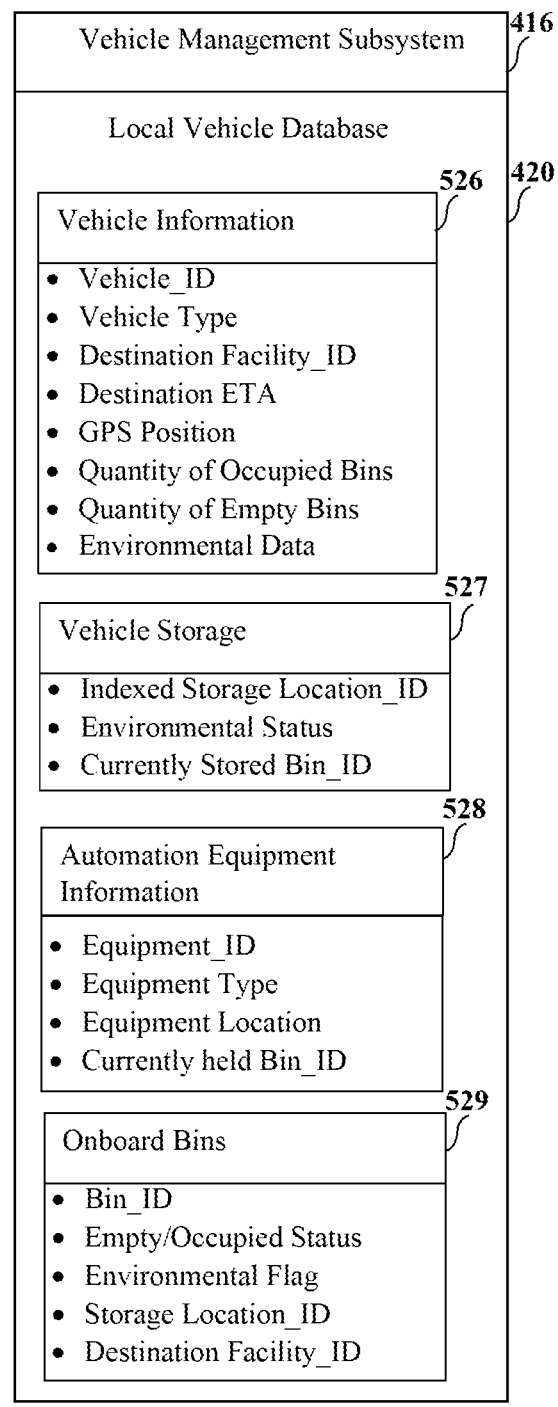
Figure 5E:
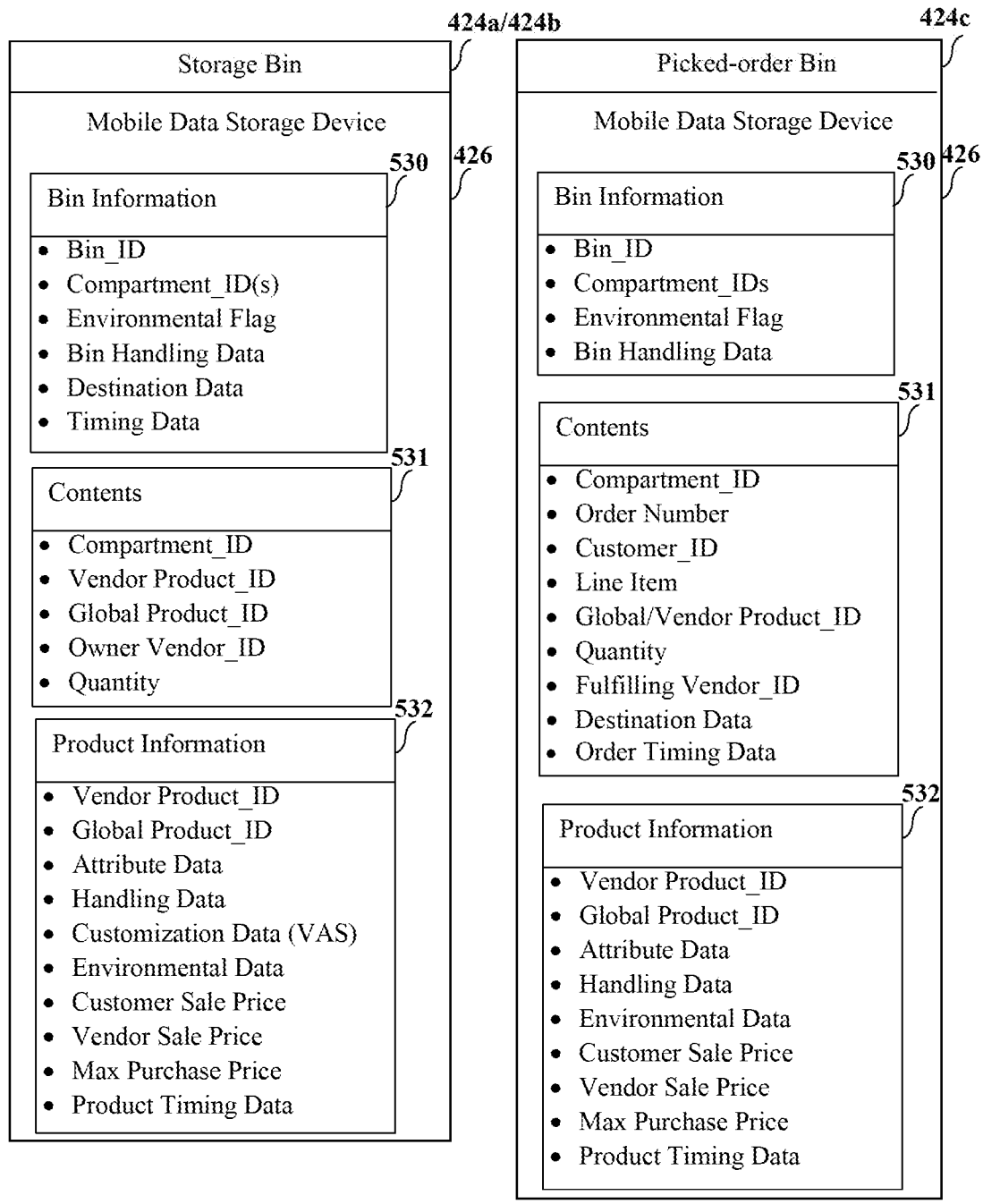
FIGS. 5E-5F illustrate local data stored on storage bins of different categories, according to an embodiment herein.
Figure 5F:
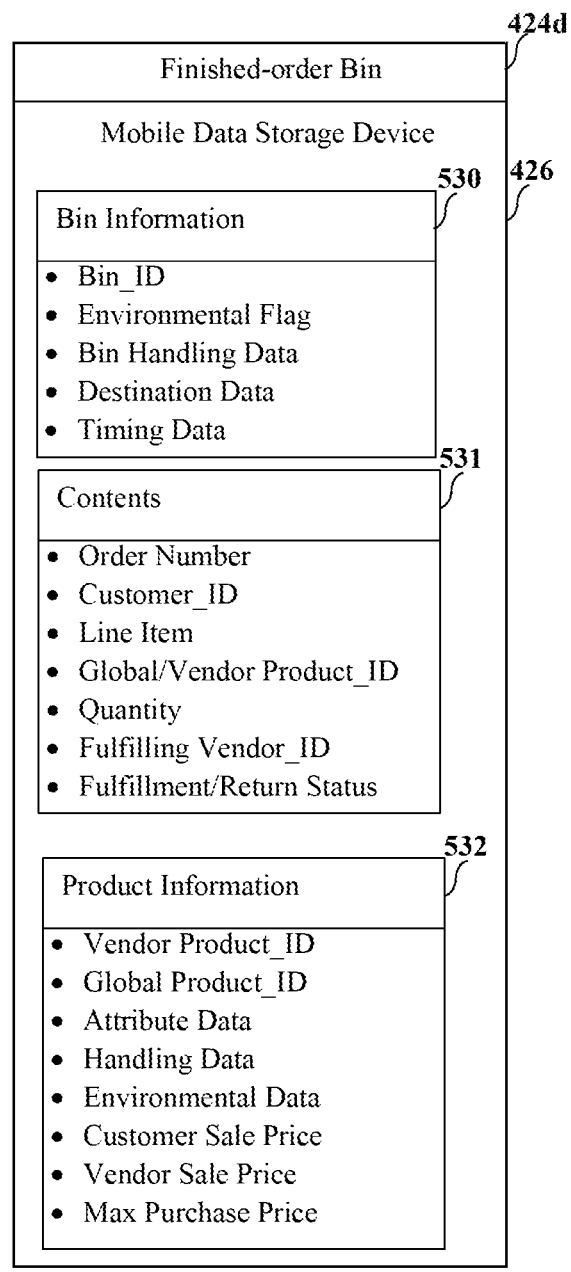

FIGS. 5C-5D illustrate local facility databases 407 and local vehicle databases 420 of the multi-entity inventory management system 400 shown in FIGS. 4A-4C, according to an embodiment herein. In an embodiment of an organizational scheme of the local facility databases 407 of the multi-entity inventory management system 400, the local facility database 407 comprises a facility storage table 522, in which only the respective storage locations of that particular facility's storage array are indexed, as opposed to the global storage locations table 511 of the central database 403 illustrated in FIG. 5B, which instead provides a global index of all the storage locations throughout the entire multi-entity inventory management system 400. Similar to the global storage locations table 511, each record of the facility storage table 522 comprises a static field for the Location_ID of a respective storage location, an environmental status indicator reflecting the environmental control category, for example, ambient storage zone, refrigeration storage zone, or freezer storage zone, to which that storage location belongs, and the Bin_ID of a storage bin currently stored at that location, if any.

The local facility database 407 further comprises an automation equipment information table 523 comprising a static field for a unique identifier (Equipment_ID) of each piece of automation equipment, for example, a robotic handler or a conveyor operable at a particular facility. The robotic handler is indexed and defines a dynamic storage location for placing and locating a storage bin while moving the storage bin within or out of the facility. In an embodiment, the conveyor also defines a storage location onto which the storage bin is being transferred within the facility or from the facility to the transport vehicle and vice versa. The Equipment_ID is used as the Location_ID of the storage bin when the storage bin is being navigated by a robotic handler or a conveyor within or out of the facility, to allow continuous tracking of the storage bin. The automation equipment information table 523 further comprises a variable field for the Bin_ID of a storage bin that is currently held on and moved by a particular robotic handler or conveyor within and out of the facility. The automation equipment information table 523 also stores other information such as equipment type, for example, a robotic handler or a conveyor, real-time location of the automation equipment, etc. In another embodiment, manual operations equipment, for example, a forklift, is also mapped to an Equipment_ID and defines a dynamic storage location. In this embodiment, the Equipment_ID of the manual operations equipment is used as the Location_ID of the storage bin when the storage bin is being manually operated on by the manual operations equipment within the facility to allow continuous tracking of the storage bin.

The local facility database 407 further comprises one or more on-site bins tables 525 that list the Bin_IDs of all storage bins and/or order bins currently on location at that particular facility. In an embodiment, the on-site bins table 525 of the local facility database 407 comprises fields for storing an empty/occupied status of each storage bin, an environmental flag, a Location_ID of a respective storage location, a destination Facility_ID, and timing data. For facilities having multiple bin types, in an embodiment, each bin type has its own respective on-site bins table 525 in the local facility database 407. The local facility database 407 further comprises a workstation information table 524 containing unique identifiers (Workstation_IDs) of different workstations situated at that particular facility; and for each such workstation, a workstation type denoting the type of work operations performed at that workstation, for example, an induction workstation, a value-added service (VAS) workstation, a kitting workstation, a picking workstation, a packing workstation, etc.; a location of the workstation in the facility, for example, in an addressed format configured to command travel of robotic handlers thereto, and/or carrying or conveyance of storage bins thereto by conveyors or other automated bin handling equipment; identification of particular work supplies stocked at that workstation, for example, packaging, labelling, and tagging supplies; and in an embodiment, one or more workstation category fields designating any specialized operating characteristics or capabilities provided at that workstation that distinguish the workstation from other workstations of the same type, for example, category fields denoting compatibility or incompatibility with particular classes of product such as food-grade workstations maintained to greater sanitary standards for exposed food handling; allergen-safe workstations at which allergenic products are prohibited, optionally organized by subcategory, for example, peanut-free, tree nut-free, gluten-free, shellfish-free, dairy-free, etc.; and hazardous goods workstations specifically for hazardous goods forbidden at other workstation categories. In an embodiment, the categorization is on a flagged basis, where only specialized workstations are flagged with a special categorization, and the lack of any such flag denotes a general-goods workstation where anything other than controlled-product classes, for example, hazardous goods, exposed food products, etc., are acceptable, regardless of potential allergen content. The local facility database 407 further comprises a facility information table 521 for storing the same or similar content to the respective record in the facilities table 507 of the central database 403 illustrated in FIG. 5A. In an embodiment, the facility information table 521 optionally stores bin quantity data identifying the quantities of empty and occupied storage bins currently residing in that facility.

As illustrated in FIG. 5D, each local vehicle database 420 comprises a vehicle storage table 527, in which only the respective storage locations of that particular transport vehicle's storage array are indexed. Similar to the facility storage table 522 of each local facility database 407, each record of the vehicle storage table 527 comprises static fields for the Location_ID of a respective storage location in the transport vehicle's indexed storage array, an environmental status indicator reflecting the environmental control category, for example, ambient storage zone, refrigeration storage zone, or freezer storage zone, to which that storage location belongs, and the Bin_ID of a storage bin currently stored at that location, if any. In an embodiment, the local vehicle database 420 further comprises an automation equipment information table 528 similar to the automation equipment information table 523 illustrated in FIG. 5C, for storing of the automation equipment installed in the transport vehicle. The local vehicle database 420 further comprises one or more onboard bins tables 529 that lists the Bin_IDs of all storage bins and/or order bins currently onboard that transport vehicle. The local vehicle database 420 further comprises a vehicle information table 526 for storing the same or similar content to the respective record in the transport vehicle table 508 of the central database 403 illustrated in FIG. 4A and FIG. 4C. In an embodiment, the vehicle information table 526 optionally stores bin quantity data identifying the quantities of empty and occupied storage bins and/or order bins currently onboard that transport vehicle.

FIGS. 5E-5F illustrate local data stored on storage bins 424a, 424b, 424c, and 424d of different categories, according to an embodiment herein. The data is stored on the mobile data storage devices 426 of the storage bins 424a, 424b, 424c, and 424d, for example, in a tabular database format similar to those employed in the central database 403 of the central computing system 401, the local facility databases 407 of the facility management subsystems 404, and the local vehicle databases 420 of the vehicle management subsystems 416 illustrated in FIGS. 4A-4C. On the mobile data storage devices 426 of the storage bins 424a and 424b that hold vendor inventory, a bin information table 530 stores the storage bin's static Bin_ID; the Compartment_IDs of the storage bin; and an environmental flag designating compatibility of the storage bin or a lack thereof, with the different environmentally controlled storage zones of the facilities and transport vehicles, at least in embodiments where environmentally specific storage bins are used, for example, employing a different material or composition of a storage bin for cold versus ambient storage, and/or between different classes of cold storage such as refrigeration versus freezer. In an embodiment, the bin information table 530 further comprises bin handling data, for example, useful in selection of a particular storage bin for a given product type by comparison of the bin handling data against the product handling data from the vendor's product table 503 illustrated in FIG. 5A, to check whether the storage bin is compatible with the product handling requirements; destination data identifying a particular facility, geographic region or other destination to or toward which the storage bin is to be transported through the multi-entity inventory management system 400 illustrated in FIGS. 4A-4C; and timing data concerning any timing restraints on the delivery of the storage bin to its intended destination. One example of bin handling data in the bin information table 530 is a designation of the particular storage bin as an allergenic-safe storage bin in which one or more particular allergenic product categories, for example, peanuts, tree nuts, gluten, shellfish, dairy, etc., are not to be placed.

Moreover, on the mobile data storage devices 426 of the storage bins 424a and 424b that hold vendor inventory, a contents table 531 documents the variable contents of the storage bin at any given time. Each record of this contents table 531 contains the Compartment_ID of a respective compartment of the storage bin, the Product_ID(s) of a product type stored in the compartment of the storage bin; the quantity of the product type stored in the compartment of the storage bin, and the Vendor_ID of a particular vendor to whom the quantity of the respective product type belongs. In an embodiment where single-compartment storage (SCS) bins 424a are employed, the inclusion of the Compartment_ID in the bin information table 530 and the contents table 531 is optional and may be omitted. Furthermore, on the mobile data storage devices 426 of the storage bins 424a and 424b that hold vendor inventory, a product information table 532 is populated from fields of the vendor's product table(s) 503 of one or more vendors whose products are contained in one or more compartments of that storage bin. Each record in the product information tables 532 of the storage bins 424a and 424b thus contains a respective vendor and/or global Product_ID from the contents table 531, and a copy of all or some fields from the corresponding product record in the vendor's product table 503 of that vendor, for example, including the handling data, the customization data, and the environmental data that will be used to guide handing and customization within one or more of the facilities, and environmental placement within both the facilities and the transport vehicles.

Moreover, the contents of the mobile data storage device 426 of a multi compartment PO bin 424c is similar to that of a multi-compartment storage (MCS) bin 424b, for example, optionally being fully or substantially identical in terms of content of the bin information table 530 and the product information table 532, though optionally with an omission of the customization data, and differing in terms of the contents table 531, where bin content is identified by a customer order since the PO bin 424c is for holding picked customer orders, not as yet unpicked vendor inventory. For the PO bins 424c, each record in the contents table 531 comprises the Compartment_ID of a respective compartment of the PO bin 424c, the order number of a particular customer order that has a picked product type in the compartment, the Customer_ID of the particular customer for whom that customer order is being fulfilled, a line item number identifying a respective line item in the customer order that is fulfilled by the picked product type in the compartment, the Product_ID(s) of the picked product type, the quantity of the picked product type in the compartment, and the Vendor_ID of the particular vendor from whose inventory the picked product type was picked. In an embodiment, each record in the contents table 531 stored in the mobile data storage device 426 of the PO bins 424c comprises destination data and order timing data.

Furthermore, the contents of the mobile data storage device 426 of a single-compartment FO bin 424d is similar to that of a multi-compartment PO bin 424c, for example, optionally being fully or substantially identical in terms of content of the bin information table 530, the bin contents table 531, and the product information table 532, though with an optional omission of the FO bin's 424d singular Compartment_ID. In a multi-SKU context, where the MCS bin 424b contains a plurality of different products in its different compartments, the mobile data storage device 426 stores multiple records in its storage bin contents table 531 and product information table 532, each for a different respective one of the products contained therein. While the MCS bins 424b are packed with multiple products from a singular vendor's product catalogue 505 based on inventory needs of that particular vendor at one or more other facilities, the multi-compartment nature of the MCS bin 424b also enables multi-vendor packing of the MCS bin 424b, where each Compartment_ID of the MCS bin 424b is assigned the Vendor_ID of a different vendor whose catalogued product item(s) is/are being placed in that compartment. Therefore, in an embodiment, if multiple vendors both require a transfer of inventory from a current given facility to another, different SCS bins 424a whose respective contents belong to those different vendors are delivered to a kitting workstation for transfer of products from these vendor-specific SCS bins 424a into different compartments of a vendor-shared MCS bin 424b. To accommodate for such bin sharing, each record in the bin contents table 531 on the mobile data storage device 426 of the MCS bin 424b comprises the Vendor_ID of the respective vendor to whom the product in that compartment belongs. During transfer of the products from the different vendors' SCS bins 424a to the MCS bin 424b, the facility management subsystem 404 thus reads the Vendor_ID from the mobile data storage device 426 of the SCS bin 424a, and records this Vendor_ID on the mobile data storage device 426 of the MCS bin 424b in association with the respective Compartment_ID of the compartment into which the product from that SCS bin 424a is being placed. In the instance of such a vendor-shared MCS bin 424b, the bin configuration data set transmitted by the central computing system 401 to the macro facility for that vendor-shared MCS bin 424b comprises multiple Vendor_IDs, each associated with one or more Product_IDs, each to be placed in a respective one of the compartments of the MCS bin 424b.

It will be appreciated that the specifically illustrated and described layout and organization of the data in the central database 403, the local facility database 407, and the local vehicle database 420 illustrated in FIGS. 5A-5D, and in the mobile data storage devices 426 of the various storage bins 424a-424d illustrated in FIGS. 5E-5F, and the particular selection of specific fields to include in the various records thereof, is provided merely for the purposes of example, as is not intended to be limiting on the scope of the embodiments disclosed herein. The particular fields identified generally pertain particularly to the operational details of a variety of embodiments detailed herein, while other embodiments may employ additional data for added or unrelated functionality, or omit optional data unnecessary for other embodiments featuring a subset of the features and functions set out in the particularly detailed embodiments.

FIG. 6A illustrates a workflow of supply, inventory and order-filled storage bins in a forward or downstream direction through the multi-entity inventory management system 400, according to an embodiment herein. FIG. 6A illustrates inbound and outbound transport among a string of mega, macro and micro facilities 10, 12 and 14, starting with receipt, at a mega facility 10, of incoming supply shipments 601a, 601b from entities such as manufacturers, suppliers, and/or distribution centers operated by external, partnered or contracting entities, herein referred to as "suppliers". The multi-entity inventory management system 400 manages the individual facilities 10, 12, 14, and 16 and the workflow therein and therebetween in relation to supply shipments, product inventory, customer orders, and the storage and order bins used to store and transport the same throughout the multi-entity inventory management system 400. At least some of the incoming supply shipments arriving at the mega facility 10 will typically be full-case shipments 601a, of which each case, for example, a cardboard box, a reusable tote, or other container, contains only one product type, that is, products with a matching Product_ID. As used herein, the term "stock keeping unit (SKU)" is used to denote a unique product identifier, that is, a global product identifier or a vendor-specific product identifier. Therefore, a single-SKU case or a single-SKU bin refers to a case or a bin containing products of the same type, whether the equivalency of these products is based on a matching SKU, a matching universal product code (UPC), or another matching global or vendor-specific product identifier shared by those products. Full-case shipments 601a often arrive in a palletized form, that is, as pallets 602, from suppliers into the mega facility 10. Each mega facility 10, therefore, comprises at least one depalletization station for depalletizing the full-case shipments 601a. Other incoming full-case shipments 601a may be loose-case shipments rather than palletized shipments, in which case depalletization is not required, and the depalletization station(s) in the mega facility 10 may be omitted or bypassed.

In addition or alternative to the full-case shipments 601a received in conventional product packaging, for example, in cardboard boxes or shipping totes, whether palletized or loose, the incoming supply shipments may optionally include pre-binned shipments 60 lb, 601c in which the products are delivered from the supplier using the storage bins 424a, 424b compatible with the indexed storage arrays of the mega, macro and micro facilities 10, 12 and 14 respectively. In such instances, these incoming storage bins 424a arriving at the mega facility 10 in a preloaded condition from the supplier may be single-compartment storage (SCS) bins 424a, each containing only products of a matching product type that can be inducted directly into the indexed storage array of the mega facility 10 without having to perform a singulation step of transferring products from the SCS bins 424a they arrived in into other SCS bins 424a.

The SCS bins 424a filled at the mega facility 10 or received via pre-binned shipments 601b, also referred to as "single-SKU bins", are loaded from the mega facility 10 onto a large transport vehicle 415a, for example, a semi-trailer truck, for downstream transport to one of the macro facilities 12. At any given macro facility 12, the facility management subsystem 404 communicates with the central computing system 401 illustrated in FIGS. 4A-4C, which on an ongoing basis identifies forecasted or current inventory needs of the various vendors at the various facilities of the multi-entity inventory management system 400, and thereby identifies inventory needs at the micro facilities 14 situated downstream of the given macro facility 12, and optionally at other macro facilities 12, that can be fulfilled by product on hand at the given macro facility 12.

At the macro facility 12, the SCS bins 424a are used for filling kit-filled, downstream-headed multi-compartment storage (DMCS) bins 424b at the macro facility 12, The DMCS bins 424b, also referred to as "multi-SKU bins", are loaded from the macro facility 12 onto a large transport vehicle 415b, for example, a semi-trailer truck, for downstream transport to one of the micro facilities 14. In an embodiment, the micro facility 14 also receives DMCS bins 424b from other facilities inside or outside the multi-entity inventory management system 400, for example, from pre-binned shipments 601c from external distribution centers, owned and operated, or contracted by, one or more of the vendors and/or external suppliers. The storage bins at the micro facility 14 comprise finished-order (FO) bins 424d that are of a different smaller standardized size and footprint than the other storage bins 424a, 424b. In an embodiment, these FO bins 424d are about half the size and footprint of the other storage bins 424a, 424b, and are each intended to contain only a singular customer order, and accordingly need not have their interiors subdivided like the DMCS bins 424b. In this embodiment, these smaller FO bins 424d are not compatible with the indexed storage arrays and robotic handlers 408 of the mega facilities 10, the macro facilities 12, and the micro facilities 14 illustrated in FIGS. 4A-4C, or with the bin carousels 422a of the transport vehicles 415a, 415b illustrated in FIGS. 4A-4C, and are instead specifically sized and configured for a different type of indexed storage array used at the nano facilities 16 and on the transport vehicles 415c. The transport vehicles 415c are smaller-scale variants of the transport vehicles 415a and 415b.

While in the detailed embodiment, the two categories of storage bins 424a, 424b are distinguished from one another by both the degree of compartmentalization, that is, non-compartmentalized SCS bins versus compartmentalized MCS bins, and by the mixed or unmixed character of products placed therein, that is, unmixed products of a single-product type of matching Product_ID placed in single-SKU SCS bins versus mixed products of multi-product types of non-matching Product_ID placed in multi-SKU MCS bins, it will be appreciated that in other embodiments, the two categories both comprise compartmentalized bins, in which case the distinction between the two categories is based on any one or more of: the quantity of compartments possessed by the storage bins in each category; the mixed/unmixed character of the contents received in the storage bins of each category; and the order in which these storage bins in each category are filled in a product's workflow through the multi-entity inventory management system 400 illustrated in FIGS. 4A-4C and FIGS. 6A-6B, that is, the first category storage bins 424*a* are filled with "supplier products" entering the multi-entity inventory management system 400 in supply shipments to fulfill vendor inventory needs, and the second category storage bins 424*b* are filled with already-inventoried "vendor products" previously inducted into the multi-entity inventory management system 400 in the first category storage bins 424*a* and ready for picking during order fulfillment. In an embodiment, the first category storage bins 424*a* are also compartmentalized bins with subdivided interiors having multiple compartments, but have a smaller quantity of compartments compared to the second category storage bins 424*b*, thereby retaining the same relationship as the detailed embodiment, where the second category MCS bins 424*b* have a greater compartment quantity than the first category SCS bins 424*a*.

The transport vehicles 415*b* intended primarily, if not exclusively, for transport between the macro and micro facilities 12, 14 may be the same large-scale vehicles 415*a* used to transport storage bins between the mega and macro facilities 10, 12. The terms "mega-macro transport vehicle" 415*a* and "macro-micro transport vehicle" 415*b* are used herein to distinguish the transport vehicles travelling between the mega and macro facilities 10, 12 from those travelling between the macro and micro facilities 12, 14. In an embodiment, these transport vehicles are of an identical or similar configuration to one another, and different primarily or exclusively in terms of the particular facilities they service.

FIG. 6B illustrates a workflow of empty and customer-return storage bins 424*a*, 424*b*, 424*d* in a reverse or upstream direction through the multi-entity inventory management system 400, according to an embodiment herein. At each point in the inventory management workflow where storage bins are transferred in a downstream direction from a facility to a departing transport vehicle, one or more storage bins are transferred in the reverse upstream direction. For example, when product-filled single-compartment storage bins 424*a* from the mega facility 10 are being offloaded from an arriving mega-macro transport vehicle 415*a* at an inbound loading dock of a macro facility 12, empty SCS bins 424*a* from the macro facility 12 are loaded onto the same mega-macro transport vehicle 415*a* for transport back to the same mega facility 10 from which the incoming product-filled SCS bins 424*a* are arriving. On arrival back at the mega facility 10, the transport vehicle 415*a* can therefore drop off a set of empty SCS bins 424*a* from the macro facility 12, and pick up a next set of filled SCS bins 424*a* for transport back to the macro facility 12, or to another destination for which the transport vehicle 415*a* is next scheduled. While this embodiment refers to an upstream return of empty SCS bins 424*a* back to the same mega facility 10 from which the transport vehicle 415*a* previously travelled to the macro facility 12 whose empty SCS bins 424*a* are being picked up, in another embodiment, the transport vehicle 415*a* departs this macro facility 12 to a different upstream mega facility 10 than that from which the transport vehicle 415*a* originated. That is, the transport vehicle 415*a* takes empty SCS bins 424*a* from a macro facility 12 to a different mega facility 10 than that from which the same transport vehicle 415*a* just delivered filled SCS bins 424*a* to that macro facility 12. Accordingly, any transfer of SCS bins 424*a* between a facility and a transport vehicle involves a swap or an exchange of the SCS bins 424*a*, where upstream-headed storage bins, for example, empty SCS bins, and downstream-headed storage bins, for example, filled SCS bins are exchanged with one another.

The multi-entity inventory management system 400 disclosed herein implements an autonomous, orderly management of the inventory management workflow where the storage bins 424*a*, 424*b*, 424*d* are exchanged in a one-to-one correspondence, that is. 1:1, at each of the facilities 10, 12, 14, 16 including the endpoint, to allow an equivalent and continuous flow of the storage bins 424*a*, 424*b*, 424*d* in the forward direction and the reverse direction through the multi-entity inventory management system 400. The multi-entity inventory management system 400, therefore, allows 1:1 transactions at each of the facilities 10, 12, 14, 16 and the corresponding transport vehicles 415*a*, 415*b*, 415*c*, thereby allowing the reverse flow of the storage bins 424*a*, 424*b*, 424*d* illustrated in FIG. 6B to be the same as the forward flow illustrated in FIG. 6A, thereby making the multi-entity inventory management system 400 orderly.

As disclosed in the detailed description of FIG. 4A, each transport vehicle 415*a*, 415*b*, 415*c* illustrated in FIGS. 6A-6B, is equipped with a global positioning system (GPS) device 419 that tracks the movement and the location of the transport vehicle 415*a*, 415*b*, 415*c*, and a wide area communications device 418 that communicates the current location of the transport vehicle 415*a*, 415*b*, 415*c* to the central computing system 401. Querying of the stocked inventory table 504 in the central database 403 for a product currently stored in any storage bin 424*a*, 424*b* currently travelling on a transport vehicle 415*a*, 415*b*, therefore, reports the current GPS location of that storage bin 424*a*, 424*b* based on the GPS coordinates of the transport vehicle 415*a*, 415*b* on which the storage bin 424*a*, 424*b* travels. Similarly, querying of the central database 403 for any customer order whose order number is recorded in the finished-order (FO) bins table 514 for an FO bin 424*d* currently travelling on a transport vehicle 415*c*, therefore, reports the current GPS location of that FO bin 424*d* based on the GPS coordinates of the transport vehicle 415*c* on which the FO bin 424*d* travels. As a result, comprehensive monitoring and tracking of storage and order bins 424 illustrated in FIG. 4B, throughout the multi-entity inventory management system 400 is accomplished.

While the loading/unloading procedures at the various facilities refer to the upstream flow of empty storage bins, other storage bins may also be transported upstream in the same manner. For example, storage bins comprising order bins containing customer returns dropped off at a nano facility 16 are transported upstream for return to a vendor, a supplier, or a manufacturer situated near an upstream facility in the multi-entity inventory management system 400, or to the operating entity if the operating entity has been contracted to handle customer returns on behalf of the vendor, the supplier, or the manufacturer. A customer with a product return, for example, one or more faulty, improperly sized or unsatisfactory products received in their customer order, sends a product return request to the vendor, or to the operating entity if the vendor's e-commerce platform, for example, the vendor's sales/return platform is integrated into the operating entity's platform, in response to which a product return entry is generated in the central database 403 illustrated in FIG. 4A, which includes the Facility_ID of a nano facility 16 closest to the customer, for example, based on the customer address stored in the customer orders table 516 of the central database 403 illustrated in FIG. 5B, from the original order or identified in the later-generated return entry, or of any other nano facility 16 specified by the customer in their return request.

The central computing system 401 illustrated in FIG. 4A, checks for the presence of an empty order bin in the selected nano facility 16, and upon detection of the empty order bin, updates the recorded status of that order bin in the central database 403 to a designated "return" bin, for example, by way of a fulfillment/return status field in the FO bins table 514 as illustrated in FIG. 5B. The central computing system 401 also signals the facility management subsystem 404 of this status change, which in turn, wirelessly updates the same fulfillment/return status field in the contents table 531 on the mobile data storage device 426 of the designated return bin illustrated in FIG. 5F, and in the local facility database 407 if such status is also stored therein. The central computing system 401 also sends the user an order-return drop-off code similar to an order-pickup access code. The order-return drop-off code will give the user access to the indexed storage location of the designated return bin, in which the user places the product(s) to be returned to the vendor, the supplier, or the manufacturer. The next time that a micro-nano transport vehicle 415c with filled FO bins 424d arrives at the nano facility 16 and is scheduled to travel therefrom to a micro facility 14 to or through which the return product should be routed upstream toward a targeted returns workstation of a micro facility 14, the designated return bin is loaded onto that micro-nano transport vehicle 415c, optionally along with empty FO bins and/or other designated return bins.

Accordingly, whether at a nano facility 16 or any other facility, in an embodiment, any transfer of storage bins between a facility and a transport vehicle involves a bin swap or a bin exchange performed on an at least partially or fully automated basis, for example, a swap of only filled storage bins for only empty storage bins such as filled downstream-headed finished-order (DFO) bins for only empty upstream-headed finished-order (UFO) bins; a swap of only filled storage bins for only filled storage bins such as filled DFO bins for only return UFO bins; or a swap of only filled storage bins for a combination of filled storage bins and empty storage bins such as filled DFO bins for a combination of empty and return UFO bins. Each group of one or more storage bins, for example, empty storage bins, filled storage bins or a combination thereof, being dropped off at a first facility is, therefore, exchanged for a group of one or more storage bins, for example, empty storage bins, filled storage bins or a combination thereof, departing for a second facility, based on the fact that such departing storage bins are not currently required at the first facility, or based on a shortage of, or demand for, storage bins at the second facility.

Transport vehicles need not be dedicated to upstream/downstream inter-class transport from one class of facility to another, for example, mega-macro, macro-micro, and micro-nano, and in an embodiment, comprise lateral intra-class transport among different facilities within the same class. Accordingly, exchanging or swapping of storage bins at each transport vehicle/facility transfer phase is not limited to an exchange of downstream-headed storage bins for upstream-headed storage bins, as disclosed in the above embodiments where such designation of "downstream-headed" versus "upstream-headed" bins is used for the convenience of maintaining a distinction between the two sets of storage bins involved in the bin swap or exchange at a loading dock, and during transport of the storage bins from an outbound loading dock at one facility to an inbound loading dock of another facility. In this manner, "downstream-headed" storage bins can be continuously referred to as such from the time they depart the outbound loading dock of one facility and arrive at an inbound loading dock of another, as opposed to referring to "incoming bins" and "outgoing bins", where the same set of bins switch from one designation to another mid-travel. Accordingly, a similar swap or exchange of storage bins during loading and unloading of a transport vehicle, and the exchange of data between the facilities, the transport vehicles, and the storage bins, therefore, take place regardless of the particular facility at which such exchange is taking place and the particular next facility to which the transport vehicle will travel.

FIG. 7 illustrates a three-dimensional gridded storage structure 700 configured to fully or partly define a three-dimensional array of indexed storage locations within each of the mega, macro and micro facilities 10, 12 and 14 of the multi-entity inventory management system 400 shown in FIGS. 4A-4C and FIGS. 6A-6B, according to an embodiment herein. As illustrated in FIG. 7, the three-dimensional gridded storage structure 700 comprises a gridded upper track layout 701 positioned in an elevated horizontal plane above a matching and aligned gridded lower track layout 702 positioned in a lower horizontal plane proximal to a ground level. Between these aligned gridded upper and lower track layouts 701 and 702 is a three-dimensional array of shelved storage locations, each capable of holding a respective storage bin 424 therein. The storage locations are arranged in vertical columns 703, in which storage locations of an equal square footprint are aligned over one another. Each such vertical column 703 is neighboured by a vertically upright shaft 704 that is absent of any shelving and storage bins 424 to enable vertical travel of the robotic handlers 408 therethrough, whereby the storage locations of the neighbouring storage column are accessible by the robotic handlers 408 from this open vertically upright shaft 704. The fleet of robotic handlers 408 is configured to horizontally traverse each track layout 701 and 702 in two dimensions and traverse vertically between the two track layouts 701 and 702 via the open vertically upright shafts 704.

Each of the track layouts 701 and 702 comprises a set of X-direction rails lying in the X-direction of the respective horizontal plane, and a set of Y-direction rails perpendicularly crossing the X-direction rails in the Y-direction of the same horizontal plane. The crossing rails define a horizontal reference grid of a storage system, where each horizontal grid row is delimited between an adjacent pair of the X-direction rails and each horizontal grid column is delimited between an adjacent pair of the Y-direction rails. Each intersection point between one of the horizontal grid columns and one of the horizontal grid rows denotes the position of a respective vertical column 703 or a respective upright shaft 704. That is, each vertical column 703 and each upright shaft 704 reside at a respective Cartesian coordinate point of the reference grid at a respective area bound between two of the X-direction rails and two of the Y-direction rails. Each such area bound between four rails in either track layout is also referred to herein as a respective "spot" of the track layout. The three-dimensional addressing of each storage location in the gridded storage structure 700 is completed by the given vertical level at which the given storage location resides within the respective storage column. That is, a three-dimensional address of each storage location is dictated by the horizontal grid row, the horizontal grid column, and the vertical column level of the storage location in the three-dimensional gridded storage structure 700. The gridded storage structure 700, therefore, defines an indexed three-dimensional array of storage locations, each identifiable by its respective Cartesian address in the gridded storage structure 700. In an embodiment, extension tracks and other grid structures are coupled to the gridded storage structure 700 to lead to and serve other areas, for example, workstations, loading docks, etc., of a facility, thereby enabling carrying of the storage bins 424 between the gridded storage structure 700 and such other areas, and within such other areas.

In various embodiments, instead of the use of this particular type of gridded storage structure 700 and robotic handler 408 at the mega, macro and micro facilities 10, 12 and 14 illustrated in FIGS. 4A-4C and FIGS. 6A-6B, other types of indexed storage arrays and cooperating robotic handlers similarly capable of receiving, storing, and extracting standardized storage bins 424 of a predetermined size and configuration at each facility are used. As used herein, with respect to the gridded storage structure 700 and corresponding robotic handlers 408, the predetermined size of the standardized storage bins 424 refers to a size and a footprint that are configured to fit atop an upper platform of the robotic handler 408, and also within the footprint and confines of each shelved storage location in the gridded storage structure 700. The configuration of the storage bin 424 refers to appropriate features thereon for engagement by an extendable/retractable arm of the robotic handler 408 that is operable to pull the storage bin 424 out of a storage location onto the robotic handler 408, and to push the storage bin 424 off the robotic handler 408 into a storage location. Where other types of storage arrays and robotic handlers are used, the predetermined size and configuration of the standardized storage bins 424 are defined by the particular details of the storage array structure/environment, and the cooperative robotic handlers operating in the structure/environment.

In an embodiment, each facility comprises both an ambient storage area at an ambient room temperature, and one or more environmentally controlled storage areas, for example, comprising one or more cold storage areas such as a refrigeration area of a less-than-ambient temperature and a freezer area of an even lesser temperature, for environmentally sensitive inventory. In an embodiment, each such environmentally distinct storage area contains a respective portion of the overall indexed storage array of the facility, for example, with a separate gridded storage structure in each of these environmentally distinct storage areas to define a respective subset of the storage locations of the overall array. In another embodiment, the environmentally distinct storage areas are environmentally isolated zones of a shared singular storage structure as disclosed below for the embodiment illustrated herein. In other embodiments, only a subset of the facilities has multiple environmentally distinct storage areas of varying environmental conditions. For example, all facilities at the larger upper tiers of the multi-entity inventory management system 400 illustrated in FIGS. 6A-6B, for example, the mega facilities 10 and the macro facilities 12, each comprise multiple environmentally distinct storage areas, while only partial subsets of the lower tier micro facilities 14 and nano facilities 16 comprise environmentally controlled storage areas, with other facilities at these lower tiers optionally being dedicated to ambient storage only. In an embodiment, the number of environmentally distinct storage areas and their relative proportions and positions in the gridded storage structure 700 can vary. Through such subdivision of the gridded storage structure 700 into environmentally distinct storage areas, the environmentally distinct storage areas are served by the same shared fleet of robotic handlers 408 operating on the gridded storage structure 700. In another embodiment, smaller separate storage structures in different environmentally controlled subsections of the facilities 10, 12, 14 are employed as an alternative to a singular gridded storage structure 700 subdivided into environmentally isolated and distinct storage areas.

The terms "facility-based array" and "vehicle-based array" are used herein to distinguish between the storage arrays in the static facilities 10, 12, 14, 16 and the storage arrays in the transport vehicles 415a, 415b illustrated in FIGS. 4A-4C and FIGS. 6A-6B. The bin carousels 422a, 422b of the transport vehicles 415a, 415b form a dynamic array of storage locations, herein referred to as a "dynamic storage array", in which each carousel platform denotes a respective storage location having a unique Location_ID that is stored in the vehicle storage table 527 of the local vehicle database 420 and in the global storage locations table 511 of the central database 403 illustrated in FIG. 5D and FIG. 5B respectively. However, each storage location in the vehicle-based array is movable into different positions within a trailer 1003 of each transport vehicle 415a, 415b by operation of the respective bin carousels 422a, 422b. This differs from the static indexed storage arrays at the facilities 10, 12 and 14 of the multi-entity inventory management system 400, where each storage location in the gridded storage structure 700 is at a fixed static position and not a dynamically movable position. The use of a dynamic storage array in the transport vehicle 415a enables convenient loading of the storage bins 424a, 424b from the rear door of the trailer. In other embodiments, a different type of an indexed storage array is used in the transport vehicle 415a, 415b, for example, a miniaturized version of the robotically-served gridded storage structures used in the mega, macro and micro facilities 10, 12 and 14, or another human or robot-served storage array with discrete storage locations, for example, shelves, cubbies, etc., suitably sized to specifically fit the standardized size and shape of the storage bins 424a, 424b, where each storage location is indexed with a respective Location_ID in the local vehicle database 420 and the central database 403. In the embodiment where the dynamic storage locations, for example, the carousel platforms, are loaded directly at the rear end of the trailer, extension tracks from the gridded storage structure(s) 700 in any of the mega, macro and micro facilities 10, 12 and 14 are run to loading docks for direct loading and unloading of the transport vehicle 415a, 415b in an automated manner using the same fleet of robotic handlers 408 that serve the gridded storage structure 700, thereby avoiding any intermediary transfers of the storage bins to other automated handling equipment or personnel, whether those extension tracks are parts of a shared loading grid structure that serve multiple loading docks or are distinctly separate track systems leading to different loading docks of the given facility.

The multi-entity inventory management system 400 disclosed herein allows multiple vendors to share a national or other large-scale infrastructure for order fulfillment and inventory management. The entire multi-entity inventory management system 400 comprising both the network of facilities and the transport vehicles travelling therebetween, forms a singular storage environment throughout which inventory is accurately tracked and redistributed. Though the foregoing description describes a typical downstream flow path from a mega facility 10 through to a nano facility 16, the compatibility of the standardized storage bins with the standardized storage array type used at each of the mega, macro and micro facilities 10, 12 and 14 and in each transport vehicle moving therebetween allows a storage bin from any of the mega, macro or micro facilities 10, 12 or 14 to be transported to any other such facility. Any vendor's inventory can, therefore, be distributed strategically to allow expedited delivery anywhere within the nation-wide or other geographic expanse of the multi-entity inventory management system 400. In an embodiment, supply shipment singulation and mega-to-macro bin transfers are typically achieved within 24 hours, multi-SKU kitting and macro-to-micro bin transfers are typically achieved within 4-6 hours, and order kitting and packing and micro-to-nano transfers are typically achieved within 2 hours.

Figure 8A:
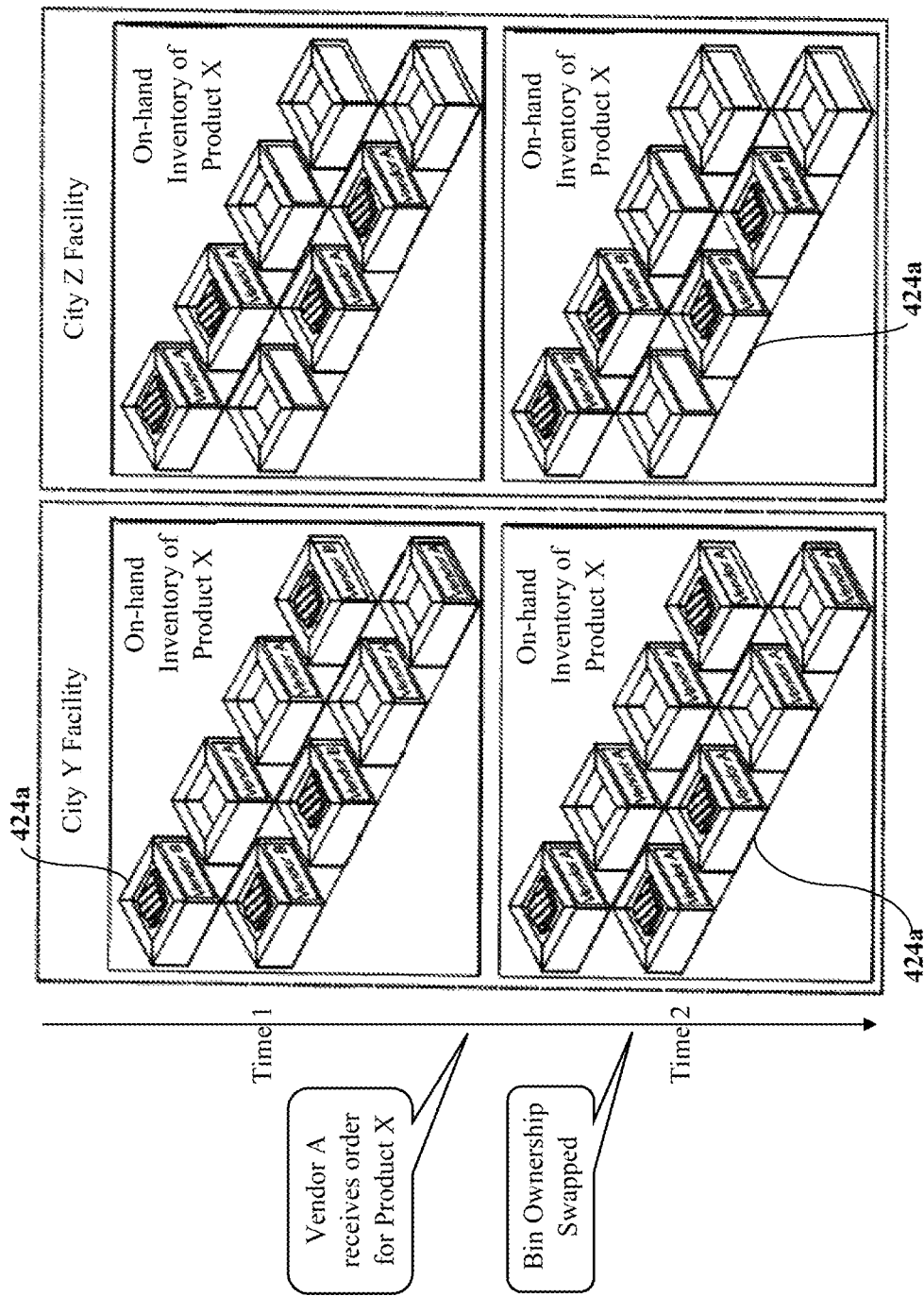
FIG. 8A illustrates a schematic showing an effect of a computer-implemented, inter-vendor inventory swap between a first geographic region and a second geographic region, where ownership of a stocked bin of a needful vendor at the second geographic region is digitally transferred to a stocked bin of another vendor at the first geographic region to overcome an inventory shortfall of the needful vendor in the first geographic region, according to an embodiment herein.

FIG. 8A illustrates a schematic showing an effect of a computer-implemented, inter-vendor inventory swap between a first geographic region and a second geographic region, where ownership of a stocked bin of a needful vendor at the second geographic region is digitally transferred to a stocked bin of another vendor at the first geographic region to overcome an inventory shortfall of the needful vendor in the first geographic region, according to an embodiment herein. As disclosed above, storage bins 424a or compartments of the storage bins 424b are assigned to particular vendors during filling of the storage bins 424a, 424b based on which each vendor's products are placed in the respective storage bin or compartment, as follows: The Vendor_ID of the vendor is written against the Bin_ID of the storage bin or the Compartment_ID of the compartment in which that product is placed in the storage bin contents table 510 of the central database 403 illustrated in FIG. 5A; a record is created in the stocked inventory table 504 of the vendor for that Bin_ID or Compartment_ID that also contains the Product_ID and the quantity of the product placed in the storage bin or the compartment; and in an embodiment, appropriate bin data is written to the mobile data storage device 426 of the storage bin illustrated in FIG. 4B and FIGS. 5E-5F, in addition to a record in the contents table 531 being populated with that Vendor_ID and Product_ID to record and link the same against the Bin_ID of the storage bin or the Compartment_ID of the compartment in which the product was placed. In an embodiment, this assignability of the storage bins 424a and the compartments of the storage bins 424b is also optionally employed in reassignment of inventory from one vendor to another within the supply chain ecosystem. In an embodiment, the multi-entity inventory management system 400 illustrated in FIGS. 4A-4C, implements a computer-implemented, inter-vendor inventory swap when one vendor, herein referred to as a "needful vendor", has insufficient inventory on-hand, that is, an inventory shortfall, to meet demand, for example, an actual demand based on one or more actual customer orders or a predicted demand based on historical trends or an anticipated uptake based on current or recent events, for one or more needed products at a particular facility or within a particular sub-region of the geographic expanse of the network of facilities, but another vendor, herein referred to as a "stocked vendor", has available inventory of the needed product(s) at the facility or sub-region of the needful vendor's inventory shortfall. In this embodiment, the inter-vendor inventory swap comprises digital swapping of ownership of a stocked bin(s) of the needful vendor at the second geographic region with a stocked bin of another vendor at the first geographic area to overcome the needful vendor's inventory shortfall in the first geographic region.

Consider an example of product reassignment where a customer in City Y places an order for a product of a particular product type from Vendor A, but Vendor A does not have that product of that product type in their inventory at any macro, micro or mega facility located in or near City Y. In this example, Vendor A is a needful vendor having an inventory shortfall of the customer-ordered product of a particular product type at the City Y facilities. In this example, Vendor B has the needed product in stock at one of its mega, macro or micro facilities in or near City Y. The central computing system 401 illustrated in FIG. 4A and FIG. 4C receives the customer order, queries Vendor A's product catalogue 505 for the ordered product, and finds that Vendor A lacks inventory of that product at any facility in or near City Y, but, in this example, does have a stock of that product in a storage bin 424a in City Z, which, in this example, is situated too far from City Y for a timely fulfillment of the customer order, for example, according to the timing constraints defined by the shipping preferences stored in customer orders table 516 illustrated in FIG. 5B. Having identified this inventory shortfall of Vendor A, the central computing system 401 queries the stocked inventory table 504 of the other vendors' product catalogues 505 for the global Product_ID of the customer-ordered product type and identifies that Vendor B has the needed product at a mega, macro or micro facility in or near City Y.

If Vendor A's and Vendor B's in-stock products are both in single-compartment storage (SCS) bins 424a as exemplarily illustrated in FIG. 8A, and the quantities in Vendor A's City Z SCS bin 424a and Vendor B's City Y SCS bin 424a are equal, in an embodiment, the central computing system 401 reassigns Vendor B's City Y SCS bin 424a to Vendor A and reassigns Vendor A's City Z SCS bin 424a to Vendor B, by digitally swapping the Bin_IDs and/or corresponding singular Compartment_IDs thereof, in embodiments where such Compartment_IDs are necessitated in the stocked inventory tables 504 due to inclusion of multi-compartment storage bins also employed in the multi-entity inventory management system 400, currently recorded in the two vendors' product catalogue entries for the given product in their respective stocked inventory tables 504, and digitally swapping the Vendor_IDs stored in the storage bin contents table 510 of the central database 403 for those two storage bins 424a.

Figure 8B:
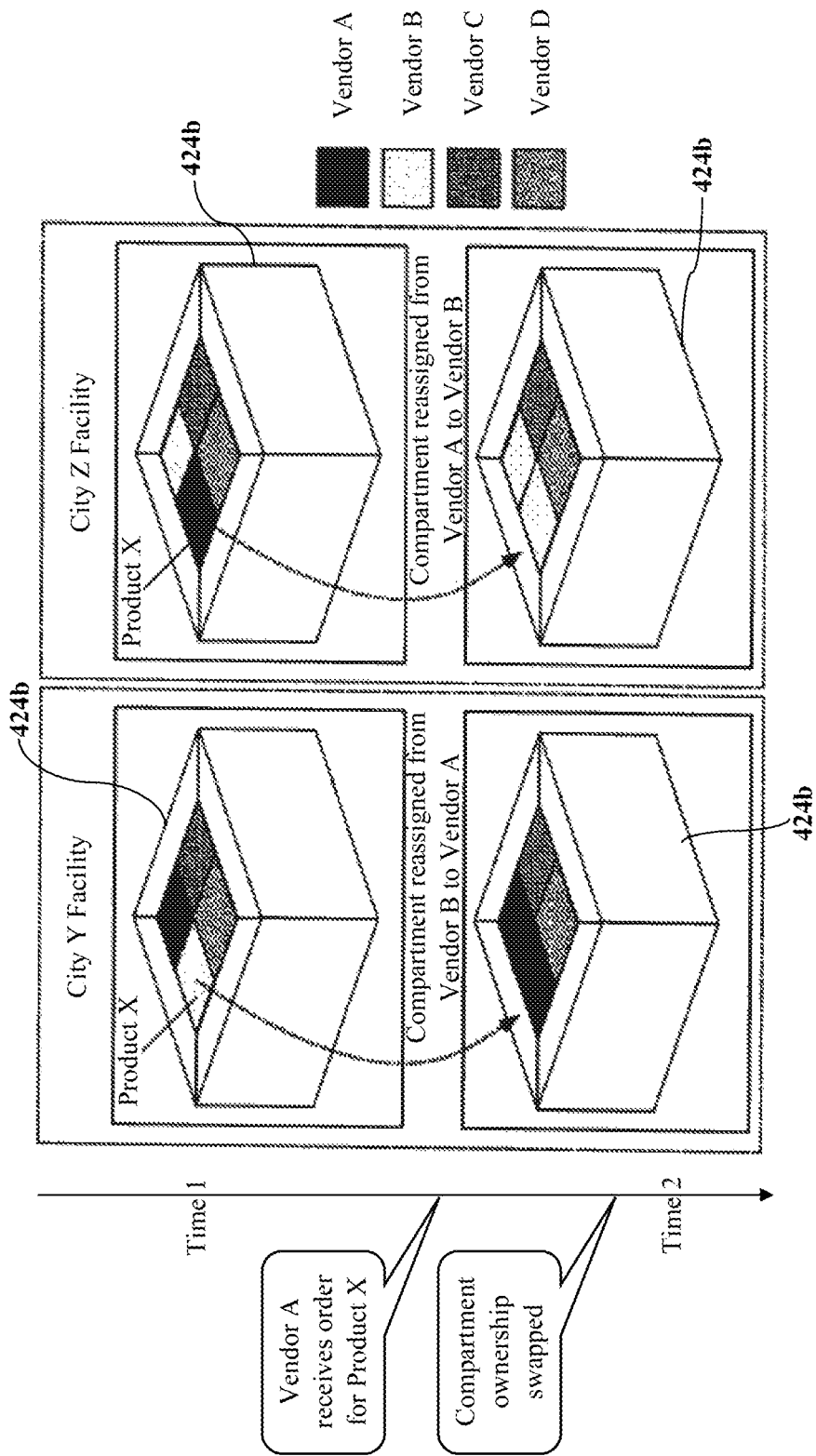
FIG. 8B illustrates a schematic showing an effect of a computer-implemented, inter-vendor inventory swap where ownership of one or more compartments of multi compartment storage bins is digitally reassigned to overcome an inventory shortfall of a needful vendor in a geographic region, according to an embodiment herein.

FIG. 8B illustrates a schematic showing an effect of a computer-implemented, inter-vendor inventory swap where ownership of one or more compartments of multi-compartment storage (MCS) bins 424b is digitally reassigned to overcome an inventory shortfall of a needful vendor in a geographic region, according to an embodiment herein. If Vendor A's and Vendor B's in-stock products are both in MCS bins 424b as exemplarily illustrated in FIG. 8B, and the quantities of the product in Vendor A's compartment of the MCS bin 424b at the City Z facility and in Vendor B's compartment of the MCS bin 424b at the City Y facility are equal, in an embodiment, the central computing system 401 illustrated in FIG. 4A and FIG. 4C, reassigns Vendor B's compartment of the MCS bin 424b at the City Y facility that contains the product needed by Vendor A to Vendor A and reassigns the corresponding Vendor A's compartment of the MCS bin 424b at the City Z facility that contains the product to be swapped with that of Vendor B to Vendor B, by swapping the Compartment_IDs of those two compartments in the two vendor's stocked inventory tables 504 and swapping the Vendor_IDs stored in the storage bin contents table 510 for those two compartments. Whether the compartments of the SCS bins or MCS bins are being swapped in this manner, the facility management subsystems 404 illustrated in FIGS. 4A-4C, at the two facilities are also commanded by the central computing system 401 to respectively communicate with the wireless communications units 425 of the two storage bins 424a, 424b to update the bin data on the mobile data storage devices 426 thereof illustrated in FIGS. 5E-5F, particularly to record the swapped Vendor_IDs in the bin contents tables 531 of the those two storage bins 424a, 424b, and to update the product information tables 532 based on the vendor-specific product information for the vendor whose Vendor_ID is being written to each storage bin 424a, 424b, and to move the destination and timing data from the storage bin 424a, 424b at the City Y facility to the storage bin 424a, 424b at the City Z facility.

The storage bin 424a, 424b at the City Y facility, rather than receiving a reassignment of the destination and timing data from the storage bin 424a, 424b at the City Z facility, is instead assigned new destination and timing data according to the particular needs of Vendor A's inventory shortfall. That is, the reassigned storage bin 424a, 424b at the City Y facility has its destination facility field rewritten as the Facility_ID at which Vendor A's inventory shortfall needs to be fulfilled and has its timing data rewritten according to the urgency at which relocation to such facility must take place. For example, when the inventory shortfall is in response to an open order from a customer of Vendor A and the reassigned storage bin at City Y is an SCS bin 424a currently residing at a mega facility in City Y, then in an embodiment, the SCS bin 424a is assigned the Facility_ID of the micro facility that serves the particular nano facility to which that customer order must be delivered once fulfilled, and is assigned timing data according to a priority status or a targeted delivery date defined by the shipping preferences for that open customer order.

Accordingly, the reassigned SCS bin 424a is identifiable as a candidate downstream-headed single-compartment storage (DSCS) bin to load onto the next transport vehicle 415a departing the mega facility 10 for the particular macro facility 12 that serves the particular micro facility 14 that in turn serves the particular nano facility 16 illustrated in FIG. 6A, for the open customer order. A loading/unloading procedure is next performed at that mega facility 10 for such transport vehicle 415a during which the mega facility management subsystem 404 commands retrieval of the reassigned SCS bin 424a at the City Y mega facility by a robotic handler 408 illustrated in FIGS. 4A-4C, and transfer of the reassigned SCS bin 424a onto the transport vehicle 415a. On arrival at the macro facility 12, the reassigned SCS bin 424a is recognized as requiring immediate value-added service (VAS) processing, if applicable, in the loading/unloading process performed at the macro facility 12. Having been informed of the reassigned SCS bin's 424a arrival at the macro facility 12, the central computing system 401 incorporates the shortfall quantity of the product contained in the reassigned SCS bin 424a and the Facility_ID of the particular micro facility 14 to which the shortfall quantity of the product must be transported, into a bin configuration data set of a product request received for the kitting process disclosed in Applicant's U.S. Non-provisional patent application Ser. No. 16/805,810, which is incorporated herein by reference in its entirety. Each bin configuration data set comprises: the Vendor_ID of a needful vendor who requires one or more product types at the needful facility; the Product_ID(s) of each of those product types; the quantity of each of the product types required at the needful facility; the Bin_ID(s) of the SCS bin(s) 424a that contain(s) the required quantity/quantities of the product type(s) at the macro facility 12; the Facility_ID of the needful facility; and timing information concerning delivery timeline constraints or urgency for fulfillment of the product need.

The central computing system 401 triggers a robotic handler 408 to bring the reassigned SCS bin 424a to a kitting workstation at the macro facility 12 for transfer of the shortfall quantity of the product to an MCS bin 424b whose destination facility field for the compartment in which the shortfall quantity of the product is placed is updated with the Facility_ID of the particular micro facility 14. The MCS bin 424b is identified for immediate transport and thus loaded by a robotic handler 408 onto the next transport vehicle 415b headed for that micro facility 14 if already present at the outbound loading dock, or in an embodiment, is temporarily buffered in the indexed storage array of the macro facility 12 by a robotic handler 408 and then later pulled therefrom by the same or another robotic handler 408 as a candidate downstream-headed multi-compartment storage (DMCS) bin during the next loading/unloading process performed upon arrival of the transport vehicle 415b at the outbound docks of the macro facility 12. On arrival at the micro facility 14, the shortfall quantity of the product in the MCS bin 424b is recognized as fulfilling the outstanding product need of the open customer order, and thus is routed to an order-picking workstation of the micro facility 14 for performance of the order fulfillment process disclosed in Applicant's U.S. Non-provisional patent application Ser. No. 16/805,810, which is incorporated herein by reference in its entirety, and resulting transport of the fulfilled order to the particular nano facility 16. It will be appreciated that the shortfall product quantity may be equal to or less than the reassigned product quantity, and therefore, the MCS bin 424b may contain all, or only a subset, of the reassigned product quantity.

In another example where the inventory shortfall is again in response to an open order from a customer of Vendor A and the reassigned product inventory resides in an SCS bin 424a at a macro facility 12 rather than a mega facility 10, the facility management subsystem 404 of the macro facility 12 writes the Facility_ID of the micro facility 14 that serves the particular nano facility 16 to which that open customer order must be delivered once fulfilled to the mobile data storage device 426 of the SCS bin 424a, assigns timing data according to a priority status or a targeted delivery date defined by the shipping preferences for that open customer order, and in an embodiment, optionally calls for VAS processing of the reassigned SCS bin 424a in accordance with the process disclosed in Applicant's U.S. Non-provisional patent application Ser. No. 16/805,810, which is incorporated herein by reference in its entirety, though only if defined by Vendor A's newly written product record in the SCS bin's 424a product information table 532, followed by a command of the kitting process and subsequent steps as disclosed in the preceding paragraph. In another example where the reassigned product inventory resides at a macro facility 12 in an MCS bin 424b rather than an SCS bin 424a, the facility management subsystem 404 of the macro facility 12 rewrites the destination facility and timing data fields of the appropriate compartment-specific record in the MCS bin's 424b contents table 531 to indicate the Facility_ID of the micro facility 14 that serves the particular nano facility 16 assigned to the open customer order so that the MCS bin 424b containing the re-assigned product inventory is deemed a candidate DMCS bin in the loading/unloading process executed for the next transport vehicle 415b arriving at the macro facility's 12 outbound loading dock and next-destined for that particular micro facility 14.

In yet another example where the inventory shortfall is again in response to an open order from a customer of Vendor A, but the reassigned storage bin at the City Y facility is an MCS bin 424b already residing at the micro facility 14 that serves the particular nano facility 16 for that customer order, the destination Facility_ID and timing data on that MCS bin 424b need not be changed, as the MCS bin 424b is already at its intended destination. In this example, the central computing system 401 notifies the facility management subsystem 404 of the micro facility 14 that the formerly open customer order is now a fillable order due to the addition of the product(s) in the reassigned compartment (s) of this MCS bin 424b to Vendor A's inventory, in response to which the facility management subsystem 404 of the micro facility 14 executes the order fulfillment process disclosed in Applicant's U.S. Non-provisional patent application Ser. No. 16/805,810, in which the facility management subsystem 404 commands an automated retrieval of the reassigned MCS bin 424b from the gridded storage structure by a robotic handler 408 to bring the MCS bin 424b to an order-picking workstation of the micro facility 14.

In the foregoing examples, the storage bin 424a, 424b reassigned to the needful Vendor A follows an inventory distribution workflow path, where inventory product from an SCS bin 424a is transferred into an MCS 424b at a macro facility 12 before being transported onward to a micro facility 14 where the customer order is picked from the MCS bin 424b. In an embodiment, the ordered product reassigned to the needful Vendor A is handled in an alternative method bypassing one or more of the inventory distribution workflow steps. For example, a reassigned SCS bin 424a with the ordered product, instead of being updated with the Facility_ID of a macro facility 12 as the SCS bin's 424a new destination facility, is assigned the Facility_ID of the particular micro facility 14 at which the order is to be fulfilled, that is, the micro facility 14 which serves the nano facility 16 assigned to the order, whereby the reassigned SCS bin 424a containing the ordered product bypasses the macro facility kitting process of the macro facility 12, and the ordered product is picked directly from the reassigned SCS bin 424a at the micro facility 14, rather than from an MCS bin 424b to which the ordered product was transferred upstream at, a macro facility 12.

Furthermore, while the foregoing examples comprise scenarios where the storage bins 424a, 424b whose contents are being digitally swapped are situated in facilities at the time of reassignment, the same process can also be performed in scenarios where one or both of the storage bins 424a, 424b whose contents are being digitally swapped reside on a transport vehicle 415a, 415b travelling between mega, macro and micro facilities 10, 12, 14, in which case the data update performed on the mobile data storage device 426 of the SCS bin 424a or the MCS bin 424b is performed by the vehicle management subsystem 416 of the transport vehicle 415a, 415b, rather than by the facility management subsystem 404 illustrated in FIGS. 4A-4C. The updated bin data will be read in the loading/unloading process performed at the next facility at which the transport vehicle 415a, 415b arrives and will be used to automatically govern the transfer of the storage bin to appropriate workstations, automatically govern worker interactions with the storage bin thereat, or automatically govern cross-docking of the storage bin, according to the newly revised bin data.

Consider another example of digital swapping of inventory in equal quantities, where one of Vendor A and Vendor B has their in-stock product(s) in an SCS bin 424a and the other of Vendor A and Vendor B has their in-stock product(s) in a compartment of an MCS bin 424b, and the quantities in the SCS bin 424a and the compartment of the MCS bin 424b are equal. In this example, the central computing system 401 reassigns Vendor B's City Y in-stock product to Vendor A and reassigns Vendor A's City Z in-stock product to Vendor B by swapping the Compartment_IDs currently recorded for those products in their respective stocked inventory tables 504, and swapping the Vendor_IDs stored in the storage bin contents table 510 for the compartment of the corresponding MCS bin 424b and the SCS bin 424a. The central computing system 401 commands the facility management subsystems 404 to update the bin data on the mobile data storages devices 426 of the two storage bins 424a, 424b, wherein the updating of the SCS bin's 424a mobile data storage device 426 is the same as disclosed in the preceding SCS to SCS digital swap scenario, while the updating of the MCS bin's 424b mobile data storage device 426 comprises an update to only the particular record for the affected compartment in the bin contents table 531. If there are other compartments in the same MCS bin 424b that contain the same product type on behalf of the same vendor whose compartment-specific product content was just reassigned, the updating of the MCS bin's 424b mobile data storage device 426 comprises adding a new record to the product information table 532 rather than overwriting the other vendor's product record therein.

If the products of the two vendors are both found in SCS bins 424a and the quantities in the two SCS bins 424a are not equal, in an embodiment, the central computing system 401 communicates instructions to the facility management subsystem 404 of the facility at which the SCS bin 424a containing the higher quantity of the ordered product, herein referred to as the "fuller SCS bin", resides, or at which a transport vehicle transporting that fuller SCS bin is destined to arrive, to have one of the robotic handlers 408 retrieve the fuller SCS bin from the gridded storage structure or reroute the fuller SCS bin from the loading grid structure on the fuller SCS bin's arrival at the facility, and deliver the fuller SCS bin to a workstation. Furthermore, the central computing system 401 communicates instructions to the facility management subsystem 404 to command automated control of a robotic worker or instruct a human worker via a human-machine interface (HMI) at the workstation to divest a partial quantity of the ordered product from that fuller SCS bin to another preferably-empty SCS bin in order to equalize the quantity of the ordered product in the two vendors' SCS bins 424a. The facility management subsystem 404 then signals the central computing system 401 to decrement the quantity stored in the record of that formerly-fuller SCS bin in the storage bin contents table 510 of the central database 403 by the quantity of product divested therefrom and swap the Bin_IDs/Compartment_IDs of the two now-equalized SCS bins 424a between the two vendors' product catalogue entries in their respective stocked inventory tables 504. The central computing system 401 also creates a record for the Bin_ID of the different SCS bin to which the excess product was divested in the stocked inventory table 504 of the vendor, herein referred to as the "more-stocked vendor", from whose SCS bin 424a that excess product was divested, writes to this record the quantity of product that was transferred to this different SCS bin, and records the Vendor_ID of this more-stocked vendor to the record in the storage bin contents table 510 for this different SCS bin. Product ownership is, therefore, swapped in the quantity defined by the less-stocked of the two vendors, or by at least that which is "less-stocked" in particular relation to the two storage bins being equalized, while the more-stocked vendor retains ownership of the excess product quantity by which their original bin content exceeded that of the other vendor, as reflected in the updated database records. The mobile data storage devices 426 of the two storage equalized bins are updated in the same manner disclosed above for the equal quantity SCS to SCS example. The mobile data storage device 426 of the different SCS bin to which the excess product was transferred has written thereto a copy of the bin data from the originally fuller SCS bin from which the excess product was transferred, but with the quantity written to the contents table 531 of this different SCS bin being adjusted according to the excess product quantity that was transferred to this different SCS bin from the originally fuller SCS bin.

Similar equalization and reassignment can be performed in relation to MCS bins 424*b*, where the products of the two vendors are found in two respective compartments of two MCS bins 424*b* and the quantities of the product concerned in the two compartments of the MCS bins 424*b* are not equal. In this example, the central computing system 401 communicates instructions to the facility management subsystem 404 of the facility at which the MCS bin 424*b* with the compartment containing the greater quantity of the ordered product, herein referred to as the "fuller MCS bin/compartment", resides, or at which a transport vehicle transporting that fuller MC S bin is destined to arrive, to have one of the robotic handlers 408 retrieve that fuller MCS bin from the gridded storage structure or reroute the fuller MCS bin from the loading grid structure on arrival at the facility and deliver the fuller MCS bin to a workstation. Furthermore, the central computing system 401 communicates instructions to the facility management subsystem 404 to command or instruct the robotic or human worker thereof to divest a partial quantity of the ordered product from that fuller compartment to either an empty compartment in the same MCS bin, if available, or to an empty compartment in another MCS bin if the retrieved/rerouted MCS bin has no empty compartments, in order to equalize the product quantities in the two compartments of the two vendors' MCS bins 424*b*. The facility management subsystem 404 then signals the central computing system 401 to decrement the quantity stored in the record of the formerly fuller compartment of the MCS bin in the storage bin contents table 510 of the central database 403 by the quantity of product divested therefrom, and swap the Compartment_IDs of those two now-equalized compartments of the MCS bins between the two vendors' product catalogue entries in their respective stocked inventory tables 504. The central computing system 401 also creates a record for the Compartment_ID of the compartment of the different MCS bin to which the excess product was divested to the stocked inventory table 504 of the more-stocked vendor, writes to this record the quantity of excess product that was transferred to this compartment, and records the Vendor_ID of this more-stocked vendor to the record in the storage bin contents table 510 for this different compartment to which the excess product was transferred. Product ownership is, therefore, swapped in the quantity defined by the less-stocked of the two vendors, or at least that which is "less stocked" in particular relation to the two compartments being equalized, while the more-stocked vendor retains ownership of the excess product quantity by which their original compartment content exceeded that of the other vendor. The mobile data storage devices 426 of the two MCS bins 424*b* whose compartments have been equalized are updated in the same manner disclosed above for the equal quantity MCS compartment to MCS compartment example, with the mobile data storage device 426 of the same or different MCS bin to which the excess product was transferred having written thereto a copy of the compartment-specific bin data from the originally fuller compartment, but with the quantity being adjusted according to the excess product quantity that was transferred to this different compartment from the originally fuller compartment.

If the product of one of the vendors is found in an SCS bin and the product of the other vendor found in a compartment of an MCS bin in a non-equal quantity to the product in the SCS bin, then the divestment of the excess product is performed on an appropriate one of either a storage bin or compartment basis depending on whether the excess is coming from an SCS bin or a compartment of an MCS bin, and the correspondingly appropriate data update for that excess product is performed in the same manner disclosed above, followed by the procedure for digitally swapping the resulting equal quantity bin/compartment contents in accordance with the scenario above where the SCS bin contents and MCS bin compartment contents were initially equal.

In an embodiment, instead of performing equalization on bin or compartment contents to enable swap-based reassignment of equal product quantities on a bin-wide or compartment-wide basis, product reassignment comprises reassignment of only a partial subset of the overall quantity product residing in a storage bin or a compartment. Such reassignment of partial bin or compartment contents is useful in the case of reassigning partial contents of an MCS bin, where a partial quantity of a product found in a singular compartment thereof previously assigned to a stocked Vendor B is transferred to an empty compartment of the same MCS bin, if available, or to an empty compartment of a different MCS bin if no empty compartment is available in the same MCS bin. The newly filled compartment of the same or different MCS bin is then assigned to a needful Vendor A by writing a new record to Vendor A's stocked inventory table 504 that contains the Compartment_ID of the newly filled MCS bin compartment, the Product_ID, and quantity of the product transferred thereto; writing Vendor A's Vendor_ID, the Product_ID, and the transferred quantity to the respective record in the storage bin contents table 510; writing to the mobile data storage device 426 of the same or different MCS bin a new record in the contents table 531 with the Product_ID of the transferred product, the needful Vendor A's Vendor_ID, and the transferred quantity of product; and, if this same product was not already stored in another compartment of the same or different MCS bin on behalf of Vendor A, copying to the product information table 532 of the same or different MCS bin a copy of the respective product record from Vendor A's product table 503.

The quantity recorded in the particular record of the storage bin contents table 510 for the compartment from which the reassigned product was transferred, and the corresponding record of that compartment in the contents table 531 of the mobile data storage device 426 on the MCS bin, have their recorded quantities decremented by the central computing system 401 and the facility management subsystem 404, respectively, according to the transferred quantity. Accordingly, the remaining product in the original compartment remains recorded as Vendor B's inventory by virtue of the prior recordal of the original compartment's Compartment_ID and Vendor B's Vendor_ID against one another in the storage bin contents table 510, and the prior recordal of the Compartment_ID against the product catalogue entry in Vendor B's stocked inventory table 504. In other embodiments, the central database 403 is configured to not only enable assignment of multiple Vendor_IDs to an MCS bin at a 1:1 ratio to the number of compartments of the MCS bin, but also enable assignment of multiple Vendor_IDs to non-compartmentalized SCS bins, and/or assignment of multiple Vendor_IDs to individual compartments of an MCS bin. Accordingly, product reassignment is not limited to bin-wide or compartment-wide reassignment, and comprises reassignment of only a portion of a storage bin's or compartment's contents without needing to segregate the reassigned products into another bin or compartment, thereby denoting digital reassignment on a product-basis rather than bin-wide or compartment-wide basis.

If the stocked Vendor B's storage bin has a greater quantity of the needed product than is required to fulfill the needful Vendor A's inventory shortfall, or a greater quantity of the needed product than the needful vendor has available for exchange at the City Z facility, then in an embodiment, the central computing system 401 adds the Bin_ID/Compartment_ID of the stocked Vendor B's storage bin/compartment at the City Y facility and the partial quantity of the product being reassigned therefrom to the needful Vendor A's stocked inventory table 504; decrements the product quantity currently recorded for Vendor B's storage bin/compartment at the City Y facility in the storage bin contents table 510 and in Vendor B's stocked inventory table 504, if duplicated therein, by the quantity of product being reassigned from Vendor B to Vendor A; adds the Bin_ID/Compartment_ID of the needful Vendor A's storage bin/compartment at the City Z facility to the stocked Vendor B's stocked inventory table 504; adds a new record in the storage bin contents table 510 containing the unique combination of the needful Vendor A's Vendor_ID and the Bin_ID/Compartment_ID of the now-shared storage bin/compartment at the City Y facility, together with the product quantity being reassigned to the needful Vendor A; and removes the Bin_ID/Compartment_ID of the needful Vendor A's storage bin/compartment at the City Z facility from the needful Vendor A's stocked inventory table 504. The central computing system 401 also commands the facility management subsystems 404 at the respective facilities in City Y and City Z to update the bin data on both the storage bin at the City Y facility and the storage bin at the City Z facility accordingly, thereby decrementing the quantity recorded for Vendor B's existing compartment record in the contents table 531 of the storage bin at the City Y facility; adding a new compartment record to the contents table 531 of the storage bin at the City Y facility with the Vendor_ID of Vendor A and the reassigned product quantity; populating a new product record in the product information table 532 of the storage bin at the City Y facility with the corresponding product record copied from Vendor A's product table 503 or Vendor A's storage bin at the City Z facility, unless Vendor A already has such a product record on the storage bin at the City Y facility; changing the Vendor_ID in the appropriate compartment record of the contents table 531 of the storage bin at the City Z facility from the needful Vendor A to the stocked Vendor B; erasing the existing record in the product information table 532 of the storage bin at the City Z facility for the product type concerned, unless Vendor A has remaining product of the same product type in another compartment therein; and accordingly replacing this erased record or adding a new record copied from the corresponding product record in Vendor B's product table 503 or from the product information table 532 of Vendor B's storage bin at the City Y facility.

If the entirety of Vendor A's storage bin/compartment at the City Z facility is not being exchanged for Vendor B's inventory at the City Y facility, then instead of removing the Bin_ID/Compartment_ID of the storage bin in the City Z facility from the needful Vendor A's stocked inventory table 504, the quantity recorded for that Bin_ID/Compartment_ID in the needful Vendor A's stocked inventory table 504 is decremented by the item quantity being exchanged, and the quantity added to the stocked Vendor B's stocked inventory table 504 for the storage bin at the City Z facility is defined by this quantity being exchanged, herein referred to as the "exchange quantity", rather than by the total quantity or product in the storage bin at the City Z facility. Similarly, in updating the mobile data storage device 426 of the storage bin at the City Z facility, instead of changing the Vendor_ID in the existing compartment record of the contents table 531 and replacing the existing product record in the product information table 532, the facility management subsystem 404 decrements the recorded quantity in the existing compartment record by the exchange quantity; adds a new additional compartment record containing the combination of the Compartment_ID concerned and the Vendor_ID of the stocked Vendor B, together with the exchange quantity; and adds a new record to the product information table 532, copied from the corresponding product record in the stocked Vendor B's product table 503 or from Vendor B's storage bin at the City Y facility, unless such a record already exists.

As disclosed in the foregoing examples, in embodiments where the storage bins are smart bins having mobile data storage devices 426 thereon, in addition to the updating of the central database 403 to digitally record the swap or exchange of products between a needful vendor and a stocked inventor, the central computing system 401 instructs the facility management subsystems 404 of the facilities and the vehicle management subsystems 416 of the transport vehicles at/on which the storage bins are found to replace or supplement the existing Vendor_ID and vendor-specific product records on the mobile data storage device 426 of each vendor's storage bin with those found on the other vendor's storage bin, whether the replacement or supplemental data being written is copied from the other vendor's storage bin, or from the central database 403, or from duplicate records in the local facility database 407 or the local vehicle database 420 illustrated in FIGS. 4A-4C and FIGS. 5C-5D, if each transport vehicle and facility maintains such a local accounting of its on-site on-board inventory. When less-than-full storage bin or compartment contents are reassigned, in an embodiment, the central computing system 401 instructs the facility management subsystem 404 at which the storage bin resides or will arrive if currently in transport, to command or instruct removal of the reassigned products from the now-shared storage bin or compartment and transfer of the reassigned products into a vendor-specific storage bin or compartment. Similarly, the central computing system 401 instructs the vehicle management subsystem 416 to command or instruct removal of the reassigned products from the now-shared storage bin or compartment and transfer of the reassigned products into a vendor-specific storage bin or compartment if the transport vehicle is suitably equipped for performance of such bin-to-bin product transfer, for example, using automated robotic means or machine-guided human interaction on-board the transport vehicle.

Where an entire storage bin at the City Z facility is reassigned, in an embodiment, the central computing system 401 updates the central database 403 and instructs the facility management subsystem 404 of the City Z facility and/or the vehicle management subsystem 416 of the transport vehicle to update the mobile data storage device 426 of the reassigned storage bin thereat, with updated destination data specifying the City Y facility as a destination to which the reassigned storage bin from the City Z facility should be transported to replenish Vendor B's local inventory in City Y. When the storage bin at the City Z facility is only partially reassigned, thus becoming a vendor-shared storage bin, in an embodiment, the facility management subsystem 404 or the vehicle management subsystem 416 in the case of suitably equipped transport vehicles, commands automated robotic removal or instructs human-performed removal of the reassigned products from the storage bin at the City Z facility and transfers the removed product into a vendor-specific storage bin, which is then subject to such destination reassignment to cause the transfer of the reassigned product from the City Z facility to the City Y facility, while leaving the other vendor's products in the original storage bin with the original destination data.

Once the reassignment of the product is complete, then in instances where the storage bin containing the reassigned inventory currently resides in the indexed storage array of a City Y facility, the facility management subsystem 404 at that facility commands retrieval of the storage bin from the indexed storage array by one of the robotic handlers 408 and delivery of the storage bin to the appropriate location, for example, a workstation, a loading dock, etc., in the facility according to the needs of the particular inventory shortfall being fulfilled. In instances where the storage bin containing the reassigned inventory currently resides on a transport vehicle 415a, 415b travelling between facilities, then the facility management subsystem 404 of the facility at which that transport vehicle 415a, 415b next arrives, commands a robotic handler 408 being used in the loading/unloading of the transport vehicle 415a, 415b to reroute the storage bin holding the reassigned inventory to an appropriate workstation, loading dock, or other location according to the needs of the particular inventory shortfall being fulfilled.

Figure 9A:
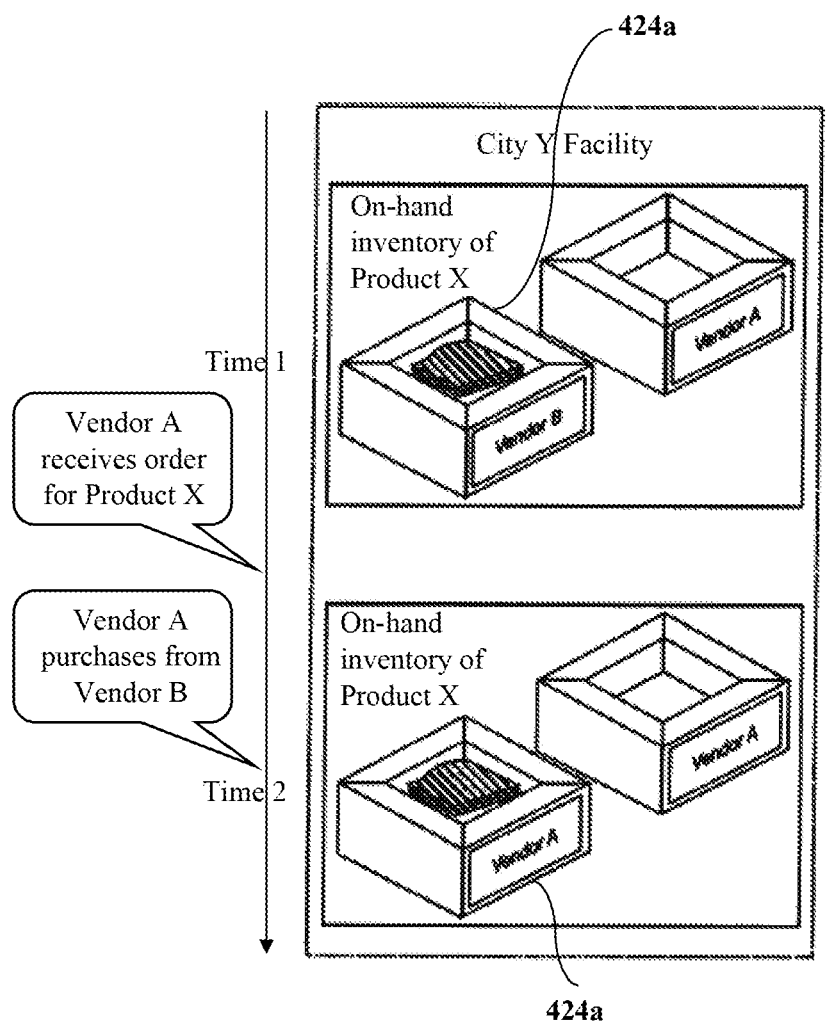
FIG. 9A illustrates a schematic showing an effect of a computer-implemented, inter-vendor inventory sale, where an inventory shortfall of a needful vendor is overcome by a purchase of a storage bin of another vendor containing the needed product(s), according to an embodiment herein.
Figure 9B:
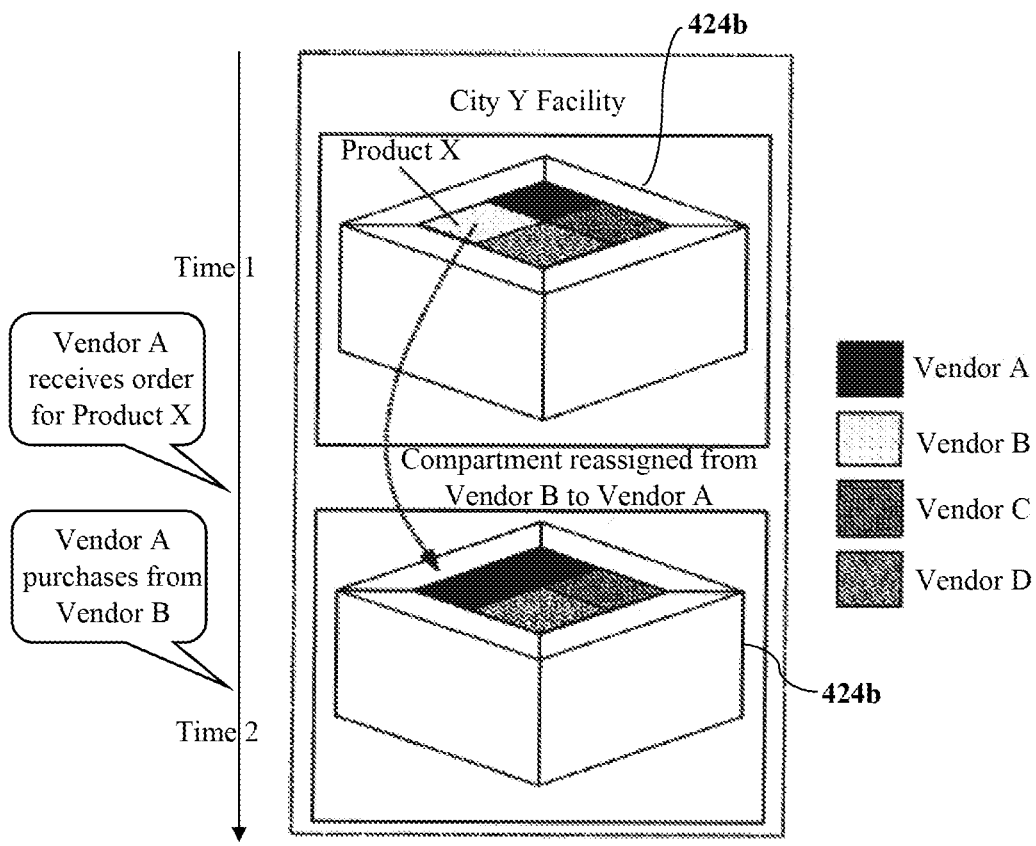
FIG. 9B illustrates a schematic showing an effect of a computer-implemented, inter-vendor inventory sale, where an inventory shortfall of a needful vendor is overcome by a purchase of a compartment of a multi-compartment storage bin of another vendor containing the needed product(s), according to an embodiment herein.

The foregoing process, the effect of which is illustrated in FIG. 8A on a bin reassignment basis, and in FIG. 8B on a compartment reassignment basis, reassigns the physical products at the City Y facility from Vendor B's inventory to Vendor A's inventory, thereby overcoming Vendor A's inventory shortfall on a near-instantaneous, substantially expedited basis compared to physically transporting Vendor A's far off inventory at the City Z facility all the way to the City Y facility. At the same time, the inventory at the City Z facility is reassigned to Vendor B to maintain the respective inventories as a "whole" without losing any of their overall inventory in the supply chain ecosystem. While the foregoing examples involve an inventory swap or an exchange of an entire storage bin, an entire compartment, or a partial subset of a storage bin or a compartment's product content, similar reassignment of a storage bin, compartment or product subset from a stocked vendor to a needful vendor is also employed in transactions where the stocked vendor is not compensated by an exchange of the same product in the same quantity from an elsewhere-located inventory of the needful vendor. In an embodiment, storage bin, compartment or product reassignment is implemented in other inventory management applications comprising, for example, inter-vendor sales, where instead of the needful vendor swapping inventory with the stocked vendor, the needful vendor purchases inventory from the stocked vendor as illustrated in FIGS. 9A-9B. In this embodiment, the reassignment of a storage bin, a compartment, or partial contents thereof from the stocked Vendor B to the needful Vendor A is performed as disclosed above for the swap or exchange process, but without any compensatory reassignment of another storage bin, compartment or partial contents thereof from the needful Vendor A to the stocked Vendor B.

FIG. 9A illustrates a schematic showing an effect of a computer-implemented, inter-vendor inventory sale, where an inventory shortfall of a needful vendor is overcome by a purchase of a storage bin, for example, a single-compartment storage (SCS) bin 424a of another vendor containing the needed product(s), according to an embodiment herein. Similarly, FIG. 9B illustrates a schematic showing an effect of a computer-implemented, inter-vendor inventory sale, where an inventory shortfall of a needful vendor is overcome by a purchase of a compartment of a multi-compartment storage (MCS) bin 424b of another vendor containing the needed product(s), according to an embodiment herein. In another embodiment, in addition to the purchase of a whole storage bin and a whole compartment, the computerized inventory management system allows a needful vendor to purchase individual product units and partial compartments of another vendor having the needed product(s) to overcome an inventory shortfall of the needful vendor.

In an embodiment, to facilitate an inter-vendor inventory sale or purchase, each product record in the product table 503 of each vendor's product catalogue 505 illustrated in FIG. 5A, comprises a vendor sale price at which the vendor is willing to sell the product concerned to other subscribing/contracting vendors of the supply chain ecosystem and a customer sale price at which the vendor sells the product to its end customers. In an embodiment, each product record contains a maximum purchase price that the vendor is willing to pay any other vendor for that particular product. In an embodiment, the vendor sale price is also stored in the product information table 532 of each of the storage bins of any one or more or all of the various bin categories and subcategories, for example, the single-compartment storage (SCS) bins 424a, the multi-compartment storage (MCS) bins 424b, the picked-order (PO) bins 424c, and the finished-order (FO) bins 424d as illustrated in FIGS. 5E-5F. Even though the multi-entity inventory management system 400 illustrated in FIGS. 4A-4C, is configured such that products that are already picked for order fulfillment and placed in a PO bin 424c or an FO bin 424d will not be made available for sale to other vendors, retention of the vendor sale price, the maximum purchase price, and other product information on the mobile data storage device 426 of the PO bin 424c or the FO bin 424d is useful, for example, in the event of an order cancellation, whereupon the product(s) in that PO bin 424c or FO bin 424d can be transferred back to an MCS bin 424b or an SCS bin 424a and reassigned back into the originating vendor's inventory, during which the retained product information data on the PO bin 424c or the FO bin 424d can be used to automatically populate the bin data on the MCS bin 424b or the SCS bin 424a into which the canceled-order products are transferred, without having to rely on the central database 403 to source such data.

In an embodiment, in addition to the inclusion of a vendor sale price for each product type in a vendor's product catalogue 505, the vendor's whitelist/blacklist table 506 of the central database 403 illustrated in FIG. 5A, stores additional data for each vendor, for example, a list of Vendor_IDs of specifically authorized vendors for which the subject vendor has elected to allow of such inventory reassignment transactions or a list of Vendor_IDs of specifically prohibited vendors for which the subject vendor has elected to forbid such inventory reassignment transactions, in relation to inventory reassignment transactions, for example, the inter-vendor inventory swap or the inter-vendor inventory sale, with other vendors.

Figure 10:
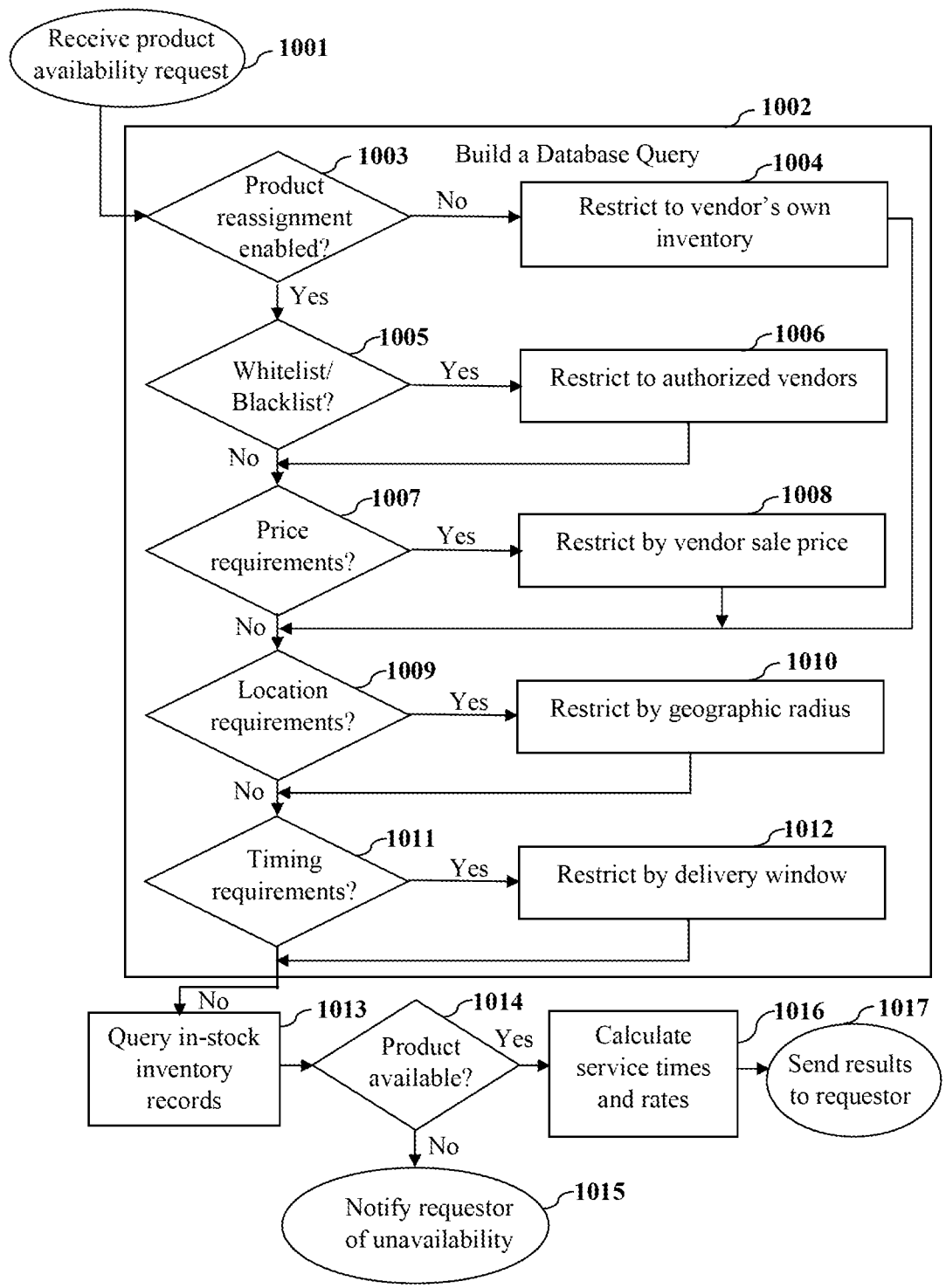
FIG. 10 illustrates a flowchart of a computer-implemented method for facilitating an inter-vendor inventory swap or an inter-vendor inventory sale, according to an embodiment herein.

FIG. 10 illustrates a flowchart of a computer-implemented method for facilitating an inter-vendor inventory swap or an inter-vendor inventory sale, according to an embodiment herein. In the computer-implemented method disclosed herein, the available inventory is queried while taking into account the possibility of an inter-vendor inventory swap or an inter-vendor inventory sale between vendors that are authorized to reassign inventory to and from each other. The computer-implemented method disclosed herein executes a process of searching the inventory of a supply chain ecosystem for availability of a particular product of a particular product type, herein referred to as the "subject product", from the product catalogue 505 of a particular vendor illustrated in FIG. 5A, herein referred to as the "subject vendor", for example, in response to browsing of or attempted ordering from the subject vendor's electronic commerce (e-commerce) sales platform by a customer, thereby necessitating a need to either display in real time an available quantity of the subject product available for the customer to purchase from or be able to respond to an attempted order placement with an indication of whether the order is fulfillable or not, based on such real-time assessment of the subject product availability. As illustrated in FIG. 10, at step 1001, the query builder 431a of an executable software of the central computing system 401 illustrated in FIG. 4C, builds 1002 database queries as follows: The query builder 431a receives a product availability request that contains at least the Vendor_ID of the subject vendor and the Product_ID of the subject product. In an embodiment, the product availability request comprises at least the global Product_ID, for example, the universal product code (UPC) by which the subject product is identifiable within the product catalogues 505 of other vendors 502 illustrated in FIG. 5A. In another embodiment, the product availability request further comprises the subject vendor's vendor-specific Product_ID, for example, a stock keeping unit (SKU). In another embodiment, the product availability request further comprises other information useful to generate an inventory search customized to suit the customer or another originating entity on behalf of whom the product availability request was generated. The other information comprises, for example, location information of the customer such as real-time global positioning system (GPS) coordinates or a customer-specified street address, or an alternative destination location specified by the customer such as a delivery address different from the customer's billing address, a third-party recipient address for a gift order, a customer-selected nano facility, etc., to or nearby which the subject product would need to be delivered, and timing requirements, for example, a timeline or a targeted delivery date by which such delivery to or nearby the destination should be completed.

At step 1003, the query builder 431a checks the reassignment participation flag of the subject vendor, for example, stored in the vendors table 501 of the central database 403 illustrated in FIG. 4A and FIG. 4C, to determine whether the subject vendor is a participant in the inventory reassignment option. If the subject vendor is not a participant in the inventory reassignment option, then at step 1004, the query builder 431a restricts the inventory search to only the subject vendor's own inventory, and proceeds to step 1009 disclosed below. In an embodiment, in such instances, the Product_ID used in the search is the vendor Product_ID, for example, the SKU, rather than the global Product_ID, for example, the UPC, since the inventory of other vendors will not be searched. If the subject vendor is a reassignment participant, then the search must use the global Product_ID to ensure return of positive search results from other vendors. In this instance, at step 1005, the query builder 431a checks for inclusion of a populated whitelist or blacklist in the vendor whitelist/blacklist table 506 for the subject vendor illustrated in FIG. 5A, if enabled in the given embodiment. If a populated whitelist or blacklist is found in the vendor whitelist/blacklist table 506 for the subject vendor, the query builder 431a uses the contents thereof to restrict the inventory search to only authorized vendors at step 1006. At step 1007, the query builder 431a checks for price requirements, for example, whether the subject vendor has a maximum purchase price specified for the subject product. If the subject vendor has a maximum purchase price specified for the subject product, at step 1008, restricts the search to return only other vendors' matching products whose vendor sale prices are less than that maximum purchase price of the subject vendor.

At step 1009, the query builder 431a checks for the inclusion of location requirements in the product availability request, and if present, uses the same at step 1010 to further restrict the search to facilities and transport vehicles that are most compatible with the location requirements, for example, by limiting the search to facilities and transport vehicles within a predetermined geographic radius of distance from the customer location or other specified destination location extracted from the product availability request. At step 1011, the query builder 431a checks for the inclusion of timing requirements in the product availability request, and if present, uses the same at step 1012 to further restrict the search to facilities capable of fulfilling the delivery timeline or the targeted delivery date, and transport vehicles that serve those facilities, thereby encompassing transport vehicles carrying the subject product and currently en-route or scheduled for departure to one of those facilities.

Through the foregoing steps 1003 to 1012, the query builder 431a, therefore, generates an inventory search query to run against the recorded in-stock inventory of the supply chain ecosystem that has been customized to, at minimum, include any inventory of the subject vendor that is location and timeframe compatible and to also enable inclusion of location and timeframe compatible inventory of any other authorized vendors offering price-compatible inventory, if the subject vendor is flagged for participation in the inventory reassignment option. In other embodiments, requirements other than the price, location and timing examples disclosed above in the search building process are included, and one or more of the illustrated examples may be excluded or performed in a different order. At step 1013, the central computing system 401 executes the generated search query against the in-stock inventory records in the central database 403 using the subject vendor's Vendor_ID, the Vendor_ID(s) of any authorized vendors determined at step 1006, the Facility_ID(s) of any facilities and Vehicle_ID(s) of any transport vehicles that were not filtered out at steps 1010 and 1012, and the price requirements applied at step 1008 to filter out any authorized vendor's product for which the authorized vendor's vendor sale price exceeds the subject vendor's maximum purchase price. The execution of the search query, at step 1013, comprises checking the whitelist or blacklist of each of the subject vendor's authorized vendors to ensure that Vendor A is an authorized vendor of the vendor being queried, and if not, then excluding that vendor from the subject vendor's available inventory query. That is, two vendors must have a two-way authorized relationship in order for either vendor to be able to query a pooled inventory that includes the inventory of the other vendor.

If, at step 1014, the inventory search returns no positive results, then, at step 1015, a "no inventory available" message is returned to the requester or the originating source of the product availability request, for example, to the subject vendor's e-commerce platform for displaying a "currently unavailable" message to a customer browsing the e-commerce platform. If the determination at step 1014 is that there are one or more units of the subject product available, then in an embodiment, the process comprises step 1016 of determining an estimated delivery timeline for delivery of such product unit(s) to either the customer's location or other customer specified destination, or an automatically selected location proximate thereto, for example, the nearest nano facility where the customer or other recipient can pick up the product unit(s), and optionally also determining an associated cost for such delivery. Accordingly, if the search renders inventory situated at, or travelling to, different facilities of different relative distance to the customer location or other delivery destination, the step 1016 further comprises calculating and applying different associated delivery costs for the differently located product units. At step 1017, the central computing system 401 sends a result set to the requestor that comprises, for each facility at which the subject product already resides or is expected to arrive on a transport vehicle, the quantity of available product units at that facility or anticipated thereat on the associated transport vehicle and the delivery cost and estimated delivery timeline for service from that facility.

Figures 11, 12:
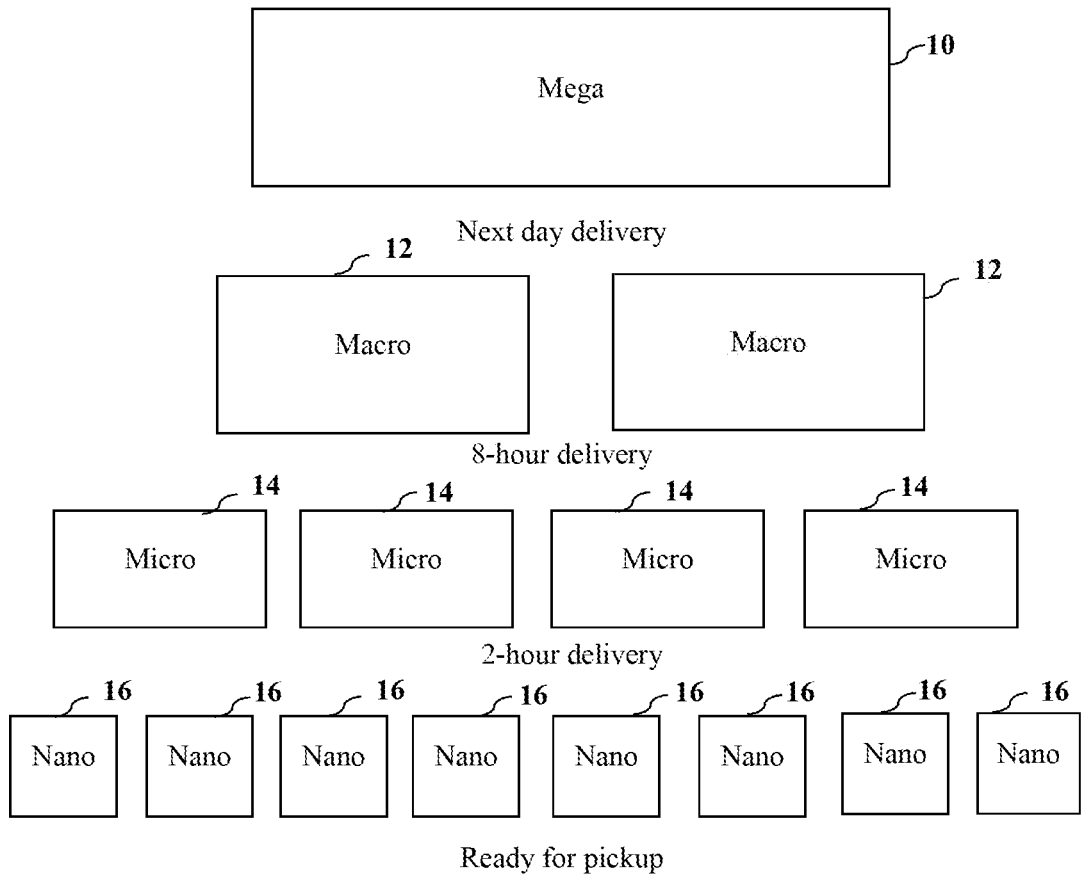
FIG. 11 illustrates a schematic showing a delivery window hierarchy among a network of facilities of a supply chain ecosystem, according to an embodiment herein.
FIG. 12 illustrates a screenshot of a graphical user interface rendered by an electronic commerce (e-commerce) platform of a vendor, displaying purchase options for a subject product based on results of an inventory search query process shown in FIG. 10, according to an embodiment herein.

FIG. 11 illustrates a schematic showing a delivery window hierarchy or a timeline hierarchy among a network of facilities, for example, mega, macro, micro and nano facilities 10, 12, 14, 16 of a supply chain ecosystem, according to an embodiment herein. FIG. 11 illustrates the usefulness of supplementing a geographic constraint imposed by a location requirement with a time constraint imposed by a timing requirement disclosed in the detailed description of FIG. 10, where delivery of product inventory from a mega facility 10 to a macro facility 12 typically takes place within a first timeframe, for example, a 24-hour or next delay delivery window; delivery of product inventory from a macro facility 12 to a micro facility 14 typically takes place within a smaller second timeframe, for example, a 8-hour delivery window; and delivery of fulfilled customer orders from a micro facility 14 to a nano facility 16 typically takes place within a smaller timeframe, for example, a 2-hour delivery window, whereupon the fulfilled order is ready for pickup by a customer or a last-leg delivery service. Accordingly, if the timing requirements in the product availability request prescribe a delivery timeframe that is less than the sum of the first, second and third delivery windows, that is, 24+8+2=34 hours, then the query builder 431*a* of the central computing system 401 illustrated in FIG. 4C, excludes mega facilities 10 from the inventory search, and further excludes macro facilities 12 from the inventory search if the prescribed delivery timeframe is less than the sum of the second and third delivery windows, that is, 8+2=10 hours. Such time-based restriction of the inventory search, therefore, excludes facilities incapable of fulfilling the timing requirement. Where the requestor is the subject vendor's e-commerce platform, the customer can, therefore, select from among the different delivery timelines and costs according to their preference.

FIG. 12 illustrates a screenshot of a graphical user interface (GUI) 436*a* rendered by the electronic commerce (e-commerce) platform 436 of a vendor illustrated in FIG. 4C, displaying purchase options for a subject product based on results of an inventory search query process shown in FIG. 10, according to an embodiment herein. In an embodiment, the subject vendor's e-commerce platform 436 is an integrated part of the central computing system 401 and is accessible via the communication network illustrated in FIG. 4C. The vendor's e-commerce platform 436 renders the results of the inventory search on the GUI 436*a* on a display unit, for example, a screen of a customer's user device, for example, a smart phone, a tablet, a laptop, a desktop computer, a smart television, or other electronic device configured to communicate with the communication network, for example, the internet or other wide area network. In an embodiment, the e-commerce platform 436 displays one or more visual representations of the subject product along with multiple selectable purchase options on the GUI 436*a*. Each of the purchase options comprises, for example, a delivery option specifying a delivery cost and an estimated delivery timeline, an available quantity field showing the number of product units available under that delivery option, and a user-controlled quantity field for specifying how many of the available product units the customer wishes to select under that purchase option as illustrated in FIG. 12. The customer can optionally select different product units from among multiple purchase options and then choose to "add to cart" to continue browsing the e-commerce platform 436 or "proceed to checkout" to initialize purchase of the selected product units.

A customer order is not considered to be created until an actual financial transaction is carried out during the checkout process, and therefore, until such financial transaction is completed, it is unknown whether any of the available product units returned by the inventory search query process disclosed in the detailed description of FIG. 10, that is currently owned by the other vendors, that is, not the subject vendor whose product catalogue the customer is browsing through the subject vendor's e-commerce platform 436, actually need to be transferred to the subject vendor by an inter-vendor inventory swap or an inter-vendor inventory sale. Accordingly, the computer-implemented method disclosed herein allows the subject vendor to temporarily reserve inventoried units of another vendor on behalf of the subject customer of the current order, so that another browsing customer cannot purchase the same inventory units before the subject customer completes their transaction.

Figure 13:
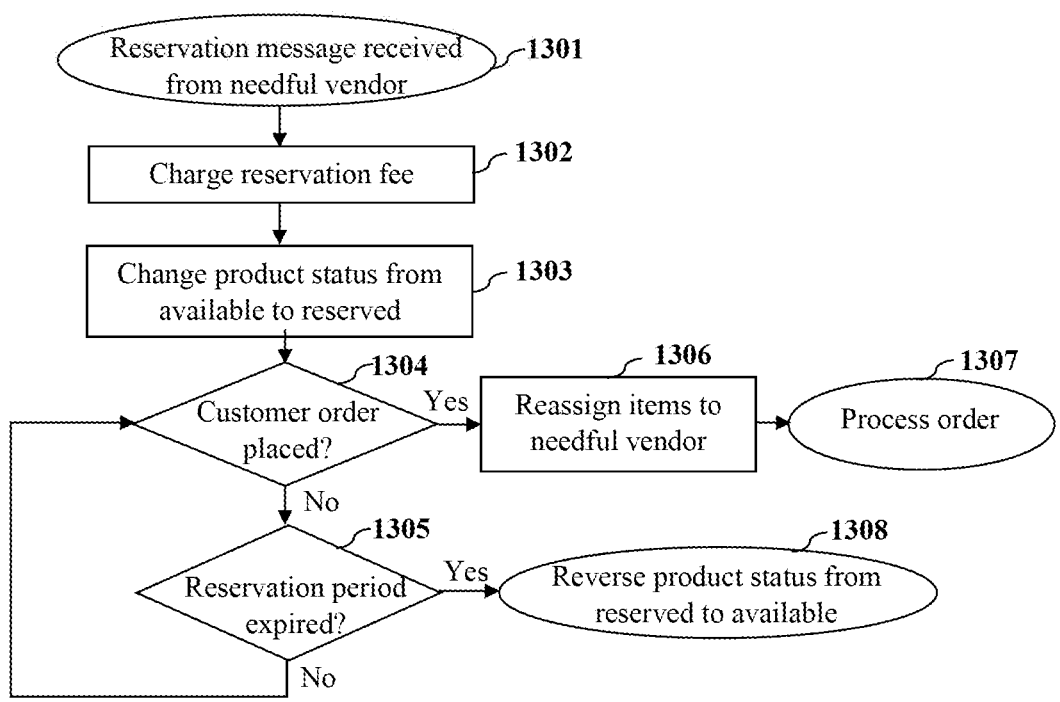
FIG. 13 illustrates a flowchart of a computer-implemented method for reserving inventory from an authorized, stocked vendor on behalf of a needful vendor, according to an embodiment herein.

FIG. 13 illustrates a flowchart of a computer-implemented method for reserving inventory from an authorized, stocked vendor on behalf of a needful vendor, according to an embodiment herein. The inventory reservation module 431*f* in the executable software of the central computing system 401 illustrated in FIG. 4C, executes the inventory reservation process illustrated in FIG. 13. At step 1301, the inventory reservation module 431*f* receives a reservation message from a subject vendor's e-commerce platform 436 illustrated in FIG. 4C, as generated, for example, in response to a customer's selection of one or more product units from a purchase option that was populated at least partially on the basis of available inventory from one of the subject vendor's authorized vendors, rather than entirely by the subject vendor's own inventory. The subject vendor is, therefore, a needful vendor in this example, since the subject vendor alone is not capable of fulfilling the customer-selected product units without an inventory swap or a purchase of inventoried product units from another vendor, that is, the stocked vendor. The reservation message contains the Product_ID, for example, the global Product_ID or the vendor Product_ID of the stocked vendor from which reservation is being requested on behalf of the needful vendor, and the quantity of product units to reserve, herein referred to as the "reservation quantity". The reservation quantity is calculated as the number of customer-selected product units for the given purchase option minus any of the displayed available product units of that purchase option that were populated from the needful vendor's own inventory.

For reserving product inventory from the stocked vendor, in an embodiment, the needful vendor is charged a reservation fee, as shown at step 1302, where the inventory reservation module 431f charges the reservation fee to an account of the needful vendor, for example, as identified in the needful vendor's billing information in the vendors table 501 of the central database 403 illustrated in FIG. 5A. In an embodiment, the inventory reservation module 431f credits an entirety or a portion of this reservation fee to the account of the stocked vendor as compensation for the reservation, since the reserved inventory will be unsaleable by the stocked vendor while under reservation on behalf of the subject vendor. In another embodiment, the inventory reservation module 431f credits an entirety or a partial portion of the reservation fee to the operating entity as a service charge. In an embodiment, the reservation fee or at least the portion thereof credited to the stocked vendor is a flat fee or a variable fee that increases proportional to the item quantity being reserved.

With the reservation fee successfully charged to the needful vendor's account, at step 1303, the inventory reservation module 431f records the reservation from the stocked vendor's inventory in the reservation quantity in the central database 403, for example, by decrementing, by the reservation quantity, the quantity currently recorded in the storage bin contents table 510 in the record containing the stocked vendor's Vendor_ID, the subject product's Product_ID, and the Bin_ID/Compartment_ID of the storage bin/compartment containing the product units being reserved. In an embodiment, the inventory reservation module 431f populates the product reservations table 520 in the central database 403 illustrated in FIG. 5B, with a new record that contains at least the needful vendor's Vendor_ID, the stocked vendor's Vendor_ID, the global Product_ID of the subject product, and the reservation quantity. The reserved product units recorded in the product reservations table 520 are, therefore, no longer accounted for in the storage bin contents table 510, and thus are unsearchable by subsequently executed instances of the inventory search query process, thereby changing their status from "available" to "reserved".

The inventory reservation module 431f is configured to maintain this reserved status for a predetermined period of time, herein referred to as the "reservation period". The reserved status is terminated upon the earlier of either: (a) successful completion of the order transaction by the subject customer, as determined at step 1304; or (b) expiry of the reservation period, as determined at step 1305. If the order transaction is completed at step 1304, then the inventory reassignment module 431b illustrated in FIG. 4C, performs a reassignment of the reserved product units from the stocked vendor's inventory to the needful vendor's inventory at step 1306, followed by the fulfillment of the customer order at step 1307. If the reservation period expires without completion of the order transaction, then the reserved products are released back into regular searchable inventory at step 1308, by incrementing the previously decremented quantity stored in the storage bin contents table 510 by the reservation quantity, for example, as stored in the temporary record of the product reservations table 520, thereby returning the stored quantity in the storage bins content table 510 back to its original pre-reservation value, and thus reinstating the available status of the previously reserved units to be searchable again by subsequently executed instances of the inventory search query process disclosed in the detailed description of FIG. 10.

In an embodiment, instead of using a singular quantity field in the storage bin contents table 510 and populating a separate product reservations table 520, another implementation comprises two quantity fields, for example, an "available quantity" field and a "reserved quantity" field in the storage bin contents table 510, with the central computing system 401 decrementing and incrementing these quantities, respectively, according to the reservation quantity during recordal of the reservation and subsequent reversal of the reservation if the reservation period expires without completion of an order transaction. The separate product reservations table 520 stores a historical record of the reservations that can be queried by Vendor_ID and Product_ID, for example, to allow a vendor to periodically review what products other vendors are regularly reserving, how frequently the vendors themselves are reserving particular product types and from whom, how often the vendors need to reserve certain products, how often particular product types are being reserved from them, etc. Based on this review, the vendor can make an educated assessment on their policies concerning reassignment, for example, participation versus non-participation, whitelist/blacklist contents, vendor sale price, maximum purchase price, etc., and on their inventory supply levels and geographic inventory distribution. In an embodiment, the product reservations table 520 stores additional data, for example, the time at which the reservation took place and the facility at which the product units were reserved.

Figure 14:
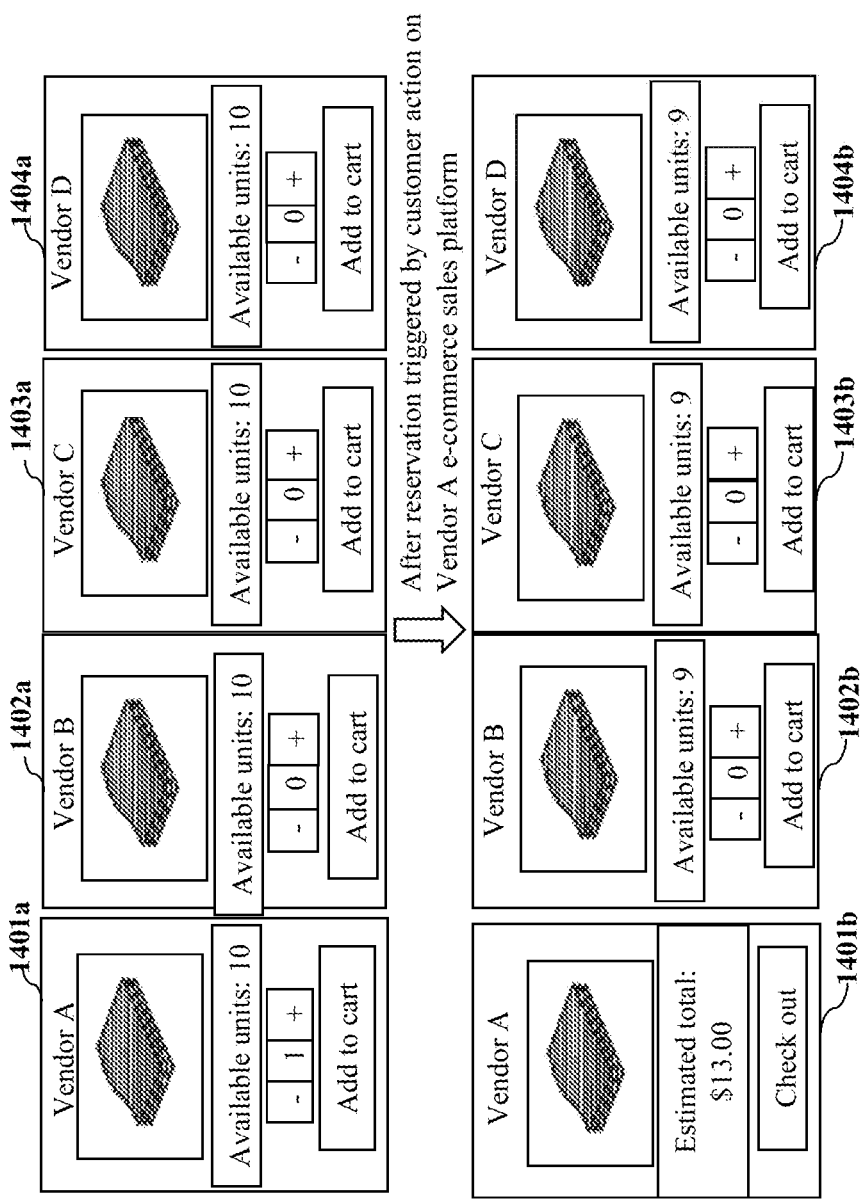
FIG. 14 illustrates screenshots of graphical user interfaces rendered by e-commerce platforms of different vendors, displaying the results of an inventory reservation, according to an embodiment herein.

FIG. 14 illustrates screenshots of graphical user interfaces (GUIs) 1401a, 1401b, 1402a, 1402b, 1403a, 1403b, 1404a, and 1404b rendered by the e-commerce platforms 436 of different vendors shown in FIG. 4C, displaying the results of an inventory reservation, according to an embodiment herein. The effect of the reservation process is illustrated in FIG. 14, where in the GUIs 1401a, 1402a, 1403a, and 1404a display the indicated availability of a particular product type on the e-commerce platforms 436 of multiple vendors that are all participants in the inventory reassignment option and that are all authorized vendors of one another. In the instance of respective customers of the different vendors who are all browsing the same product type and all reside at a common geographic location served by the same facilities, all of the e-commerce platforms 436 show the same available quantity of that product type based on respective executions of the inventory search query process disclosed in the detailed description of FIG. 10. As exemplarily illustrated in FIG. 14, Vendor A's customer selects a singular product unit to add to their electronic shopping cart. If Vendor A is a needful vendor lacking on-hand inventory of that product at the facilities queried, then the customer's selection action triggers a reservation of one product unit from one of the other vendors, whereupon the available quantity subsequently displayed on the GUIs 1401b, 1402b, 1403b, and 1404b of all of the vendor's e-commerce platforms 436 will be decremented accordingly on subsequent inventory query through the process disclosed in the detailed description of FIG. 10. If Vendor A was a stocked vendor with the needed product unit on hand, then in an embodiment, a variant of the reservation process disclosed in the detailed description of FIG. 13, is performed to also remove the customer-selected product unit from among the searchable "available inventory" in the inventory search query process by similarly decrementing the quantity in the storage bin contents table 510 for the storage bin/compartment holding Vendor A's selected product unit, but without charging a reservation fee and without creating a vendor-to-vendor entry in the product reservations table 520, since Vendor A is reserving its own product. Therefore, regardless of the needful versus stocked status of any given vendor, the same result occurs in that all vendors in an authorized-vendor relationship to one another show the same availability before the reservation, and then in subsequent browsing of the e-commerce platforms 436 during the reservation period, all vendors show the same, but now lower, product availability in view of the item reserved on behalf of Vendor A.

Figure 15:
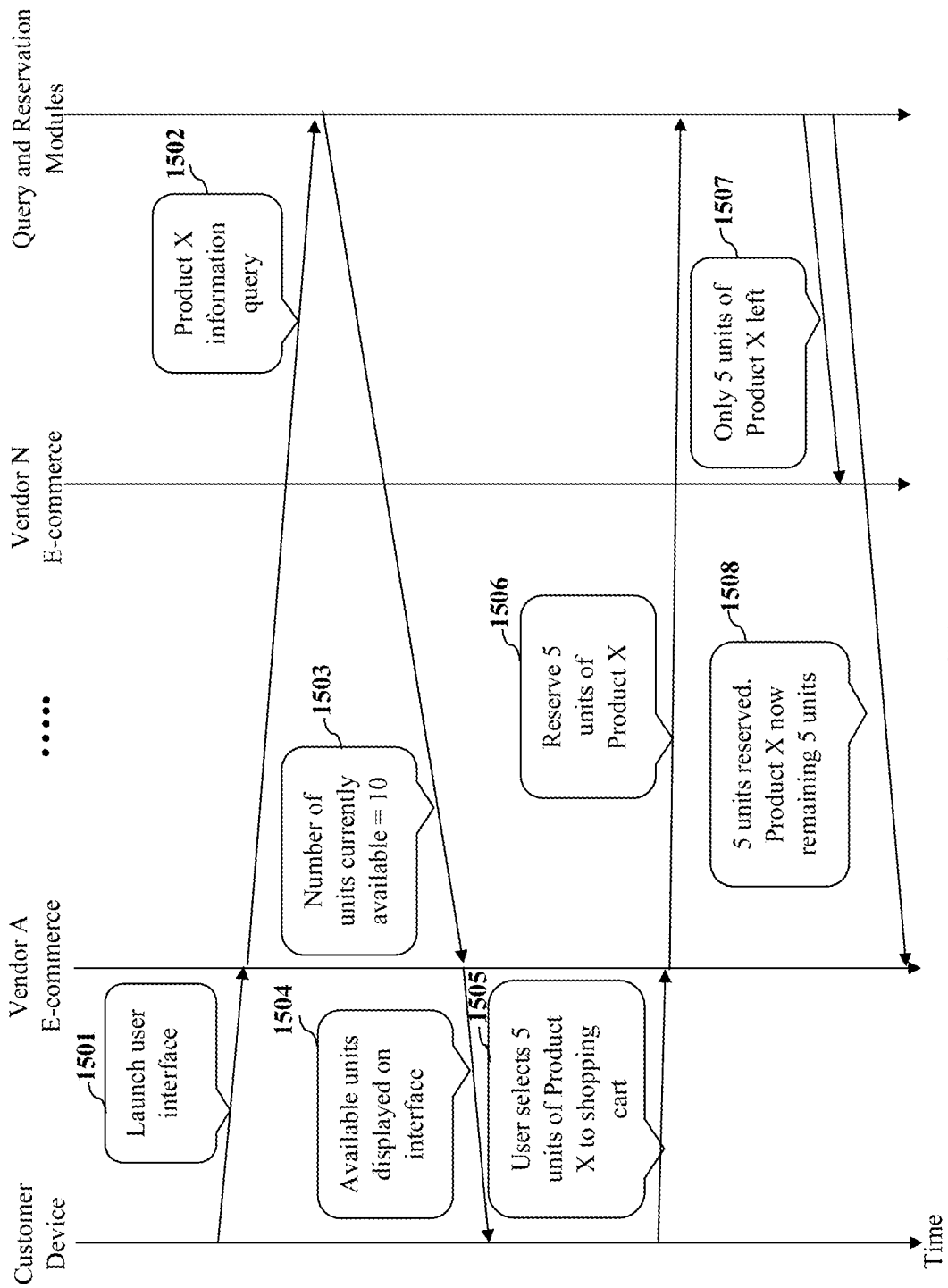
FIG. 15 illustrates a schematic showing a computer-implemented method for updating e-commerce platforms of multiple vendors in response to an inventory reservation on behalf of a vendor, according to an embodiment herein.

FIG. 15 illustrates a schematic showing a computer-implemented method for updating the e-commerce platforms of multiple vendors in response to an inventory reservation on behalf of a vendor, according to an embodiment herein. FIG. 15 further illustrates how the product availability is updated across the e-commerce platforms of multiple vendors in real time in response to a reservation, whether by a stocked vendor reserving their own inventory or a needful vendor reserving another vendor's inventory for a potential subsequent inter-vendor inventory swap or exchange or a potential subsequent inter-vendor inventory sale. A customer launches 1501 a user interface, for example, a web browser or a dedicated application on their electronic device for browsing Vendor A's e-commerce platform and accesses a particular product page, which triggers transmission of the product availability request to the query builder 431a of the central computing system 401 illustrated in FIG. 4C, to initiate the inventory search query process 1502 disclosed in the detailed description of FIG. 10. The inventory search query returns the result set comprising the available product quantity 1503 at one or more facilities and the associated delivery timeline(s) and cost(s) from such facilities, to Vendor A's e-commerce platform. Vendor A's e-commerce platform displays 1504 one or more purchase options on the user interface of the customer's electronic device. Each of the purchase options comprises a respective available unit quantity and the associated delivery timeline and cost, from which the customer selects a quantity of product units. As exemplarily illustrated in FIG. 15, the customer selects 1505 five product units from among an available ten product units identified by the inventory search query and displayed by Vendor A's e-commerce platform.

The customer's selected quantity is communicated from the customer's electronic device to Vendor A's e-commerce platform, which in turn, signals the inventory reservation module 431f of the central computing system 401 illustrated in FIG. 4C, to reserve 1506 the selected five product units. The inventory reservation module 431f prioritizes any of the vendor's own available product units over that which would require an exchange or a purchase from another vendor and makes the appropriate reservations. The inventory reservation module 431f transmits an updated product availability message indicating 1507 the decremented available quantity, that is, 5 product units, after having subtracted the reserved quantity, that is, 5 product units from the originally available quantity, that is, 10 units, and sends 1508 the updated availability message not only to Vendor A's e-commerce platform and to the particular vendor(s) from whom the product units were reserved if Vendor A is a needful vendor that cannot alone fulfill the product units, but also sends the updated availability message to the e-commerce platform of any other vendor that is an inventory reassignment participant and has an authorized vendor relationship with whichever vendor(s) from whom the reserved products units were reserved. Accordingly, any and all vendors whose "available quantities" are derived from a pooled inventory of multiple authorized-relationship vendors that was affected by the particular reservation will also display an accurately updated availability quantity to their customers based on the updated availability message from the inventory reservation module 431f.

As exemplarily illustrated in FIG. 15, Vendor N and Vendor A are both participants in the inventory reassignment option and are authorized vendors of one another, and therefore, whether the five customer-selected product units were reserved from Vendor A's own inventory or from Vendor N's inventory, both vendors are sent the updated availability message to update the available quantities displayed to their respective customers. If Vendor C (not shown) is an inventory reassignment participant and has an authorized vendor relationship with Vendor A, but not with Vendor N, then the receipt or non-receipt of the updated availability message by Vendor C varies depending on whose inventory the customer-selected product units were reserved from. If Vendor A's own inventory was reserved, then Vendor C would receive the updated availability message. If Vendor A lacked the selected product units in its own inventory, and the product units were therefore instead reserved from Vendor N, then Vendor C would not receive the updated availability message, and would continue to display the same available quantity as before the reservation by Vendor A's customer, which would have been a different available quantity than that originally displayed by the e-commerce platforms of Vendor A and Vendor N, since Vendor C's e-commerce platform would not have displayed the available inventory of Vendor N.

Figure 16:
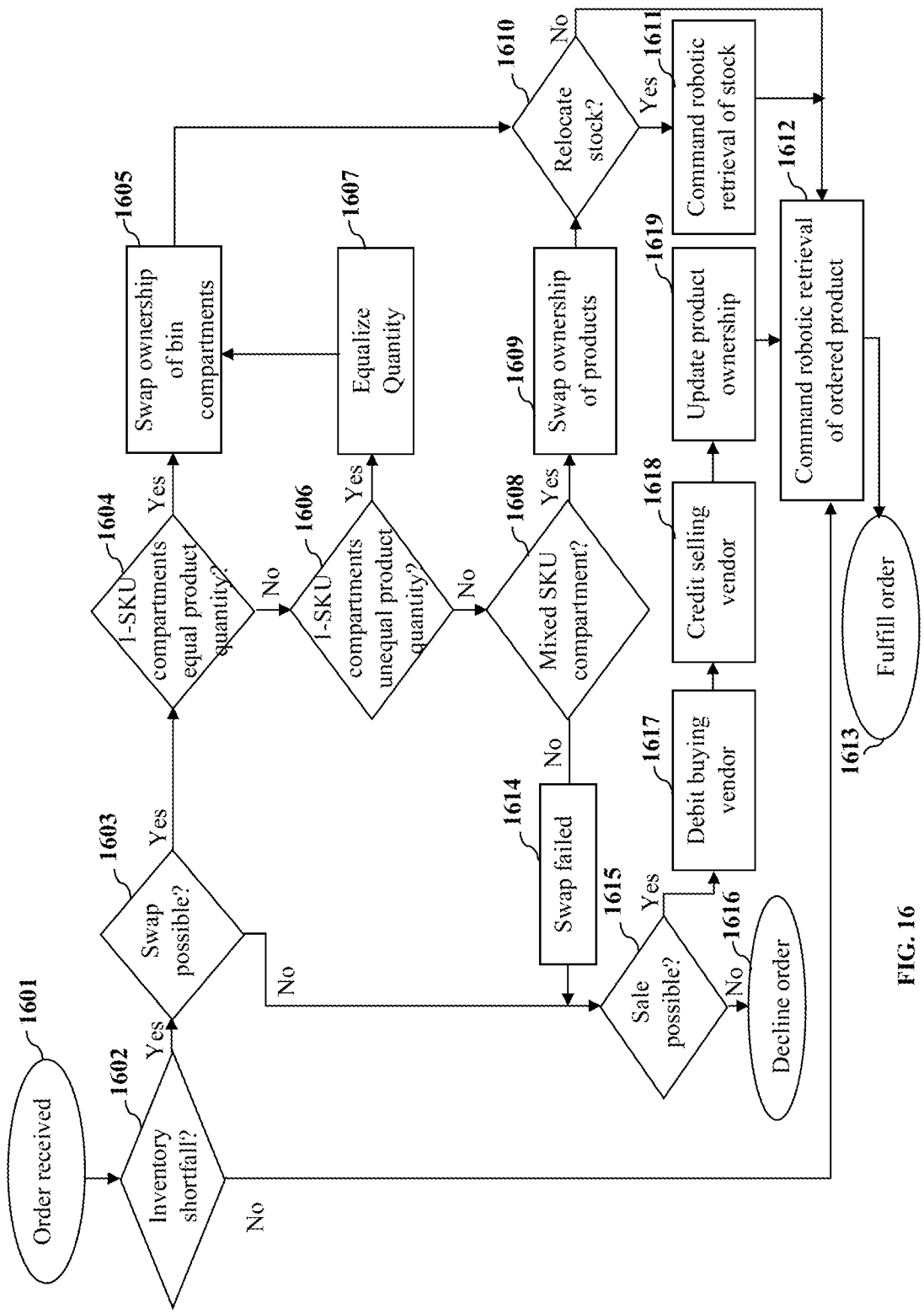
FIG. 16 illustrates a flowchart of a computer-implemented method for initializing order fulfillment of a customer order from a subject vendor, while facilitating an inter-vendor inventory swap or an inter-vendor inventory sale with other vendors having an authorized vendor relationship with the subject vendor, according to an embodiment herein.

FIG. 16 illustrates a flowchart of a computer-implemented method for initializing order fulfillment of a customer order from a subject vendor, while facilitating an inter-vendor inventory swap or an inter-vendor inventory sale with other vendors having an authorized vendor relationship with the subject vendor, according to an embodiment herein. In the computer-implemented method disclosed herein, order fulfilment is initialized in response to a completion of an order transaction by a vendor's customer, taking into account the inter-vendor inventory swap and inter-vendor inventory sale options. At step 1601, the central computing system 401 illustrated in FIG. 4A and FIG. 4C receives details of the order transaction from the vendor's e-commerce platform and populates the customer orders table 516 and the order line items table 517 of the central database 403 illustrated in FIG. 5B, according to those order transaction details, whereby each customer-selected purchase option and customer-specified unit quantity thereof populates a respective line item record in the order line items table 517. The subsequent steps of the process are then performed for each line item in the customer order.

At step 1602, the central computing system 401 checks whether the ordered product type and quantity of that line item is fillable from the subject vendor's own inventory, or whether the subject vendor is a needful vendor with an inventory shortfall in relation to the ordered product. In embodiments employing the reservation process disclosed in the detailed description of FIG. 13, if the order transaction was completed during the reservation period, this step 1602 may be a check of whether any reserved product for that line item was reserved from another authorized vendor, rather than from the vendor's own inventory, in which case the subject vendor has already been identified as a needful vendor having an inventory shortfall in relation to the ordered product. If this step is performed after the reservation period, or in embodiments that do not employ the reservation process disclosed in the detailed description of FIG. 13, then this step 1602 may involve repetition of the inventory search query process disclosed in the detailed description of FIG. 10, to update the product availability results and assess therefrom whether the vendor has an inventory shortfall for the ordered product type and quantity.

If no shortfall is found, the process continues to step 1612, where the central computing system 401 instructs the facility management subsystem 404 illustrated in FIG. 4A and FIG. 4C, at the particular facility at which the ordered product quantity resides to command a robotic handler 408 illustrated in FIGS. 4A-4C, to retrieve the storage bin(s) containing that quantity of ordered product from the gridded storage structure for picking of the order from the retrieved storage bin(s), for example, if that storage bin is a multi-compartment storage (MCS) bin at the appropriate micro facility that serves the nano facility to which the order is to be transported; transporting the retrieved storage bin(s) onward to another facility at which the order will be subsequently picked, for example, in the case of the MCS bin(s) at the macro facility and then transporting the storage bin(s) onward to the appropriate micro facility for picking of the order thereat; or for transferring the ordered product quantity from the storage bin(s) to another storage bin that will be transported onward, for example, during kitting from a single-compartment storage (SCS) bin to an MCS bin. Various possibilities of the type of storage bin and type of facility at which the storage bin resides and the appropriate actions taken on the storage bin to initiate transport thereof or order-picking therefrom, have been disclosed above in relation to storage bins containing reassigned product, and apply to storage bins containing the subject vendor's originally owned inventory.

If an inventory shortfall is realized at step 1602, then at step 1603, the central computing system 401 checks whether an inventory swap is possible, that is, whether the needful subject vendor has sufficient quantity of the ordered product type available elsewhere in the supply chain ecosystem to compensate the other stocked vendor by the shortfall quantity in which the ordered product is required from the other stocked vendor, whether having been determined previously by the reservation process during whose reservation period the order transaction was completed, or by the re-running of the inventory search query process disclosed in the detailed description of FIG. 10, to obtain the updated product availability results. If an inventory swap is determined possible, then the central computing system 401 assesses which of the different previously disclosed options for completing the inventory swap should be executed by comparing details of the storage bins and/or compartments of the storage bins in which the swappable inventory of the two vendors are currently stored.

As exemplarily illustrated in FIG. 16, at step 1604, the central computing system 401 assesses whether the contents of the two storage bins or two compartments both contain a matching singular product type in equal quantity to one another, and if so, then at step 1605, the central computing system 401 swaps the ownership of the two storage bins or the two compartments of the storage bins and updates the bin data recorded on the two storage bins as disclosed above. If the assessment at step 1604 returns a negative result, then the process advances to step 1606. At step 1606, the central computing system 401 assesses whether the contents of the two storage bins or two compartments of the storage bins both contain a matching singular product type in unequal quantity to one another, and if so, the central computing system 401 first equalizes the contents of the two storage bins or the two compartments at step 1607 as disclosed above, and then swaps the ownership and updates the bin data of the equalized bins at step 1605. If the assessment at step 1606 returns a negative result, then the process advances to step 1608, where the central computing system 401 assesses whether the contents of one or both of the two storage bins or the two compartments contain a mixture of multiple product types. If the assessment at step 1608 returns a positive result, then rather than equalizing the contents of the storage bins or the compartments and then swapping ownership of the storage bins or the compartments, at step 1609, the central computing system 401 opts to swap ownership of the products themselves as disclosed above for reassigning only a partial subset of the storage bins or the compartments, whereby the bin contents table 510 illustrated in FIG. 5A and/or the contents table 531 illustrated in FIGS. 5E-5F, store multiple Vendor_IDs for each storage bin or compartment of which only a partial subset of their contents are reassigned.

After swapping of ownership either at the storage bin or compartment level at step 1605, or at the product level in step 1609, then in an embodiment at step 1610, the central computing system 401 initiates relocation of the reassigned inventory now belonging to the stocked vendor, that is, the "compensatory product(s)", from the facility at which the reassigned inventory currently resides, that is, the sending facility, to another facility, that is, the receiving facility. For example, the central computing system 401 initiates relocation of the compensatory product(s) to the facility at which the stocked vendor's original inventory was reassigned to the needful vendor, based on which the compensatory products become "order-fulfilling product(s))". To initiate such a relocation of the compensatory product(s), the central computing system 401 signals the facility management subsystem 404 of the sending facility to command, at step 1611, a robotic handler 408 to retrieve the storage bin holding the compensatory product(s) from the gridded storage structure of the sending facility and carry the storage bin to either an outbound loading dock of that sending facility, for example, if the storage bin contains only the compensatory product(s) or a combination of the compensatory product(s) and other inventory also destined for either the receiving facility or a relay-point facility situated en-route thereto, or to a workstation of the sending facility at which the facility management subsystem 404 commands automated performance by a robotic worker or instructs guided performance by a human worker via a human-machine interface, of transfer of the compensatory product(s) to another storage bin that is subsequently carried to the outbound loading clocks by a commanded robotic worker, for example, in instances where the compensatory product(s) shared a storage bin with other product inventory having a destination facility other than the receiving facility or a relay-point facility situated en-route thereto.

At step 1612, with the inventory swap completed, the facility management subsystem 404 at the facility holding the order-fulfilling product(s) of the formerly needful vendor commands a robotic handler 408 to retrieve the storage bin that contains the order-fulfilling product(s) from the gridded storage structure of that facility, and to carry the storage bin to either an outbound loading dock of that facility, for example, for loading onto a transport vehicle scheduled to travel to a micro facility that serves the particular nano facility to which the order is to be delivered, or to a relay-point facility situated en-route to the micro facility; or to an order-picking workstation of the facility at which the order-fulfilling product(s) already resides, if that facility is the micro facility that serves the particular nano facility to which the order is to be delivered. The order is then fulfilled at the order-picking workstation and the order-packing workstations of the micro facility at which the order-fulfilling product(s) arrives, or was already present, as shown at final step 1613.

Returning to step 1603, if the results thereof indicate that no inventory swap is possible, then the process continues to step 1615, where the central computing system 401 checks whether an inter-vendor inventory sale is possible, that is, whether a stocked vendor has sufficient quantity of the ordered product type available to sell to the vendor with the inventory shortfall, whether this was previously determined by the reservation process within whose reservation period the order transaction was completed, or by the re-running of the inventory search query process disclosed in the detailed description of FIG. 10, to obtain the updated product availability results. If the inter-vendor inventory sale is deemed possible, then at steps 1617 and 1618, the central computing system 401 debits the needful vendor's account and credits the stocked vendor's account according to the stocked vendor's vendor sale price, and at the same time, in an embodiment, debits the needful vendor's account of any applicable service charge that may be levied by the operating entity. On completion of the inter-vendor sale transaction, at step 1619, the central computing system 401 updates the product ownership of the purchased inventory product through the same above disclosed reassignment of a storage bin, compartment, or partial product contents thereof, and optional transfer of the sold product to a different storage bin if necessary, as disclosed above for the needful vendor's half of the inventory swap scenarios. The process then continues to step 1612 and step 1613 as disclosed above.

It will be appreciated that storage bin/compartment/product reassignment is not limited to inter-vendor reassignment. In some embodiments, inventory in the supply chain ecosystem is assigned to suppliers. For example, an incoming supply shipment 601a, 601b to the supply chain ecosystem illustrated in FIG. 6A, rather than being assigned to a vendor on behalf of whom the product(s) of that shipment were ordered, remains under ownership of the manufacturer or the supplier. Accordingly, instead of storing Vendor_IDs and associated product catalogues 505, the central database 403 also stores unique identifiers and product catalogues 505 for suppliers, manufacturers, or other entities. Accordingly, the terms "entity identifier" or "Entity_ID" may be used herein to denote a unique identifier of any entity employing the supply chain ecosystem for storage, distribution and/or order fulfillment, whether that entity is a vendor, supplier or other inventory carrying entity having customers to whom product is to be sold. In such embodiments, a storage bin or a compartment holding product inventory of a supplier, is sold and reassigned to a vendor in need of the product type in that storage bin or compartment. In an embodiment, a vendor with excess inventory of a product may even be able to negation return or sell-back excess inventory to a supplier for re-sale to other vendors.

Accordingly, full or partial storage bin or compartment reassignment enables instantaneous transfer of products between two entities, regardless of the type of entities concerned. Since the customers of the suppliers are vendors, and not end-consumers, the product information stored in the supplier/manufacturer catalogues, and optionally written to the mobile data storage devices 426 of the storage bins 424 illustrated in FIG. 4B, typically do not include handling data relating to customization, for example, value-added service (VAS) customization and order packaging, and optionally also order packing, which will instead be assigned to the storage bin/compartment from the vendor's product catalogue 505 at the time of storage bin/compartment/product reassignment. As disclosed above, incoming shipments from suppliers may optionally come in pre-loaded bins in which product was filled and to which product data was pre written to the central database 403 and/or the storage bin's mobile data storage device 426, by the supplier or manufacturer prior to the storage bins induction into the supply chain ecosystem.

While the detailed embodiments disclosed above refer to a multi-entity inventory management system implemented in the supply chain ecosystem that provides full service from initial supplier/manufacturer sourcing to final customer pickup or last leg/last mile delivery, for example, by the operating entity or outside delivery personnel such as a local courier, it will be appreciated that benefits of various aspects found among the foregoing embodiments may be employed in various contexts, including those that do not span fully from original product sourcing to final customer pickup or last leg/last mile delivery. Accordingly, some embodiments herein may relate to any subset of the various facilities disclosed above, which may be described as product distribution channels serving only partial segments of the full supply chain path, while others may relate to a singular distribution, warehousing or order fulfillment facility benefiting from any of the various embodiments disclosed herein.

In view of this appreciation that some embodiments do not include a full four-tier facility hierarchy of mega, macro, micro and nano facilities, the term "node facility" is used herein to refer to any of the facilities, for example, any of the mega, macro and micro facilities of the four-tier hierarchy, that share indexed storage arrays compatible with the same storage bins as one another, while the term "terminal facility" or "terminal" is used to denote any facility whose storage array is optionally incompatible with the larger storage bins, and is instead configured for use with smaller finished-order bins at downstream locations at or closer to the point of final release to the customer. While the illustrated embodiment discloses progressively smaller transport vehicles in the downstream direction from mega to nano, in an embodiment, and in accordance with the above "node" versus "terminal" facility naming convention, "inter-nodal transport vehicle" is used herein to refer to the transport vehicles that primarily or exclusively travel between "node facilities" and are therefore compatible with the storage bins handled therein, while "node-to-terminal transport vehicle" is used herein to refer to a transport vehicle that primarily or exclusively travels to and from the terminal facilities and is therefore compatible with the differently sized order bins rather than the larger storage bins.

In addition to direct-to-consumer order fulfillment, the multi-entity inventory management system implemented in the supply chain ecosystem disclosed herein is used for inter-business activities, for example, business to business (b2b) commerce, or intra-business activities such as inventory replenishment. In such embodiments, rather than transporting to nano facilities for customer or last leg/last mile delivery service pickup, the storage bins are delivered, for example, to retail stores, warehouses, distribution centers, or other locations owned or operated by vendors, manufacturers, suppliers, or corporate customers thereof. In an embodiment, such locations are each equipped with a respective indexed storage array compatible with the storage bins of the multi-entity inventory management system, whereby in addition or alternative to the finished-order (FO) bins, other storage bins, for example, single-compartment storage (SCS) bins, multi-compartment storage (MCS) bins, and/or picked-order (PO) bins, transported to such locations from mega, macro or micro facilities using the mega-macro or macro-micro transport vehicles 415a, 415b illustrated in FIGS. 4A-4C and FIGS. 6A-6B, are additionally or alternatively received and stored at such locations, optionally in an at least partially automated manner, and in an embodiment, in a fully automated manner, using the components, structures, equipment, methods, and processes disclosed herein. Each such delivery comprises a bin exchange process including picking up empty storage bins for transport to a facility or other similarly equipped business location and/or picking up filled storage bins for transport to such similarly equipped business locations, in a similar or equivalent manner to any of the loading/unloading processes disclosed herein. In embodiments where the business locations are not equipped with compatible indexed storage arrays, the bin-compatible transport vehicles are used to deliver the storage bins to such locations, at which the products are removed from the storage bins. In an embodiment, any such storage bins emptied at a location before the transport vehicle departs the location are loaded back thereon for return to the facility from where they originated on that same transport vehicle. In another embodiment, these business locations accommodate a buffer amount of storage bins to allow a bin exchange without having to empty the storage bins delivered by the transport vehicles. In another embodiment, the storage bins are left on site for later pickup, for example, during a subsequent delivery by the same or a different bin-compatible transport vehicle.

In the illustrated embodiments, at least one local computer in each facility management subsystem 404 and vehicle management subsystem 416 illustrated in FIGS. 4A-4C, instructs the reading and writing of data to and from the mobile data storages devices 426 of the storage bins through the respective local area networks 406, 421, for example, wireless networks, of the facility and the transport vehicle, and in doing so, forwards and retrieves data to and from both the central database 403 of the central computing system 401 and the local facility database 407 of the facility management subsystem 404 or the local vehicle database 420 of the vehicle management subsystem 416. In another embodiment, the facility management subsystem 404 and/or the vehicle management subsystem 416 optionally implement omission of or reduction of content in the local facility database 407 and the local vehicle database 420 respectively, and instead perform such data exchange exclusively between the storage bins and the central database 403, though the added redundancy of local data storage is beneficial to reduce traffic volume of wide area communication and to provide failsafe redundancy in case of communication or central system outages. Other further embodiments forgo data exchange between the storage bins and the local computers and instead allow the storage bins to communicate directly with the central computing system 401.

While most embodiments disclosed above include the mobile data storage devices 426 whose content is updated each time there is a change in bin contents or a transfer of a storage bin from a transport vehicle to a facility or vice versa, or a change in assigned inventory ownership of the storage bin's contents, other embodiments may lack a dynamically updatable data storage device whose contents can be rewritten in such a manner, while still benefiting from other aspects of the overall multi-entity inventory management system and various processes disclosed herein. In an embodiment, a radio frequency identification (RFID) tag that stores and transmits only the Bin_ID is used in place of the re-writable data storage device on the storage bin. In this embodiment, instead of reading and writing additional data from, and to the storage bin, the facility management subsystem 404 records the Bin_ID against the product and order records in the central database 403 and in the local facility databases 407 if duplicated or supplemented therein, during inventory induction, for example, during product-placement in SCS bins; during an inventory bin transfer, for example, SCS bin to MCS bin product-kitting; and during order fulfillment, for example, MCS bin to PO bin order picking and PO bin to FO bin order packing; in which case later processes performed by the facility management subsystem 404 and the vehicle management subsystem 416 use the Bin_ID to subsequently look up and/or update the product and order details in the central database 403 and/or local database(s) 407, 420, and update the Facility_ID or the Vehicle_ID, whenever necessary. In another embodiment, a barcode is used to statically store only the Bin_ID, which in turn, allows locating the Bin_ID in the central database 403 and/or the local database(s) 407, 420 to record that Bin_ID and the Product_ID or order number against one another during inventory induction, inventory bin transfer, or order fulfillment, and to later look up or update the product or order data associated with that Bin_ID during the subsequent processes disclosed herein.

While the illustrated embodiments employ storage bins, that is, smart bins, that store data concerning their contents and intended destination, thereby enabling local short-range wireless communications of pertinent data during the transfer of storage bins between transport vehicles and facilities and during routing of the storage bins within the facilities, thereby reducing wide area network traffic with the central computing system 401 or server, by employing the storage bin as its own autonomous instructing agent for guiding its routing, transport, storage and worker interactions within the supply chain ecosystem, it will be appreciated that other embodiments rely on a direct data exchange between the facility management subsystem 404 and the vehicle management subsystem 416 at any or all points of bin transfer between the transport vehicles and the facilities, rather than bin-to-vehicle and bin-to-facility communication with the storage bin, even in instances where the storage bins are still used to enable onboard data storage thereon concerning their contents and intended destination, for example, in the interest of failsafe redundancy. Furthermore, data exchange performed at various workstations may not take place specifically between the storage bin and the facility management subsystem 404 on such a self-directed basis in various embodiments, as in another embodiment, the facility management subsystem 404 obtains the same bin data from the central computing system 401 or server or from redundant local records created and stored in the local facility database 407, for example, as created during the induction process of new inventory into the supply chain ecosystem from supply shipments or during the unloading of incoming storage bins from a transport vehicle to the facility.

At any step of any process or method disclosed herein where a robotic handler 408 is commanded to carry a storage bin from one location to another, that is, from an origin point A to a destination point B, in an embodiment, such process involves commandment of multiple robotic handlers 408 to complete such task, for example, by carrying of the storage bin from an origin point A to an intermediary point C by one robotic handler and carrying of the storage bin from intermediary point C to a destination point B by another robotic handler. Furthermore, at any step of the methods or processes disclosed herein where a robotic handler is commanded to carry a storage bin away from a workstation, whether into the indexed storage array, to another workstation, to a loading grid structure adjacent to a loading dock, or to another destination, the robotic handler may or may not be the same robotic handler that previously delivered that same storage bin to the workstation from which the storage bin is to be carried away. For example, if the workstation is of a type where the pick port or the put port from which the storage bin is to be taken away is served by a track-based, drive-through travel path on which the robotic handlers of the indexed storage array travel through the workstation, then the robotic handler commanded to carry away the storage bin will be the same robotic handler that previously brought the same storage bin to that port. If the pick port or the put port of the workstation is not served on such a drive-through basis, for example, instead being served by a conveyor-based bin travel path through the workstation, then the robotic handler picking up and carrying away the storage bin from the workstation may be either the same or a different robotic handler than that which previously dropped off the storage bin at the conveyor-based travel path of the workstation. Accordingly, in reference to processes involving multiple robotically-performed bin movements, in an embodiment, reference is made to performance of steps by different "subsets" of the overall robotic handler fleet, which are not limited to mutually exclusive subsets and may be overlapping or even identical subsets.

In an embodiment, command of a first subset of the robotic handlers to retrieve a storage bin from storage and deliver the storage bin to a workstation, followed by subsequent command of a second subset of the robotic handlers to deposit the same storage bin back into storage from the workstation encompasses any of the following example scenarios: (i) a first robotic handler retrieves the storage bin from storage and delivers the storage bin to the workstation, and the same robotic handler returns the storage bin to storage, that is, the subsets are equal in quantity and identical; (ii) a first robotic handler retrieves the storage bin from storage and delivers the storage bin to the workstation, and a different second robotic handler subsequently retrieves the storage bin from the workstation and deposits the storage bin back into storage, that is, the subsets are equal in quantity, but neither identical nor overlapping; (iii) a first robotic handler retrieves the storage bin from storage and hands off the storage bin to a different second robotic handler that delivers the storage bin to the workstation, and a third robotic handler subsequently picks up the storage bin from the workstation and returns the storage bin to storage, that is, the subsets are non-equal in quantity, and are neither identical nor overlapping; (iv) a first robotic handler retrieves the storage bin from storage and hands off the storage bin to a different second robotic handler that delivers the storage bin to the workstation, and the first robotic handler subsequently picks up the storage bin from the workstation and returns the storage bin to storage, that is, the subsets are neither equal in quantity, nor identical; but are overlapping; and (v) a first robotic handler retrieves the storage bin from storage and hands off the storage bin to a different second robotic handler that delivers the storage bin to the workstation, and a third robotic handler subsequently picks up the storage bin from the workstation and hands off the storage bin to the first robotic handler, which returns the storage bin to storage, that is, the subsets are equal in quantity and overlap one another, but are non-identical.

In the method disclosed herein, standardized order bins are used to deliver customer orders from a fulfillment center to the last mile pickup point, for example, the nano facility, thereby eliminating cardboard boxes and allowing products to be shipped in bags rather than cardboard boxes. Moreover, using standardized storage bins throughout an entire supply chain ecosystem allows all entities within the multi-entity inventory management system to be configured to specifically and effectively handle a single standard, which ensures complete compatibility between the entities. As a result, continuity and contiguity are ensured within the multi-entity inventory management system, while making the multi-entity inventory management system scalable geographically and over the course of time. That is, if all equipment within the multi-entity inventory management system abides by the same set of material handling standards, each storage bin can flow through the entire multi-entity inventory management system using direct physical transfer methods from entity to entity without intermediate steps of a conventional supply chain such as material staging, where custody of the storage bin is temporarily assigned to a buffer area during transfer between the entities. Direct physical transfer also precludes the need for identifying the storage bin, for example, by barcode scanning, radio frequency identification (RFID) scanning, etc., to complete the logical transfer of custody of the storage bin between the entities, thereby overcoming another drawback of conventional logistics.

Moreover, the indexed storage methods implemented by each entity in the multi-entity inventory management system allow the location of each storage bin to be continuously tracked while the storage bin is in the custody of each entity. This coupled with the ability to directly transfer the physical and logical custody of each storage bin between entities allows the location of the storage bin to be continuously tracked anywhere within the multi-entity inventory management system. Consequently, the multi-entity inventory management system operates as a single connected organism, instead of a collection of discrete components continuously picking up products from an inbound accumulation area and releasing them to an outbound accumulation area. The storage bins disclosed herein are continuously tracked throughout the multi-entity inventory management system and no staging areas are required to check the storage bins in and out of facilities or transport vehicles. The elimination of shipping and receiving processes and associated staging areas within the multi-entity inventory management system substantially reduces labor, real estate and resource requirements while streamlining logistics, thereby making operations orderly and easier to monitor in real time over chaotic approaches used in conventional supply chains.

Furthermore, the status of the products within the entire multi-entity inventory management system is tracked in real time since the storage bins are handled autonomously with robotic handlers and mechanical means to have each storage bin indexed to a location. This allows continuous identification and tracking of the locations of the storage bins within the multi-entity inventory management system, as the storage bins are moved by the robotic handlers whose actions can be traced by the computerized inventory management system. Hence, location sensors on the storage bins themselves are not required since the location of the storage bins are tracked by mechanical means. The storage bins, therefore, do not need to be checked in and out of facilities; rather, instead of matching the storage bins to facilities and transport vehicles, the storage bins are matched to indexed storage locations in a continuous network.

Furthermore, the multi-entity inventory management system implements a 1:1 exchange of storage bins flowing in a forward or downstream direction and a reverse or upstream direction through the multi-entity inventory management system. As the forward flow rate is identical to the reverse flow rate, the need to buffer overflow of materials in staging areas is eliminated, while further increasing the orderliness and predictability of the multi-entity inventory management system. Storage bins flowing in the reverse direction can be loaded with products to be transported up the hierarchy of facilities to support customer returns, making reverse logistics cost effective over conventional methods. Using the same indexed storage methods as the forward direction, returned products can be tracked continuously on their way up the supply chain hierarchy.

In addition to logistics and processing data, the bin database structure outlines the stock keeping units (SKUs), quantities, owners, location, etc., and serves as an inventory master. As the storage bin is an active actor flowing through the organs of the multi-entity inventory management system, the storage bin is the master served by the facilities and the transport vehicles. This arrangement precludes the need for scanning of barcodes or radio frequency identification (RFID) tags associated with the storage bins to allocate and register the storage bin as being received by the facility or the transport vehicle as if the storage bin now belongs to that single facility or transport vehicle, or scanned/checked out of the facility or the transport vehicle during shipping. In the method disclosed herein, the storage bin travels through the multi-entity inventory management system updating its own location and inventory status continuously.

In an embodiment, each facility within the multi-entity inventory management system is assigned a class with a set prescribed tasks, with child nodes within the hierarchy only serviced by their designated parent nodes. Inventory to be transferred from a donor child node to a needful child node must be first returned to the parent node using the reverse flow of the multi-entity inventory management system and then be transported to the needful child node using the forward direction. The multi-entity inventory management system, therefore, fulfills product from the closest endpoint, for example, a micro facility to the destination address. That is, orders are not fulfilled from alternate micros. Any product required from an alternate, similar class facility, for example, another micro facility, are transferred up the hierarchy to a macro facility, then down to the closest micro facility. This hierarchical arrangement further streamlines processes, further increases the predictability, and lowers transport costs within the multi-entity inventory management system by eliminating unplanned shipments.

Due to the ability to monitor all actions within the multi-entity inventory management system along with its predictable nature, cause and effect of actions performed by all components in the multi-entity inventory management system are carefully measured across the entire multi-entity inventory management system. Consequently, scenario analysis and simulations are much easier to perform than with conventional supply chain methods with generated insights being more effective, thereby allowing the multi-entity inventory management system to operate with increased precision, which lowers operating costs. Furthermore, the multi-tenant or multi-vendor aspects of the multi-entity inventory management system lower costs while at the same time increase customer service.

The multi-entity/multi-tenant/multi-vendor aspect of the system and the method disclosed herein facilitate lowering of costs while at the same time increasing customer service. The ability to digitally reassign ownership between vendors allows the supply chain ecosystem to load balance inventory between vendors at each node, rather than relying only on physical replacement of inventory. This capability also allows micro-fulfillment facilities to be smaller while still offering the same stock keeping unit (SKU) variety and service levels of conventional approaches since less SKU depth is required. The multi-entity inventory management system allows digital transfer of ownership of inventory to a needful vendor, even if this needful vendor does not have inventory within the supply chain ecosystem. In an embodiment, the entire supply chain ecosystem is co-mingled to a bin compartment level with product quantities in each bin compartment being assigned at the vendor level. In this embodiment, vendors own specific quantities of the product within the bin compartment. Since the multi-entity inventory management system performs digital reassignment by digitally transferring ownership of product inventory within a storage bin between vendors, the product inventory does not need to be physically moved to transfer ownership of the products between the vendors. When the products are inducted into storage bins, the multi-entity inventory management system can perform digital reassignment at any time regardless of the location of the storage bins. That is, the multi-entity inventory management system allows a change of ownership of the product inventory while the product inventory is located at a facility or in transit on a transport vehicle. In addition to swapping product units, the multi-entity inventory management system facilities e-commerce between the vendors. The multi-entity inventory management system executes a modern e-commerce workflow where digital reassignment through an inventory swap or an inventory sale is triggered by customer orders being received, inventory shortfall being detected, inventory adjustment being resolved by digital transaction, and robotic handlers being dispatched to fulfill customer orders.

The distributed, multi-entity inventory management system supports a massive number of storage bins, each with their own journey within the multi-entity inventory management system and allows dynamic sharing of the infrastructure between them. Multi agent governance implemented by the computerized inventory management system comprising the facility management subsystem at each of the facilities and the vehicle management subsystem in each of the transport vehicles allows an adaptive and agile layer to effectively govern the supply chain infrastructure to allow each storage bin to optimally flow through the supply chain ecosystem despite the constantly changing conditions in logistics.

It will be apparent in different embodiments that the various methods and computer-readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented as programmed elements, or non-programmed elements, or any suitable combination thereof.

Where databases are described such as the central database 403, the local facility database 407, and the local vehicle database 420 illustrated in FIGS. 4A-4C and FIGS. 5A-5D, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a communication network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or communication network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

What is claimed is:

1. A computerized system for managing product inventory of a plurality of different entities at a plurality of facilities comprising a plurality of storage structures served by robotic handlers, said computerized system comprising:
   a network interface coupled to a communication network;
   at least one storage device storing a database containing product ownership information, said product ownership information comprising information necessary for identification of said plurality of different entities; and
   at least one processor communicably coupled to said network interface and said storage device, said processor configured to execute a plurality of computer program instructions loaded from said storage device, said plurality of computer program instructions, when executed by said processor, cause said processor to:
   activate a first subset of said robotic handlers at one of said facilities to physically store a first product of a particular product type into a first storage bin located within a first storage structure, wherein ownership of said first product is assigned, by said processor, to a first entity included among said plurality of different entities identified in said database;
   receive, via said communication network, first order for said particular product type from a second entity included among said plurality of different entities identified in said database;
   activate a second subset of said robotic handlers to retrieve said first product from said first storage bin located within said first storage structure, to fulfill said order of said particular product type from said second entity;
   update said database to record a transfer of said ownership of said first product from said first entity to said second entity;
   activate a third subset of said robotic handlers to physically store a second product of said particular product type into a second storage bin located within a second storage structure, said second storage structure located at a different one of said facilities than said first storage structure, and wherein ownership of said second product is assigned, by said processor, to said second entity;

responsive to receiving a second order from said first entity for said particular product type, update said database to record a transfer of said ownership of said second product from said second entity to said first entity, whereby said ownership of said first product and said second product is swapped between said first entity and said second entity in a 1:1 exchange of storage bins;

and wherein, said first storage bin and said second storage bin are rendered compatible with a facility-based array of indexed storage locations and an inter-nodal transport vehicle-based array of indexed storage locations, thereby facilitating:

direct physical transfer of said first storage bin and said second storage bin between any of said plurality of different entities via any of inter-nodal transport vehicles, without said first storage bin and said second storage bin having to be at least temporarily assigned to a buffer area during said transfer between any of said plurality of different entities;

continuous tracking of said first storage bin and said second storage bin across each of said plurality of different entities, any of said inter-nodal transport vehicles, and between any of said plurality of different entities and any of said inter-nodal transport vehicles, and without necessitating identification of said first storage bin and said second storage bin by way of scanning to complete a logical transfer of said first storage bin and said second storage bin to any of said plurality of different entities and any of said inter-nodal transport vehicles;

and wherein, said processor is configured to facilitate said 1:1 exchange of storage bins at each of said plurality of different entities and at each of said inter-nodal transport vehicles, thereby causing a flow of said storage bins to be equivalent in both upstream direction and downstream direction, thereby eliminating buffering of overflow materials in a staging area during said exchange of said storage bins.

2. The computerized system as claimed in claim 1, wherein said processor is configured to update said database to record said transfer of said ownership of said first product from said first entity to said second entity, in response to determining that said second entity has an inventory shortfall of said particular product type and is unable to fulfill said first order of said particular product type.

3. The computerized system as claimed in claim 1, wherein said processor is configured to update said database to record said transfer of said ownership of said first product from said first entity to said second entity by verifying that said second entity is purchasing said first product from said first entity, and to update said database to record said second entity as purchasing said first product from said first entity.

4. The computerized system of as claimed in claim 1, wherein said processor is further configured to:

after receiving said first order, and responsive to activating said second subset of said robotic handlers, update said database to record a transfer of ownership of content of said first storage bin from said first entity to said second entity;

after receiving said second order, and responsive to activating a sixth subset of said robotic handlers, update said database to record a transfer of ownership of content of said second storage bin from said second entity to said first entity, whereby said ownership of said content of said first storage bin and said ownership of said content of said second storage bin are swapped between said first entity and said second entity via said 1:1 exchange of storage bins.

5. The computerized system as claimed in claim 4, wherein said processor is configured to:

execute said transfer of said ownership of content of said first storage bin from said first entity to said second entity, and said ownership of content of said second storage bin from said second entity to said first entity at any time corresponding to activation of said robotic handlers and said fulfillment of first order and said second order of said particular product type for said first entity and said second entity respectively;

before receiving said first order, and before activating said second subset of said robotic handlers, update said database to record that said content of said first storage bin is owned by said first entity, and before receiving said second order, and before activating said sixth subset of said robotic handlers, update said database to record that said content of said second storage bin is owned by said second entity.

6. The computerized system as claimed in claim 4, wherein said processor is further configured to:

query said database to determine whether said content of said first storage bin is equal to said content of said second storage bin; and after receiving said first order and said second order, update said database to record said ownership of said content of said first storage bin and said second storage bin as being swapped via said 1:1 exchange of storage bins, at least partly in response to determining that said content of said first storage bin is equal to said content of said second storage bin.

7. The computerized system as claimed in claim 4, wherein said processor is further configured to, in response to determining that said content of said first storage bin and said content of said second storage bin are not equal, perform at least one of the following:

(a) activate a robotic worker at said different one of said facilities to equalize said content of said first storage bin relative to said content of said second storage bin;

(b) activate, at said different one of said facilities, (i) a fifth subset of said robotic handlers to deliver said first storage bin to a human-attended workstation, and (ii) a human-machine interface to instruct a human worker of said human-attended workstation to equalize said content of said first storage bin relative to said content of said second storage bin;

(c) activate a robotic worker at said different one of said facilities to equalize said content of said second storage bin relative to said content of said first storage bin; and (d) activate, at said different one of said facilities, (i) said sixth subset of said robotic handlers to deliver said second storage bin to a human-attended workstation, and (ii) a human-machine interface of said human-attended workstation to instruct a human worker of said human-attended workstation to equalize said content of said first storage bin relative to said content of said second storage bin.

8. The computerized system as claimed in claim 1, wherein said processor is further configured to activate another subset of said robotic handlers to retrieve said second product from said second storage structure for relocation of said second product to said first facility after updating said database to record a transfer of said ownership of said second product in said second storage structure from said second entity to said first entity.

9. The computerized system as claimed in claim 1, wherein said first storage structure and said second storage structure are located in different cities.

10. The computerized system as claimed in claim 1, wherein said processor is further configured to:
receive a reservation message from said second entity requesting that said particular product type be reserved prior to receiving said order for said particular product type from said second entity;
query said database to confirm that said first product is available for reservation;
reserve said first product for said second entity by recording in the said database an indication that said first product is reserved for said second entity after confirming that said first product is available; and
start a reservation period during which said first product is exclusively held for said second entity, such that said first product is unavailable for reservations by other entities among said different entities.

11. The computerized system as claimed in claim 10, wherein said processor is further configured to charge a reservation fee to said second entity for reserving said first product.

12. The computerized system as claimed in claim 10, wherein said processor is further configured to update said database by reversing said indication that said first product is reserved and make said first product available for reservation by other entities among said different entities, when no order corresponding to said first product is received from said second entity within said reservation period.

13. The computerized system as claimed in claim 1, wherein said processor is further configured to:
receive a product availability request for said particular product type from said second entity;
parse said product availability request for requirements associated therewith;
search said database for products that match said requirements associated with said product availability request, wherein a result from said search at least shows an availability of said first product owned by said first entity; and
to a requestor from which said product availability request was received, send information about said first product.

14. The computerized system as claimed in claim 13, wherein said processor is further configured to restrict said search for said products to only include available products owned by entities identified in a white list associated with said second entity.

15. The computerized system as claimed in claim 13, wherein said processor is further configured to restrict said search for said products to not include in-stock products owned by entities identified in a blacklist associated with said second entity.

16. The computerized system as claimed in claim 13, wherein said processor is further configured to restrict said search for said products to only include available products with a selling price not exceeding a preferred maximum purchase price defined by said second entity in said product availability request.

17. The computerized system as claimed in claim 13, wherein said processor is further configured to restrict said search for said products to only include available products that are within a predetermined radius of a preferred destination defined in said product availability request.

18. The computerized system as claimed in claim 13, wherein said processor is further configured to restrict said search for said products to only include available products that are deliverable within a preferred delivery timeline specified in said product availability request.

19. A computer-implemented method for managing product inventory of a plurality of different entities at a plurality of facilities comprising storage structures served by robotic handlers, said computer-implemented method employing an inventory management system comprising at least one storage device and at least one processor communicably coupled to said storage device, said processor configured to execute computer program instructions defined for performing said method comprising the following steps:
storing, in said storage device, a database containing product ownership information, said product ownership information comprising information necessary for identification of said plurality of different entities;
activating, by said inventory management system, a first subset of said robotic handlers at one of said facilities to physically store a first product of a particular product type into a first storage bin located in a first storage structure;
responsive to activating said first subset of said robotic handlers, updating said database, by said inventory management system, to record that said first product is owned by a first entity included among said plurality of different entities identified in said database;
receiving, by said inventory management system via a communication network, first order of said particular product type from a second entity included among said plurality of different entities identified in said database, said second entity being different than said first entity;
updating said database, by said inventory management system, to record a transfer of ownership of said first product stored at said first storage bin located in said first storage structure from said first entity to said second entity;
activating a second subset of said robotic handlers, by said inventory management system, to retrieve said first product from said first storage bin located in said first storage structure, for use in fulfilling said first order of said particular product type for said second entity;
activating, by said inventory management system, a third subset of said robotic handlers to physically store a second product of said particular product type into a second storage bin located within a second storage structure, said second storage structure located at a different one of said facilities than said first storage structure, and wherein ownership of said second product is assigned, by said inventory management system, to said second entity;
responsive to receiving a second order from said first entity for said particular product type, updating said database, by said inventory management system, to record a transfer of said ownership of said second product from said second entity to said first entity, whereby said ownership of said first product and said second product is swapped between said first entity and said second entity in a 1:1 exchange of storage bins;
and wherein, said first storage bin and said second storage bin are rendered compatible, by said inventory management system, with a facility-based array of indexed storage locations and an inter-nodal transport vehicle-based array of indexed storage locations, thereby facilitating:
  direct physical transfer of said first storage bin and said second storage bin between any of said plurality of different entities via any of inter-nodal transport vehicles, without said first storage bin and said second storage bin having to be at least temporarily assigned to a buffer area during said transfer between any of said plurality of different entities;
  continuous tracking of said first storage bin and said second storage bin across each of said plurality of different entities, any of said inter-nodal transport vehicles, and between any of said plurality of different entities and any of said inter-nodal transport vehicles, and without necessitating identification of said first storage bin and said second storage bin by way of scanning to complete a logical transfer of said first storage bin and said second storage bin to any of said plurality of different entities and any of said inter-nodal transport vehicles;
configuring said inventory management system to facilitate said 1:1 exchange of storage bins at each of said plurality of different entities and at each of said inter-nodal transport vehicles, thereby causing a flow of said storage bins to be equivalent in both upstream direction and downstream direction, thereby eliminating buffering of overflow materials in a staging area during said exchange of storage bins.

20. The computer-implemented method as claimed in claim 19, wherein said updating of said database to record said transfer of said ownership of said first product stored in said first storage bin located in said first storage structure, from said first entity to said second entity is performed by said inventory management system in response to determining that said second entity has an inventory shortfall of said particular product type and is unable to fulfill said first order of said particular product type.

21. The computer-implemented method of claimed in claim 19, wherein said updating of said database to record said transfer of said ownership of said first product stored in said first storage bin located in said first storage structure, from said first entity to said second entity is performed by said inventory management system by verifying that said second entity is purchasing said first product from said first entity, and updating said database to record said second entity as purchasing said first product from said first entity.

22. The computer-implemented method as claimed in claim 19, further comprising:
  after receiving said first order, and responsive to activating said second subset of said robotic handlers, updating said database, by said inventory management system, to record a transfer of ownership of content of said first storage bin from said first entity to said second entity; and
  after receiving said second order, and responsive to activating a sixth subset of said robotic handlers, updating said database, by said inventory management system, to record a transfer of ownership of content of said second storage bin from said second entity to said first entity, whereby said ownership of said content of said first storage bin and said ownership of said content of said second storage bin are swapped between said first entity and said second entity via said 1:1 exchange of storage bins.

23. The computer-implemented method as claimed in claim 22, wherein said transfer of said ownership of said content of said first storage bin from said first entity to said second entity, and said ownership of said content of said second storage bin from said second entity to said first entity is executed by said inventory management system at any time corresponding to said activation of said robotic handlers and said fulfillment of said first order and said second order of said particular product type for said first entity and said second entity respectively;
  before receiving said first order, and before activating said second subset of said robotic handlers, updating said database, by said inventory management system, to record that said content of said first storage bin is owned by said first entity; and
  before receiving said second order, and before activating said sixth subset of said robotic handlers, update said database, by said inventory management system, to record that said content of said second storage bin is owned by said second entity.

24. The computer-implemented method of claim 22, further comprising:
  querying said database, by said inventory management system, to determine whether said content of said first storage bin is equal to said content of said second storage bin; and
  after receiving said first order and said second order, updating said database, by said inventory management system, to record said ownership of said content of said first storage bin and said second storage bin as being swapped via said 1:1 exchange of storage bins, at least partly in response to determining that said content of said first storage bin is equal to said content of said second storage bin.

25. The computer-implemented method as claimed in claim 22, further comprising, in response to a determination that said content of said first storage bin and said content of said second storage bin are not equal, performing at least one of the following steps:
  (a) activating a robotic worker at said different one of said facilities, by said inventory management system, to equalize said content of said first storage bin relative to said content of said second storage bin;
  (b) activating, by said inventory management system at said different one of said facilities, (i) a fifth subset of said robotic handlers to deliver said first storage bin to a human-attended workstation, and (ii) a human-machine interface to instruct a human worker of said human-attended workstation to equalize said content of said first storage bin relative to said content of said second storage bin;
  (c) activating a robotic worker at said different one of said facilities, by said inventory management system, to equalize said content of said second storage bin relative to said content of said first storage bin; and
  (d) activating, by said inventory management system at said different one of said facilities, (i) said sixth subset of said robotic handlers to deliver said second storage bin to a human-attended workstation, and (ii) a human-machine interface of said human-attended workstation to instruct a human worker of said human-attended workstation to equalize said content of said first storage bin relative to the said content of said second storage bin.

26. The computer-implemented method as claimed in claim 19, further comprising activating another subset of said robotic handlers, by said inventory management system, to retrieve said second product from said second storage structure for relocation of said second product to said first facility after updating said database to record a transfer of said ownership of said second product in said second storage structure from said second entity to said first entity.

27. The computer-implemented method as claimed in claim 19, further comprising:
   receiving a reservation message from said second entity, by said inventory management system, requesting that said particular product type be reserved prior to receiving said order for said particular product type from said second entity;
   querying said database, by said inventory management system, to confirm that said first product is available for reservation;
   reserving said first product for said second entity, by said inventory management system, by recording in said database an indication that said first product is reserved for said second entity after confirming that said first product is available; and
   starting a reservation period, by said inventory management system, during which said first product is exclusively held for said second entity, such that said first product is unavailable for reservations by other entities among said different entities.

28. The computer-implemented method as claimed in claim 27, further comprising charging a reservation fee to said second entity, by said inventory management system, for reserving said first product.

29. The computer-implemented method as claimed in claim 27, further comprising updating said database, by said inventory management system, by reversing said indication that said first product is reserved, and making said first product available for reservation by other entities among said different entities, when no order corresponding to said first product is received from said second entity within said reservation period.

30. The computer-implemented method as claimed in claim 19, further comprising:
   receiving a product availability request, by said inventory management system, for said particular product type from said second entity;
   parsing said product availability request, by said inventory management system, for requirements associated therewith;
   searching said database, by said inventory management system, for products that match said requirements associated with said product availability request, wherein a result from said search at least shows an availability of said first product owned by said first entity; and
   to a requestor from which said product availability request was received, send information about said first product, by said inventory management system.

31. The computer-implemented method as claimed in claim 30, further comprising restricting said search, by said inventory management system, for said products to only include available products owned by entities identified in a white list associated with said second entity.

32. The computer-implemented method as claimed in claim 30, further comprising restricting said search, by said inventory management system, for said products to not include in-stock products owned by entities identified in a blacklist associated with said second entity.

33. The computer-implemented method as claimed in claim 30, further comprising restricting said search, by said inventory management system, for said products to only include available products with a selling price not exceeding a preferred maximum purchase price defined by said second entity in said product availability request.

34. The computer-implemented method as claimed in claim 30, further comprising restricting said search, by said inventory management system, for said products to only include available products that are within a predetermined radius of a preferred destination defined in said product availability request.

35. The computer-implemented method as claimed in claim 30, further comprising restricting said search, by said inventory management system, for said products to only include available products that are deliverable within a preferred delivery timeline specified in said product availability request.

36. A non-transitory, computer-readable storage medium having embodied thereon, computer program instructions executable by a processor for managing product inventory of a plurality of different entities at a plurality of facilities comprising at least one storage structure served by robotic handlers, said computer program instructions when executed by said processor cause said processor to:
   store a database containing product ownership information in said storage device, said product ownership information comprising information necessary for identification of said plurality of different entities;
   activate a first subset of said robotic handlers at one of said facilities to physically store a first product of a particular product type into a first storage bin located in a first storage structure;
   responsive to activating said first subset of said robotic handlers, update said database to record that said first product is owned by a first entity included among said plurality of different entities identified in said database;
   receive, via said communication network, a first order of said particular product type from a second entity included among said plurality of different entities identified in said database, said second entity being different than said first entity;
   update said database to record a transfer of ownership of said first product stored at said first storage bin located in said first storage structure from said first entity to said second entity;
   activate a second subset of said robotic handlers to retrieve said first product from said first storage bin located in said first storage structure, for use in fulfilling said first order of said particular product type for said second entity;
   activate a third subset of said robotic handlers to physically store a second product of said particular product type into a second storage bin located within a second storage structure, said second storage structure located at a different one of said facilities than said first storage structure, and wherein ownership of said second product is assigned to said second entity;
   responsive to receiving a second order from said first entity for said particular product type, update said database to record a transfer of said ownership of said second product from said second entity to said first entity, whereby said ownership of said first product and said second product is swapped between said first entity and said second entity in a 1:1 exchange of storage bins;
   and wherein, said first storage bin and said second storage bin are rendered compatible with a facility-based array of indexed storage locations and an inter-nodal transport vehicle-based array of indexed storage locations, thereby facilitating:

direct physical transfer of said first storage bin and said second storage bin between any of said plurality of different entities via any of inter-nodal transport vehicles, without said first storage bin and said second storage bin having to be at least temporarily assigned to a buffer area during said transfer between any of said plurality of different entities;

continuous tracking of said first storage bin and said second storage bin across each of said plurality of different entities, any of said inter-nodal transport vehicles, and between any of said plurality of different entities and any of said inter-nodal transport vehicles, and without necessitating identification of said first storage bin and said second storage bin by way of scanning to complete a logical transfer of said first storage bin and said second storage bin to any of said plurality of different entities and any of said inter-nodal transport vehicles:

configure said inventory management system to facilitate said 1:1 exchange of storage bins at each of said plurality of different entities and at each of said inter-nodal transport vehicles, thereby causing a flow of said storage bins to be equivalent in both upstream direction and downstream direction, thereby eliminating buffering of overflow materials in a staging area during said exchange of said storage bins.

37. The non-transitory, computer-readable storage medium as claimed in claim 36, wherein said processor is configured to update said database to record said transfer of said ownership of said first product from said first entity to said second entity, in response to determining that said second entity has an inventory shortfall of said particular product type and is unable to fulfill said first order of said particular product type.

* * * * *